(12) United States Patent
Yoshida et al.

(10) Patent No.: US 7,706,531 B2
(45) Date of Patent: Apr. 27, 2010

(54) RECORDING APPARATUS, REPRODUCTION APPARATUS, DATA PROCESSING APPARATUS, RECORDING AND REPRODUCTION APPARATUS AND DATA TRANSMISSION APPARATUS AND CORRESPONDING METHODS

(75) Inventors: Shuichi Yoshida, Osaka (JP); Takanori Okada, Toyonaka (JP); Yoshiki Kuno, Moriguchi (JP); Jyun-ichi Komeno, Osaka (JP); Toshikazu Koudo, Nishinomiya (JP); Ryosuke Shimizu, Hirakata (JP); Noriaki Kubo, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1109 days.

(21) Appl. No.: 10/169,052

(22) PCT Filed: Dec. 26, 2000

(86) PCT No.: PCT/JP00/09260

§ 371 (c)(1),
(2), (4) Date: Nov. 4, 2002

(87) PCT Pub. No.: WO01/48755

PCT Pub. Date: Jul. 5, 2001

(65) Prior Publication Data

US 2003/0120942 A1 Jun. 26, 2003

(30) Foreign Application Priority Data

Dec. 28, 1999 (JP) .............................. 11-375777
Aug. 17, 2000 (JP) .............................. 2000-247688

(51) Int. Cl.
*H04N 7/167* (2006.01)
*G06F 12/14* (2006.01)
*G06F 21/00* (2006.01)
*G06F 11/30* (2006.01)

(52) U.S. Cl. .................. 380/201; 713/193; 705/56; 705/57

(58) Field of Classification Search ............... 713/193; 705/56, 57; 380/201
See application file for complete search history.

(56) References Cited

U.S. PATENT DOCUMENTS 4,796,220 A * 1/1989 Wolfe ........................ 705/56

(Continued)

FOREIGN PATENT DOCUMENTS

CN 1154551 7/1997

(Continued)

OTHER PUBLICATIONS

Morito, Hajime. Roe, Michael. Stewart, E. Lee. "Digital Copy Protectiion Scheme Using Recording Medium Identifier". Proceedings of the 1999 International Workshops on Parallel Processing. Pub. 1999. Relevant pp. 174-178. Found on the World Wide Web at: http://ieeexplore.ieee.org/stamp/stamp.jsp?tp=&arnumber=800058&isnumber=17353.*

(Continued)

*Primary Examiner*—William R Korzuch
*Assistant Examiner*—Jeremiah Avery
(74) *Attorney, Agent, or Firm*—RatnerPrestia

(57) ABSTRACT

An encryptor is provided for encrypting AV data sent from an interface. A controller controls recording of the encrypted AV data by controlling a recorder for recording the encrypted AV data in a magnetic disk. The recorder is controlled by the controller so as to reproduce the data recorded on the disk. A decrypter decrypts the reproduced data that is sent to the interface.

47 Claims, 39 Drawing Sheets

U.S. PATENT DOCUMENTS

| | | | | |
|---|---|---|---|---|
| 4,890,319 | A | * | 12/1989 | Seth-Smith et al. .......... 380/202 |
| 5,410,654 | A | * | 4/1995 | Foster et al. ................. 711/147 |
| 5,450,489 | A | | 9/1995 | Ostrover et al. |
| 5,513,260 | A | | 4/1996 | Ryan |
| 5,524,250 | A | * | 6/1996 | Chesson et al. .............. 712/228 |
| 5,651,064 | A | | 7/1997 | Newell |
| 5,784,464 | A | * | 7/1998 | Akiyama et al. ............. 713/155 |
| 5,799,081 | A | * | 8/1998 | Kim et al. .................... 380/203 |
| 5,907,655 | A | * | 5/1999 | Oguro .......................... 386/94 |
| 5,923,486 | A | | 7/1999 | Sugiyama et al. |
| 5,987,126 | A | * | 11/1999 | Okuyama et al. ............ 380/203 |
| 5,999,691 | A | | 12/1999 | Takagi et al. |
| 6,009,116 | A | * | 12/1999 | Bednarek et al. ............ 375/130 |
| 6,163,644 | A | | 12/2000 | Owashi et al. |
| 6,230,268 | B1 | * | 5/2001 | Miwa et al. .................. 713/176 |
| 6,263,313 | B1 | * | 7/2001 | Milsted et al. ................. 705/1 |
| 6,289,102 | B1 | | 9/2001 | Ueda et al. |
| 6,347,846 | B1 | * | 2/2002 | Nakamura ................... 380/203 |
| 6,389,538 | B1 | * | 5/2002 | Gruse et al. .................. 713/194 |
| 6,466,978 | B1 | * | 10/2002 | Mukherjee et al. ........... 709/225 |
| 6,526,144 | B2 | * | 2/2003 | Markandey et al. ........... 380/28 |
| 6,535,688 | B1 | * | 3/2003 | Kawamura et al. ............ 386/95 |
| 6,622,249 | B1 | | 9/2003 | Komuro et al. |
| 7,124,101 | B1 | * | 10/2006 | Mikurak ....................... 705/35 |

FOREIGN PATENT DOCUMENTS

| | | |
|---|---|---|
| CN | 1271935 A | 11/2000 |
| EP | 0 756 279 | 1/1997 |
| EP | 1 049 087 A2 | 11/2000 |
| GB | 2329997 | 4/1999 |
| JP | 8-180604 A | 7/1996 |
| JP | 08-297919 | 7/1996 |
| JP | 09-191453 | 7/1997 |
| JP | 09-214882(A) | 8/1997 |
| JP | 9-326166 A | 12/1997 |
| JP | 10-40639 | 2/1998 |
| JP | 10-56620 | 2/1998 |
| JP | 10-149619 | 6/1998 |
| JP | 10-162559 A | 6/1998 |
| JP | 10-208388 | 8/1998 |
| JP | 10-293724(A) | 11/1998 |
| JP | 10-293725(A) | 11/1998 |
| JP | 11-86437 | 3/1999 |
| JP | 11-164254 | 6/1999 |
| JP | 11-176091 | 7/1999 |
| JP | 11-195269 A | 7/1999 |
| JP | 11-232778 | 8/1999 |
| JP | 11-250571(A) | 9/1999 |
| JP | 11-259964 | 9/1999 |
| JP | 11-306673 | 11/1999 |
| JP | 11-328849 | 11/1999 |
| WO | WO 97/14147 A1 | 4/1997 |

OTHER PUBLICATIONS

Japanese search report for PCT/JP00/09260 dated Apr. 24, 2001.
English translation of Form PCT/ISA/210.
Office Action from Chinese Patent Office corresponding to application No. 00819187.5 dated Feb. 4, 2005.
JP Office Action for JP 2001-548390, publication date Sep. 29, 2009.

* cited by examiner

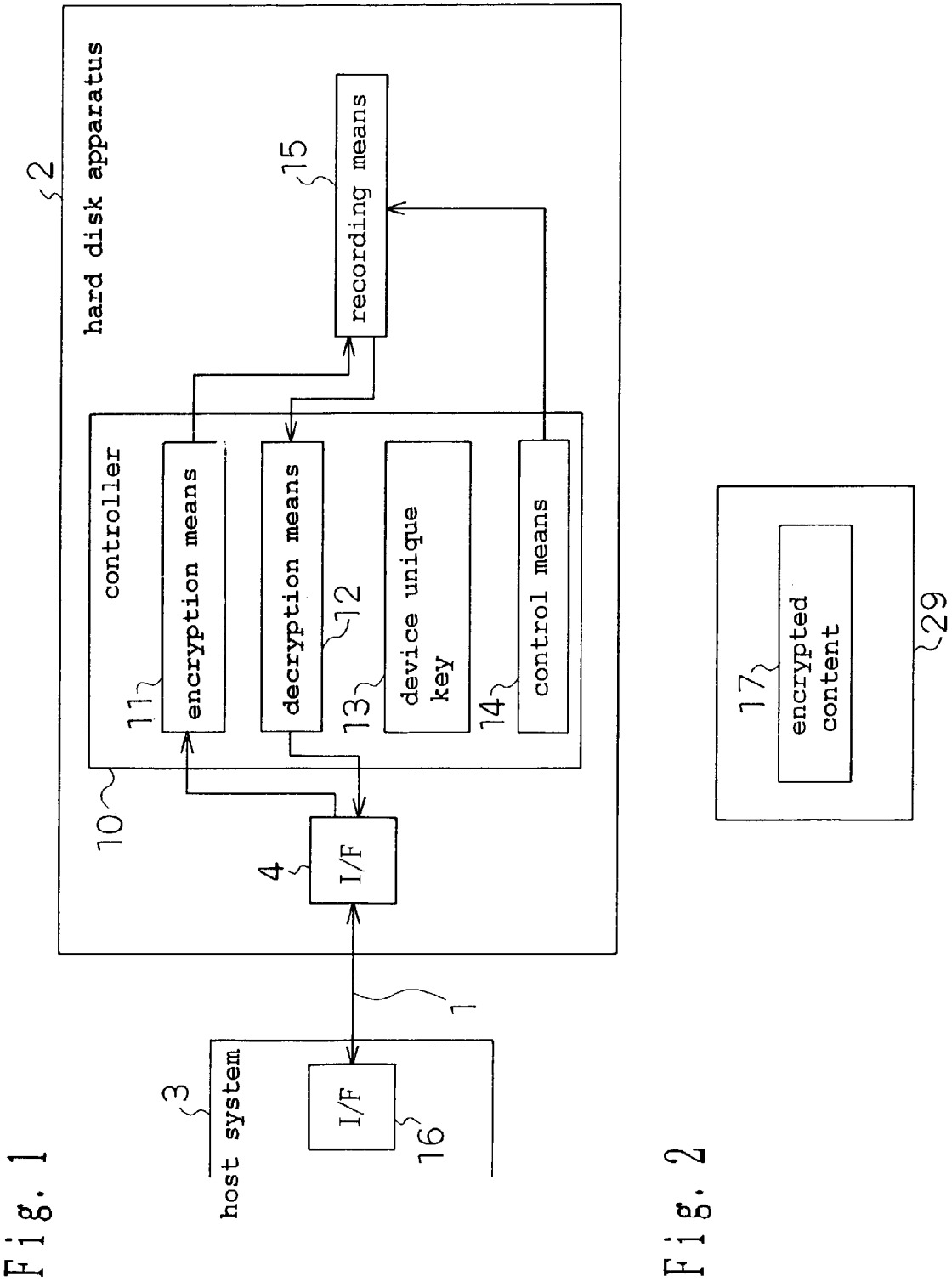

RECORDING APPARATUS, REPRODUCTION APPARATUS, DATA PROCESSING APPARATUS, RECORDING AND REPRODUCTION APPARATUS AND DATA TRANSMISSION APPARATUS AND CORRESPONDING METHODS

THIS APPLICATION IS A U.S. NATIONAL PHASE APPLICATION OF PCT INTERNATIONAL APPLICATION PCT/JP00/09260.

TECHNICAL FIELD

The present invention relates to a recording apparatus for recording data, a reproduction apparatus for reproducing data, a data processing apparatus for moving or copying data that is recorded in a recording medium into another apparatus, a recording and reproduction apparatus for recording and reproducing data that is moved in such a manner, a data transmission apparatus for transmitting a stream formed of a plurality of pieces of data and a recording apparatus as well as a recording and reproduction apparatus for reproducing, with a time shift, the contents that are broadcast via TV broadcasting, and corresponding methods or the like, so as to be viewed after being delayed a predetermined period of time.

BACKGROUND TECHNOLOGY

It is necessary to protect a copyright in the case of dealing with data, for which copyright protection is necessary, such as a new movie, a TV program or music of a fee charging broadcast. As an effective method of protecting a copyright, there is the method of limiting the utilization of data by encrypting the data of which the copyright requires protection.

For example, at the time of the transmission of audio and visual data (hereinafter denoted as AV data), in the case that copyright protection is necessary for the AV data, the AV data is encrypted before being transmitted. As an example of the above, IEEE1394-DTCP (digital transmission protection) system has become a standard.

IEEE1394 allows data to be synchronously transmitted by means of a fast bus system that carries out a serial transmission and, therefore, it is possible to transmit AV data, or the like, in real time. This IEEE1394 system is being installed in a variety of digital audio and visual equipment, including household digital AV equipment as an external interface.

According to the IEEE1394-DTCP system, a certification function and the function of the nullification of a key are provided at the time of data transmission via an IEEE1394 bus so that the copyright protection can be-realized by encrypting data for which copyright protection is necessary, such as AV data before being transmitted.

Now, together with the spread and development of personal computers, a large number of recording apparatuses or reproduction apparatuses, such as a hard disk apparatus, have come into use, due to their large storage capacity and due to their high speed of access, as external memory apparatuses. Furthermore, hard disk apparatuses have recently come into use not only in computers but also in digital AV equipment, or the like, where video and sound are recorded and reproduced by applying digital technology so as to make use of their high speed of access and their large storage capacity.

Accordingly, there have been cases where a creator of a movie, and the like, consider that a third party should not be allowed to freely make copies of data prepared by themselves. Therefore, there exists data that is prohibited from being copied in another recording medium and there exists data that is allowed to be copied only one time in order to protect the copyright thereof.

In the case that such data is stored in, for example, an HDD by being copied, the data is reproduced by using only the HDD.

In addition, as one way of viewing a TV broadcast that has been conventionally widely used, a program (content) that has been broadcast is temporarily recorded in a recording apparatus, such as a VTR, so that the recorded data is reproduced at a later time and, thereby, the program is viewed at a time different from its original broadcast time.

In particular, in the case that a recording medium such as a hard disk where a random access is possible and where recording and reproduction are possible at the same time is used for a recording apparatus, a time shift reproduction, according to a narrow definition, can be implemented in a manner such that the content of a program can be viewed in sequence without any portion being missed even after being delayed for only a short period of time during the broadcasting time of the program in comparison with a VTR wherein a conventional tape medium is used.

FIG. 43 is a configuration diagram of a recording and reproduction apparatus for implementing a time shift reproduction according to the prior art. As shown in the figure, a recording and reproduction means 2120 is a means of recording and reproducing broadcasts inputted from the outside, a recording medium 2130 is a means of storing data of broadcasts that can be implemented by a hard disk, or the like, a switching means 2160 is a means of receiving inputs from the recording and reproduction means 2120 and inputs of broadcasts from the outside and for selecting any of them which is then outputted to an external monitor, or the like.

An example of the operation of a recording and reproduction apparatus according to the prior art that has such a configuration is described in the following.

First, in the case that a viewer is viewing a program in real time, the switching means 2160 carries out a setting such that the broadcast inputted from the outside is outputted to the monitor without change while the recording and reproduction means 2120 records the same program content in the recording medium 2130.

Next, in the case that the viewer returns again to a position in front of the monitor so as to restart viewing of the program after temporarily leaving the position in front of the monitor, the recording and reproduction means 2120 reproduces the recorded data from the point in time when the viewer left the position in front of the monitor while the switching means 2160 carries out the setting such that input from the recording and reproduction means 2120 is outputted to the monitor. After this, the viewer views the reproduction output from the recording and reproduction means 2120 as the program.

In the above described operation, the recording and reproduction means 2120 reproduces data while carrying out the recording of the broadcast inputted from the outside in a parallel manner. That is to say, the recording and reproduction means 2120 simultaneously carries out the reproduction and the recording of the data.

Thereby, even in the case that the viewer has to temporarily interrupt the viewing of a real time broadcast program, it becomes possible to view and to follow the content of the program without a gap, with a delay in accordance with the period of time, only, of interruption of viewing.

In the same manner as in the case of the transmission of AV data, however, a system for copyright protection is necessary in the case that AV data that requires copyright protection is recorded in and/or reproduced from a recording medium, such as a hard disk apparatus. How the copyright is protected, however, is not concretely determined in the case that AV data that requires copyright protection is recorded in and/or reproduced from a recording apparatus and/or reproduction apparatus.

In addition, in some cases copyright protection is required, in the same manner as for AV data, for document data sent via the Internet, or the like, and for computer programs, such as game software, in addition to AV data. How the copyright is protected, however, is not concretely determined in the case that the above described data that requires copyright protection is recorded in and/or reproduced from a recording apparatus and/or reproduction apparatus.

That is to say, there is a problem wherein there is no concrete system that protects the copyright in the case that AV data, document data or data such as computer programs are recorded in a recording apparatus and/or in the case that these types of data are reproduced in a reproduction apparatus.

In addition, when the remaining capacity for data recording in the above described HDD becomes small, it becomes necessary to overwrite new data on the data recorded in the HDD or to increase the remaining capacity by eliminating a portion of data that is recorded in the HDD. However, the user of the HDD considers that overwriting the data that is recorded in the HDD or the elimination of the data is not desirable and, in some cases, the user considers it desirable to copy the data recorded in the HDD in another recording medium.

On the other hand, as described above, the copyright holder is negatively affected when the data recorded in the HDD is copied by ignoring the copyright.

That is to say, in the case that data, for which copyright protection is necessary, is recorded in a recording apparatus such as an HDD, there is a problem that the user cannot copy the data to another recording medium.

In addition, the problem of copyright is taken into consideration with respect to broadcast programs together with the verification of broadcast type such as cable TV or a CS broadcast and digitalization of signals and broadcasts of programs are implemented, wherein recording for copying is set to be impossible in advance by including a copy guard in signals.

In a conventional recording and reproduction apparatus, however, a problem arises in that there is a risk that the recording of a program in the recording medium 2130 in order to implement a time shift reproduction causes an infringement of the copyright with respect to the program, when the copyright is taken into consideration as described above.

That is to say, a problem arises in that there is a risk that an infringement of the copyright with respect to a program, for which copyright protection is necessary, may be caused in the case that a time shift reproduction of the program is implemented.

As for measures for avoiding such a problem, methods of (1) limiting the times when time shifting is possible, (2) preventing the content that is broadcast from being stored in a complete form have been considered, and so on.

DISCLOSURE OF THE INVENTION

The present invention is provided by taking the above described problems into consideration and a purpose thereof is to provide a recording apparatus, a reproduction apparatus and corresponding methods that can protect the copyright in the case where data for which copyright protection is necessary is recorded, and/or in the case where data for which copyright protection is necessary is reproduced.

In addition, the present invention is provided by taking the above problems into consideration and a purpose thereof is to provide a data processing apparatus and method for moving or for copying data, which is prohibited from being copied so as to protect the copyright, to another recording medium, a recording and reproduction apparatus for recording or reproducing, while recording, data from the above data processing apparatus in a recording medium, an encrypted data decryption recording apparatus system for backing up data while protecting the copyright and a decryption recording apparatus and a recording apparatus for forming the above system as well as a data transmission apparatus for transmitting data while protecting the copyright.

In addition, the present invention is provided by taking the above described problems into consideration and a purpose thereof to provide a recording apparatus, a recording and reproduction apparatus and corresponding methods wherein it is possible to avoid copyright infringement in a time shift reproduction for viewing a program with a delay relative to its original broadcast time.

To solve the above problems, one aspect of the present invention is a recording apparatus characterized by comprising:

an encryption means of encrypting data sent from an interface;

a control means of controlling said encrypted data to be recorded; and a recording means controlled by said control means of recording said encrypted data on a disk.

Another aspect of the present invention is a recording apparatus, characterized in that said encryption means encrypts said data by using a device unique key that is a numeric value and/or a symbol allocated to, and specific to, said recording apparatus.

Still another aspect of the present invention is a recording apparatus, characterized in that said encryption means encrypts said data by using recording unit information that is a numeral and/or a symbol specific to a recording block corresponding to a recording unit that is a minimum unit for said control means to sequentially access said recording means.

Yet still another aspect of the present invention is a recording apparatus, characterized in that the encryption of said data by using said recording unit information indicates the encryption of said data by using a key gained based on said recording unit information.

Still yet another aspect of the present invention is a recording apparatus, characterized in that at least said encrypted data recorded in said recording block and additional information added to said encrypted data are encrypted in the entire portion and are recorded in said recording means.

A further aspect of the present invention is a recording apparatus, characterized in that:

copy permission information is added to said data;

said control means controls said recording means to record said copy permission information;

said encryption means generates first information that includes at least either said device unique key or said copy permission information;

said encryption means generates, by using said recording unit information, a content key that is information gained by encrypting said first information;

said encryption means encrypts said data by using said content key; and said control means controls said recording means to record said encrypted data.

A still further aspect of the present invention is a recording apparatus, characterized in that:

a title key that is a numeric value and/or a symbol specific to said data is allocated to said data;

said encryption means encrypts said title key by using said device unique key; and said control means controls said recording means so that said encrypted title key is recorded in said recording means.

A yet further aspect of the present invention is a recording apparatus, characterized in that said encryption means encrypts said data by using said title key.

A still yet further aspect of the present invention is a recording apparatus, characterized in that:

said encryption means encrypts said title key by using said device unique key;

said control means controls said recording means to record said encrypted title key;

said encryption means generates third information that includes said title key;

said encryption means generates a content key, which is information gained by encrypting said third information, by using recording unit information that is a numeral and/or a symbol specific to a recording block based on a recording unit that is a minimum unit for said control means to sequentially access said recording means;

said encryption means encrypts said data by using said content key; and said control means controls said recording means to record said encrypted data.

An additional aspect of the present invention is a recording apparatus, characterized in that:

copy permission information is added to said data; and said encryption means encrypts said data by using said copy permission information.

A still additional aspect of the present invention is a recording apparatus, characterized in that:

said encryption means encrypts said title key by using said device unique key;

said control means controls said recording means to record said encrypted title key;

said control means controls said recording means to record said copy permission information;

said encryption means generates second information that includes at least either the said title key or said copy permission information;

said encryption means generates a content key that is information gained by encrypting said second information by using recording unit information that is a numeral and/or a symbol specific to a recording block based on a recording unit that is a minimum unit for said control means to sequentially access said recording means;

said encryption means encrypts said data by using said content key; and said control means controls said recording means to record said encrypted data.

A yet additional aspect of the present invention is a recording apparatus, characterized in that:

said encryption means encrypts data sent from the interface to which copy permission information is attached by using said copy permission information; and said control means controls said recording means to record said copy permission information before and/or after said recording means records said data.

A still yet additional aspect of the present invention is a recording apparatus, characterized in that said control means controls said recording means to record said copy permission information before, at least, said recording means records said data.

A supplementary aspect of the present invention is a recording apparatus, characterized in that said control means controls said recording means to record said copy permission information only after said recording means records said data.

A still supplementary aspect of the present invention is a recording apparatus characterized by comprising:

a control means of controlling encrypted data sent from an interface to be recorded; and a recording means, that is controlled by said control means, of recording said encrypted data on a disk.

A yet supplementary aspect of the present invention is a reproduction apparatus characterized by comprising:

a control means of controlling encrypted data recorded on a disk by means of a recording apparatus to be reproduced;

a reproduction means, which is controlled by said control means, of reproducing said data; and a decryption means of decrypting said reproduced data that is sent to the interface.

A still yet supplementary aspect of the present invention is a reproduction apparatus characterized by comprising:

a control means of controlling encrypted data recorded on a disk by means of a recording apparatus to be reproduced;

a reproduction means, that is controlled by said control means, of reproducing said data; and a decryption means of decrypting said reproduced data that is sent to the interface, wherein said decryption means decrypts said reproduced data by using said device unique key.

One aspect of the present invention is a reproduction apparatus characterized by comprising:

a control means of controlling encrypted data recorded on a disk by means of a recording apparatus to be reproduced;

a reproduction means, that is controlled by said control means, of reproducing said data; and a decryption means of decrypting said reproduced data that is sent to the interface, wherein said decryption means decrypts said reproduced data by using said recording unit information.

Another aspect of the present invention is a reproduction apparatus characterized by comprising:

a control means of controlling encrypted data recorded on a disk by means of a recording apparatus to be reproduced;

a reproduction means, that is controlled by said control means, of reproducing said data; and a decryption means of decrypting said reproduced data that is sent to the interface, wherein said decryption means decrypts said reproduced data by using a key gained based on said recording unit information.

Still another aspect of the present invention is a reproduction apparatus characterized by comprising:

a control means of controlling encrypted data recorded on a disk by means of a recording apparatus to be reproduced;

a reproduction means, which is controlled by said control means, of reproducing said data; and a decryption means of decrypting said reproduced data that is sent to the interface, wherein said decryption means attempts to decrypt the entirety of, or a portion of, said encrypted data by assuming that said copy permission information has a variety of values in the case that said copy permission information cannot be recorded in a normal manner in said recording means at the time when said data is recorded, and wherein said reproduced data is decrypted by using the value of said copy permission information in the case that said reproduced data can be decrypted in a normal manner as a result of said attempts.

Yet still another aspect of the present invention is a reproduction apparatus characterized by comprising:

a control means of controlling encrypted data recorded on a disk by means of a recording apparatus; and a reproduction means, which is controlled by said control means, of reproducing said data, wherein said reproduced data is sent to the interface.

Still yet another aspect of the present invention is a recording apparatus, characterized in that said interface, said encryption means and said control means are integrated and provided on the same printed circuit board.

A further aspect of the present invention is a recording apparatus, characterized in that said interface, said encryption means and said control means are integrated in one chip.

A still further aspect of the present invention is a reproduction apparatus, characterized in that said interface, said decryption means and said control means are integrated and provided on the same printed circuit board.

A further aspect of the present invention is a reproduction apparatus, characterized in that said interface, said decryption means and said control means are integrated in one chip.

A still yet further aspect of the present invention is a recording apparatus, characterized in that a signal detected from a terminal on said printed circuit board that outputs a signal that can be reproduced as data by a third party is entirely encrypted and/or is inscribed in an undisclosed format.

An additional aspect of the present invention is a reproduction apparatus, characterized in that a signal detected from a terminal on said printed circuit board that outputs a signal that can be reproduced as data by a third party is entirely encrypted and/or is inscribed in an undisclosed format.

A still additional aspect of the present invention is a recording apparatus, characterized in that the property of a terminal on said printed circuit board that outputs a signal that can be reproduced as data by a third party is defined according to an undisclosed format.

A yet additional aspect of the present invention is a reproduction apparatus, characterized in that the property of a terminal on said printed circuit board that outputs a signal that can be reproduced as data by a third party is defined according to an undisclosed format.

A still yet additional aspect of the present invention is a recording apparatus, characterized in that said device unique key cannot be accessed by an external device.

A supplementary aspect of the present invention is a recording apparatus, characterized in that said copy permission information is recorded in a system region that cannot be directly accessed by a user of said recording means.

A still supplementary aspect of the present invention is a recording apparatus, characterized in that:

copy permission information is added to the data sent from said interface; and said control means can control said recording means to record said data even in the case that said copy permission information of said data represents "Copy Never" according to a predetermined condition.

A yet supplementary aspect of the present invention is a recording apparatus, characterized in that said predetermined condition is the case wherein said recorded data becomes unreproducible after a predetermined period of time.

A still yet supplementary aspect of the present invention is a recording apparatus, characterized in that said predetermined condition is the case wherein said recorded data becomes unreproducible according to fee imposition conditions.

One aspect of the invention is a reproduction apparatus, characterized in that:

copy permission information is added to said encrypted data that is recorded: and said control means controls said reproduction means to reproduce said data at least one time in the case that said copy permission information of said data represents "Copy Never" according to a predetermined condition.

Another aspect of the present invention is a reproduction apparatus, characterized in that said predetermined condition is the case wherein said recorded data becomes unreproducible after a predetermined period of time.

Still another aspect of the present invention is a reproduction apparatus, characterized in that said predetermined condition is the case wherein said recorded data becomes unreproducible according of fee imposition conditions.

Yet still another aspect of the present invention is a reproduction apparatus, characterized in that:

copy permission information is added to said encrypted data that is recorded; and said control means controls said reproduction means to copy and to output said data only once so as to allow said copy permission information of said data, after being once copied by means of said recording means, to permit copying only one additional time (copy once) in the case that said copy permission information of said data represents the permission of copying only one (copy once) according to a predetermined condition.

Still yet another aspect of the present invention is a reproduction apparatus, characterized in that said predetermined condition is the case wherein said data or the key used for encrypting said data are erased after a predetermined period of time has elapsed since said reproduction means has copied and outputted said data.

A further aspect of the present invention is a reproduction apparatus, characterized in that said predetermined condition is the case wherein a recorder of said data that has been only once copied and outputted is an apparatus for recording said data as a backup.

A still further aspect of the present invention is a reproduction apparatus, characterized in that said data recorded as a backup in said recorder is unreproducible from said recorder.

A yet further aspect of the present invention is a reproduction apparatus, characterized in that said data recorded as a backup in said recorder is unreproducible unless said data is returned to the original reproduction apparatus.

A still yet further aspect of the present invention is a recording apparatus characterized in that said encryption means encrypts data regardless of the value of the copy permission information of said data sent from said interface.

An additional aspect of the present invention is a recording apparatus characterized in that:

said encryption means does not encrypt said data in the case that copy permission information of the data sent from said interface represents that the data can be freely copied (copy free); and said control means controls said recording means to record said unencrypted data.

A still additional aspect of the present invention is a data processing apparatus comprising at least a move means of moving data that is recorded in a recording medium for recording data to another recording apparatus, characterized in that, in the case that data that is attempted to be moved by said move means is copy prohibited data prohibited from being copied, the copy prohibited data is encrypted by using an encryption key specific to said data processing apparatus when at least being outputted from said data processing apparatus.

A yet additional aspect of the present invention is a data processing apparatus comprising at least a copying means of copying data that is recorded on a recording medium for recording data into another recording apparatus, characterized in that, in the case that data that is attempted to be copied by said copying means is copy permission information that is prohibited from being copied, the copy prohibited data is encrypted by using an encryption key specific to said data processing apparatus when at least being outputted from said data processing apparatus.

A still yet additional aspect of the present invention is a data processing apparatus, characterized by further comprising an encryption means of encrypting said copy prohibited data by using said encryption key.

A supplementary aspect of the present invention is a data processing apparatus, characterized by further comprising a reproduction means of decryption, by using said encryption key, said copy prohibited data encrypted using said encryption key and of reproducing said copy prohibited data.

A still supplementary aspect of the present invention is a data processing apparatus, characterized in that:

said reproduction means is a means of reproducing said copy prohibited data at a rate required at the time of viewing and listening by the user;

a storage means of storing said copy prohibited data that has been transmitted at a rate faster, than said rate that is required at the time of viewing and listening by the user in the case that said copy prohibited data encrypted using said encryption key is transmitted at a rate faster than said rate required at the time of viewing and listening by the user from said other recording apparatus is provided; and said reproduction means can reproduce said copy prohibited data stored in said storage means or data stored in said storage means in advance at the time when said storage means stores said copy prohibited data from said other recording apparatus.

A yet supplementary aspect of the present invention is a data processing apparatus, characterized in that:

said other recording apparatus is an apparatus that can record data in a second recording medium;

a judgment means of judging whether or not said second recording medium is a recording medium corresponding to said data processing apparatus is further provided; and said move means or said copying means moves or copies said copy prohibited data in the case that said second recording medium is judged to be a recording medium corresponding to said data processing apparatus by said judgment means.

A still yet supplementary aspect of the present invention is a data processing apparatus, characterized in that:

said other recording apparatus is an apparatus that can record data in a second recording medium;

a judgment means of judging whether or not said other recording apparatus is an apparatus corresponding to said data processing apparatus is further provided; and said move means or said copying means moves or copies said copy prohibited data in the case that said other recording apparatus is an apparatus corresponding to said data processing apparatus by said judgment means.

One aspect-of the present invention is a data processing apparatus, characterized in that said move means or said copying means output said copy prohibited data as data that can be copied only once when said copy prohibited data is moved or is copied.

Another aspect of the present invention is a recording and reproduction apparatus, characterized by comprising a recording means of recording said copy prohibited data that is encrypted using said encryption key from a data processing apparatus in a second recording medium.

Still another aspect of the present invention is a recording and reproduction apparatus, characterized by comprising:

a recording means of recording said copy prohibited data that is encrypted using said encryption key from a data processing apparatus in a second recording medium; and a transmission means of transmitting said copy prohibited data that is recorded in said second recording medium and that is encrypted using said encryption key to said data processing apparatus while still encrypted using said encryption key.

Yet still another aspect of the present invention is a recording and reproduction apparatus, characterized by comprising:

a recording means of recording said copy prohibited data that is encrypted using said encryption key from a data processing apparatus in said second recording medium; and a transmission means of transmitting said copy prohibited data that is recorded in said second recording medium and that is encrypted using said encryption key to said data processing apparatus while still encrypted using said encryption key.

Still yet another aspect of the present invention is a recording and reproduction apparatus, characterized by comprising:

a recording means of recording said copy prohibited data encrypted using said encryption key from a data processing apparatus in a second recording medium; and a decryption and reproduction means of decrypting, by using said encryption key, said copy prohibited data that is recorded in said second, recording medium and that is encrypted using said encryption key and of reproducing said copy prohibited data.

A further aspect of the present invention is a recording and reproduction apparatus, characterized by further comprising:

a key reproduction means of reproducing an encrypted key recording medium wherein said encryption key is recorded; and a key storage means of storing said encryption key reproduced by said key reproduction means, wherein said decryption and reproduction means reproduces said copy prohibited data by utilizing said encryption key stored by said key storage means.

A still further aspect of the present invention is a recording and reproduction apparatus, characterized by further comprising a reception means of receiving said encryption key that is transmitted from said data processing apparatus, wherein said decryption and reproduction means reproduces said copy prohibited data by utilizing said encryption key received by said reception means.

A yet further aspect of the present invention is a data processing apparatus, characterized by comprising at least a move means of moving data that is recorded in a recording medium for recording data to another recording apparatus as data in a format that can be decrypted in the other recording apparatus, wherein data that is attempted to be moved by said move means is copy prohibited data that is prohibited from being copied.

A still yet further aspect of the present invention is a data processing apparatus, characterized by comprising at least a copying means of copying data that is recorded in a recording medium for recording data in another recording apparatus as data in a format that can be decrypted in the other recording apparatus, wherein data that is attempted to be copied by said copying means is copy prohibited data that is prohibited from being copied.

An additional aspect of the present invention is a data processing apparatus, characterized in that the data in a format that can be decrypted in said other recording apparatus means plain sentence data, data that is encrypted using a key specific to said other recording apparatus or data that is encrypted using a key attached to a second recording medium in said other recording apparatus.

A still additional aspect of the present invention is a data processing apparatus, characterized in that the data in a format that can be decrypted in said other recording apparatus is also data in a format used in said other recording apparatus.

A yet additional aspect of the present invention is a processing apparatus, characterized in that:

said other recording apparatus is an apparatus that can record data in said recording medium;

a judgment means of judging whether or not said second recording medium corresponds to said data processing apparatus is further provided; and said move means or said copying means moves or copies said copy prohibited data in the case that said second recording medium is judged to be a recording medium corresponding to said data processing apparatus according to said judgment means.

A still yet additional aspect of the present invention is a data processing apparatus, characterized in that:

said judgment means carries out said judgment by using said key in the case that a key indicating that said second recording medium is a recording medium corresponding to said data processing apparatus is attached to said second recording medium;

an encryption means of encrypting said copy prohibited data by using said key in the case that said second recording medium is judged to be a recording medium corresponding to said data processing apparatus by said judgment means is further provided; and said move means or said copying means moves or copies said encrypted copy prohibited data.

A supplementary aspect of the present invention is a data processing apparatus, characterized in that:

said other recording apparatus is an apparatus that can record data in a second recording medium;

a judgment means of judging whether or not said other recording apparatus is an apparatus corresponding to said data processing apparatus is further provided; and said move means or said copying means moves or copies said copy prohibited data in the case that said other recording apparatus is judged to be an apparatus corresponding to said data processing apparatus by said judgment means.

A still supplementary aspect of the present invention is a data processing apparatus, characterized in that:

in the case that said judgment means has a key that indicates that said other recording apparatus is an apparatus corresponding to said data processing apparatus, said judgment means carries out said judgment by using said key;

an encryption means of encrypting said copy prohibited data by using said key, in the case that said other recording apparatus is judged to be an apparatus corresponding to said data processing apparatus by said judgment means, is further provided; and said move means or said copying means moves or copies said encrypted copy prohibited data.

A yet supplementary aspect of the present invention is a data processing apparatus, characterized in that said move means or said copying means outputs said copy prohibited data as data that can be copied only once when said copy prohibited data is moved or copied.

A still yet supplementary aspect of the present invention is a recording and reproduction apparatus for recording said copy prohibited data, from a data processing apparatus, in a second recording medium and for reproducing said copy prohibited data from said second recording medium, wherein said copy prohibited data is plain sentence data, and wherein said recording and reproduction apparatus is characterized by comprising:

an encryption means of encrypting said copy prohibited data by using an encryption key attached to said second recording medium or by using an encryption key specific to said recording and reproduction apparatus;

a recording means of recording said copy prohibited data encrypted by said encryption means in said second recording medium; and a reproduction means of decrypting said encrypted copy prohibited data that is recorded in said second recording medium by utilizing said key so as to reproduce said copy prohibited data.

One aspect of the present invention is a recording and reproduction apparatus for recording said copy prohibited data, from a data processing apparatus, in a second recording medium and for reproducing said copy prohibited data from said second recording medium, wherein said copy prohibited data is data encrypted by a key specific to said recording and reproduction apparatus or data encrypted by using a key attached to said second recording medium, wherein said recording and reproduction apparatus is characterized by comprising:

a recording means of recording said encrypted copy prohibited data in said second recording medium; and a reproduction means of decrypting said encrypted copy prohibited data that is recorded in said second recording medium by utilizing said key so as to reproduce said copy prohibited data.

Another aspect of the present invention is a data processing apparatus, characterized by further comprising a fee imposition information transmission means of transmitting fee imposition information with respect to move or copying of said data to a management apparatus for managing said data processing apparatus when said move means carries out the move of said data or when said copying means carries out the copying of said data.

Still another aspect of the present invention is a data processing apparatus, characterized in that said move means moves said copy prohibited data to, or said copying means copies said copy prohibited data into, said other recording apparatus when at least a management apparatus, which has the ability of imposing a fee on the move or on the copying of said copy prohibited data, is confirmed to be connected to an interface to which said data processing apparatus and said other recording apparatus are connected.

Yet still another aspect of the present invention is an encrypted data decrypting and recording apparatus system characterized by comprising:

a plurality of recording apparatuses that respectively record encrypted copy prohibited data, of which the content is identical, that is prohibited from being copied; and a decrypting and recording apparatus having a decryption means of decrypting said encrypted copy prohibited data that is outputted from said plurality of recording apparatuses and a recording means of recording encrypted, or unencrypted, copy prohibited data, of which the content is identical to said copy prohibited data.

Still yet another aspect of the present invention is a decrypting and recording apparatus, characterized by comprising:

a decryption means of decrypting encrypted copy prohibited data, which is prohibited from being copied and which is outputted from a plurality of recording apparatuses in which said encrypted copy prohibited data, of which the content is identical, is respectively recorded; and a recording means of recording encrypted, or unencrypted, copy prohibited data, of which the content is identical to that of said copy prohibited data.

A further aspect of the present invention is a recording apparatus, characterized by being one of a plurality of recording apparatuses that respectively record encrypted copy prohibited data, of which the content is identical, that is prohibited from being copied, wherein said recording apparatus comprises a recording means of recording said encrypted copy prohibited data and an output means of outputting said encrypted copy prohibited data that is recorded in said recording means, and wherein said encrypted copy prohibited data outputted from said output means is data that can only be decrypted in a decrypting and recording apparatus having at least a decryption means of decrypting said encrypted copy prohibited data.

A still further aspect of the present invention is a data transmission apparatus characterized by comprising a transmission means of transmitting a stream formed of a plurality of pieces of data, wherein each of said pieces of data in said stream, or within each of blocks forming said stream, is data that cannot be reproduced unless the piece of data chronologically positioned one position before said data is reproduced, and wherein said transmission means transmits each piece of said data, of data in said stream, or each of the blocks forming said stream, in the order of from the rear toward the head in a chronological manner.

A yet further aspect of the present invention is a recording apparatus for allowing copy restricted content, comprising data that is set so as to be prohibited from, or restricted from, being copied, to become reproducible in a time shift manner, characterized by comprising:

a recording medium wherein a predetermined capacity of recording of said copy restricted content is possible; and a recording means of recording data in said recording medium, wherein said recording means records said copy restricted content in said recording medium and allows data of said copy restricted content recorded in said recording medium to convert to the condition wherein viewing and listening is impossible after a predetermined period of time has elapsed since the time the recording of said copy restricted content has started.

A still yet further aspect of the present invention is a recording apparatus, characterized in that said condition wherein viewing and listening is impossible is implemented by erasing the data of said copy restricted content.

An additional aspect of the present invention is a recording apparatus, characterized in that said condition wherein viewing and listening is impossible is implemented by not erasing the data of said copy restricted content.

A still additional aspect of the present invention is a recording apparatus, characterized in that said condition wherein viewing and listening is impossible is implemented by allowing the data of said copy restricted content to become unreproducible.

A yet additional aspect of the present invention is a recording apparatus, characterized in that said condition wherein viewing and listening is impossible is implemented by encrypting the data of said copy restricted content after reproduction.

A still yet additional aspect of the present invention is a recording apparatus, characterized in that the timing according to which said recording means starts the recording of said copy restricted content is defined by referring to judgment information in conjunction with said copy restricted content.

A supplementary aspect of the present invention is a recording apparatus, characterized in that said recording means carries out recording by differentiating said copy restricted content from other content by using said judgment information.

A still supplementary aspect of the present invention is a recording apparatus, characterized in that said judgment information is copyright information included in a data column of said copy restricted content.

A yet supplementary aspect of the present invention is a recording apparatus, characterized in that the timing according to which said recording means starts the recording of said copy restricted content is defined based on an input from the outside.

A still yet supplementary aspect of the present invention is a recording apparatus, characterized in that said recording medium has a recording buffer for temporarily recording said copy restricted content.

One aspect of the present invention is a recording apparatus, characterized in that said recording buffer is a ring buffer wherein it is possible to record a constant amount of data by repeating overwriting recording in the same region.

Another aspect of the present invention is a recording and reproduction apparatus characterized by comprising:

a recording apparatus; and a reproduction means of reproducing data recorded in said recording medium, wherein said reproduction means reproduces said copy restricted content that has been recorded after a predetermined period of standby time has elapsed since the time of the start of the recording of said copy restricted content.

Still another aspect of the present invention is a recording and reproduction apparatus characterized by comprising:

a recording apparatus; and a reproduction means of reproducing data recorded in said recording medium, wherein said reproduction means reproduces said copy restricted content that has been recorded after a predetermined period of standby time has elapsed since the time of the start of the recording of said copy restricted content.

Yet still another aspect of the present invention is a recording and reproduction apparatus, characterized in that, at the time when said reproduction means carries out a reproduction operation under the condition wherein overwriting recording is being carried out in said ring buffer, the reproduction of said data is carried out starting from the position where the oldest piece of data is recorded in said ring buffer.

Still yet another aspect of the present invention is a recording and reproduction apparatus, characterized in that, at the time when said reproduction means carries out a reproduction operation under the condition wherein overwriting recording is not carried out in said ring buffer, the reproduction of said data is carried out starting from the recording start position on said ring buffer.

A further aspect of the present invention is a recording and reproduction apparatus, characterized in that, in the case that copy restricted content recorded in said recording medium is not reproduced within said predetermined period of standby time, said recording apparatus stops the recording operation of said copy restricted content.

A still further aspect of the present invention is a recording and reproduction apparatus, characterized by further comprising a notification means of making a notification of operational content of said recording apparatus or of said reproduction means in advance based on either said predetermined period of time or based on said predetermined period of standby time.

A yet further aspect of the present invention is a recording apparatus, characterized in that said recording means can measure time information including said predetermined period of time.

A still yet further aspect of the present invention is a recording apparatus, characterized in that said copy restricted content includes time information including said predetermined period of time.

An additional aspect of the present invention is a recording apparatus, characterized in that the time information including said predetermined period of time is gained from the outside independently of said copy restricted content.

In addition, a still additional aspect of the invention is a reproduction apparatus characterized by comprising:
  a control means of carrying out control so as to reproduce encrypted data that is recorded on a disk by a recording apparatus;
  a reproduction means, controlled by said control means, of reproducing said data; and
  a decryption means of decrypting said reproduced data that is sent to an interface,
  wherein said control means controls said recording means so that said recording means reproduces said copy permission information;
  said decryption means generates first information that includes at least any of said device unique key and said copy permission information;
  said decryption means generates a content key that is information gained by decrypting said first information by using said recording unit information; and
  said decryption means decodes said data by using said content key.

A yet additional aspect of the invention is a reproduction apparatus characterized by comprising:
  a control means of carrying out control so as to reproduce encrypted data recorded on a disk by a recording apparatus of the invention;
  are production means, controlled by said control means, of reproducing said data; and
  a decryption means of decrypting said reproduced data that is sent to an interface,
  wherein said control means controls said recording means so that said recording means reproduces said encrypted title key; and
  said decryption means decrypts said encrypted title key by using said device unique key.

A still yet additional aspect of the invention is a reproduction apparatus characterized by comprising:
  a control means of carrying out control so as to reproduce encrypted data recorded on a disk by a recording apparatus;
  are production means, controlled by said control means, of reproducing said data; and
  a decryption means of decrypting said reproduced data that is sent to an interface,
  wherein said decryption means decrypts said data by using said title key.

A still yet additional aspect of the invention is a reproduction apparatus characterized by comprising:
  a control means of carrying out control so as to reproduce encrypted data recorded on a disk by a recording apparatus;
  a reproduction means, controlled by said control means, of reproducing said data; and
  a decryption means of decrypting said reproduced data that is sent to an interface,
  wherein said control means controls said recording means so that said recording means reproduces said encrypted title key;
  said decryption means decrypts said reproduced title key by using said device unique key;
  said decryption means generates third information including said title key;
  by using recording unit information that is a numeral and/or a symbol inherent to a recording block under the premise of a recording unit that is the minimum unit when said control means sequentially accesses said recording means, said decryption means generates a content key that is information gained by decrypting said third information; and
  said decryption means decrypts said data by using said content key.

A still supplementary aspect of the invention is a reproduction apparatus characterized by comprising:
  a control means of carrying out control so as to reproduce encrypted data recorded on a disk by a recording apparatus;
  a reproduction means, controlled by said control means, of reproducing said data; and
  a decryption means of decrypting said reproduced data that is sent to an interface,
  wherein said decryption means decrypts said data by using said copy permission information.

A yet supplementary aspect of the invention is a reproduction apparatus characterized by comprising:
  a control means of carrying out control so as to reproduce encrypted data recorded on a disk by a recording apparatus;
  are production means, controlled by said control means, of reproducing said data; and
  a decryption means of decrypting said reproduced data that is sent to an interface,
  wherein said control means controls said recording means so that said recording means reproduces said encrypted title key,
  wherein said decryption means decrypts said reproduced title key by using said device unique key;
  said control means controls said recording means so that said recording means reproduces said copy permission information;
  said decryption means generates second information including, at least, any of said title key and said copy permission information; and
  wherein by using recording unit information that is a numeral and/or a symbol inherent to a recording block under the premise of a recording unit that is the minimum unit when said control means sequentially accesses said recording means, said decryption means generates a content key that is information gained by decrypting said second information; and said decryption means decrypts said data by using said content key.

A still yet supplementary aspect of the invention is a reproduction apparatus characterized by comprising:

a control means of carrying out control so as to reproduce encrypted data recorded on a disk by a recording apparatus;

are production means, controlled by said control means, of reproducing said data; and a decryption means of decrypting said reproduced data that is sent to an interface, wherein said control means controls said recording means so as to reproduce said copy permission information; and said decryption means decrypts said data by using said reproduced copy permission information.

One aspect of the invention is a medium characterized by being a medium that holds a program and/or data for allowing a computer to carry out the entirety, or a part of, functions of the entirety, or a part of, that can be processed by a computer.

Another aspect of the invention is an information assembly characterized by being a program and/or data for allowing a computer to carry out the entirety, or a part of, functions of the entirety, or a part of.

BRIEF DESCRIPTION OF THE DRAWINGS

FIG. 1 is a block diagram showing the configuration of a hard disk apparatus according to the first, second, fourth to sixth embodiments of the present invention;

FIG. 2 is a diagram for describing a summary of the functions of the hard disk apparatus according to the first embodiment of the present invention;

Figure 3:
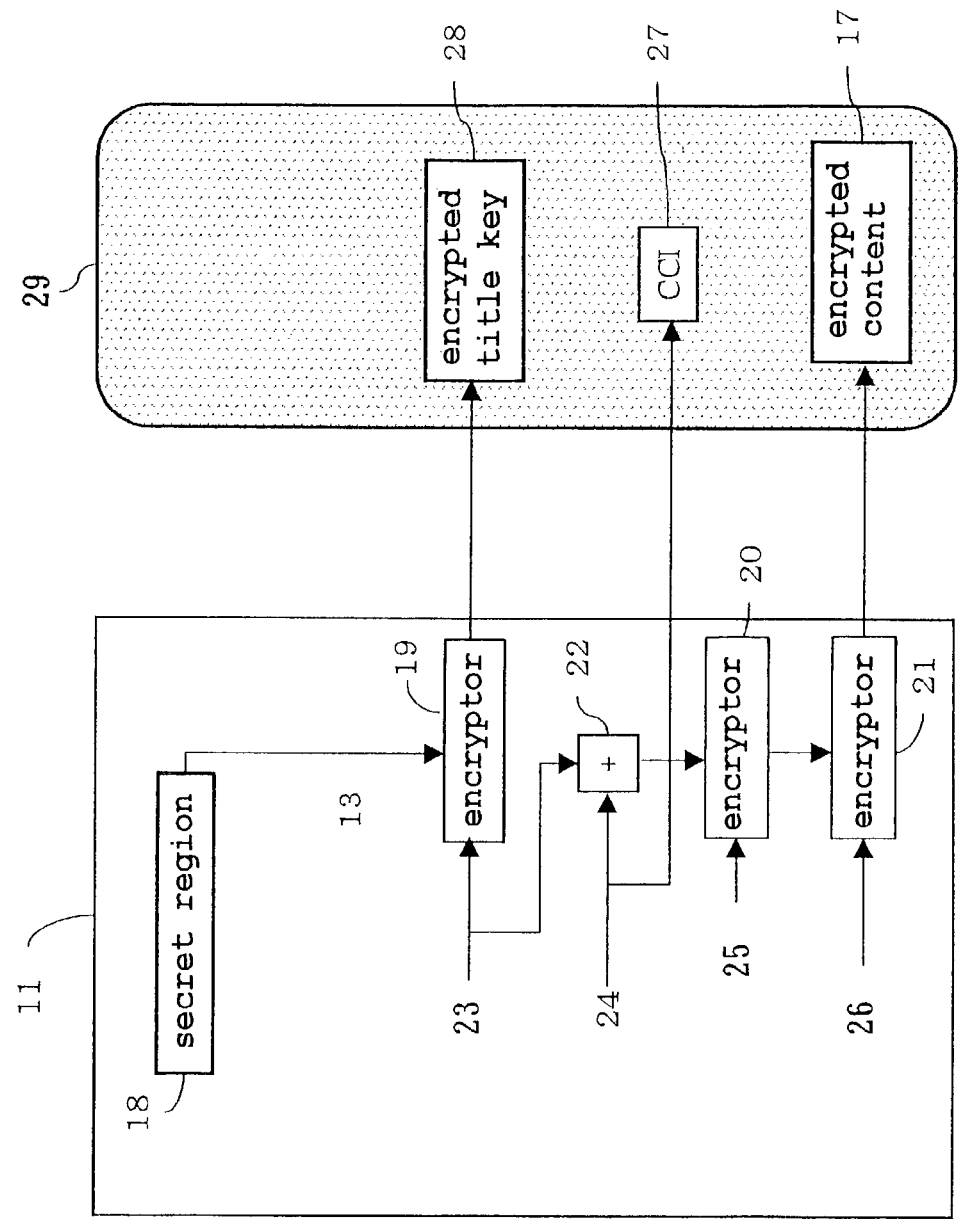
FIG. 3 is a block diagram showing the configuration of an encryption means of the hard disk apparatus according to the first embodiment of the present invention.

| Explanation of Numerals | |
|---|---|
| 1 | IEEE1394 bus |
| 2 | hard disk apparatus |
| 3 | host system |
| 4 | I/F |
| 10 | controller |
| 11 | encryption means |
| 12 | decription means |
| 13 | device unique key |
| 14 | control means |
| 15 | recording means |
| 16 | I/F |
| 17 | encrypted content |
| 18 | secret region |
| 19 | encryptor |
| 22 | adder |
| 23 | title key |
| 24 | CCI |
| 25 | recording unit number |
| 26 | content |
| 27 | CCI |
| 28 | encrypted title key |
| 29 | magnetic disk medium |
| 31 | decryptor |
| 32 | decryptor |
| 33 | decryptor |
| 34 | adder |
| 35 | title key |
| 36 | CCI |
| 37 | decrypted content |
| 39 | recording unit |
| 41 | format |
| 47 | hard disk apparatus |

-continued

| Explanation of Numerals | |
|---|---|
| 51 | controller |
| 1001, 1012, 1019, 1022, 1032 | AVHDD |
| 1002, 1013, 1016, 1023 | archive device |
| 1003 | STB |
| 1004, 1028 | encryption means |
| 1005 | first recording means |
| 1006, 1025, 1034 | storage means |
| 1007, 1027 | move means |
| 1008, 1031, 1038 | reproduction means |
| 1009 | second recording means |
| 1010, 1021 | second recording medium |
| 1011, 1035 | transmission means |
| 1014 | buffer |
| 1015 | high speed transmission means |
| 1017 | decryption reproduction means |
| 1018 | IC card |
| 1020 | judgment means |
| 1024 | third recording means |
| 1026 | sentence simplification means |
| 1029 | fourth recording means |
| 1030 | third recording medium |
| 1033 | DVD apparatus |
| 1036 | fifth recording means |
| 1037 | DVD |
| 2010 | discrimination information detection means |
| 2011 | time information acquisition means |
| 2012 | recording and reproduction means |
| 2013 | recording medium |
| 2014 | recording buffer |
| 2015 | control input I/F |
| 2016 | switching means |

PREFERRED EMBODIMENTS FOR CARRYING OUT THE INVENTION

In the following, embodiments of the present invention are described with respect to the drawings.

First Embodiment

First, the first embodiment is described.

FIG. 1 shows a configuration of a hard disk apparatus 2 that is one embodiment of a recording apparatus and a reproduction apparatus of the present invention.

The hard disk apparatus 2 is connected to IEEE1394 bus 1 and, in addition, the IEEE1394 bus 1 is connected to a host system 3.

The IEEE1394 bus 1 is a high performance serial bus according to the IEEE standard as described in the IEEE1394-1995 for relaying transmissions of AV data or exchanges of commands.

A host system 3, which is provided with an I/F 16 that is an IEEE1394 interface, is an apparatus, for example an STB (set top box: satellite broadcast receiver) for moving data, for which copyright protection is necessary, in order to be recorded in a hard disk apparatus 2, to the IEEE1394 bus 1 and for receiving data, for which copyright protection is necessary, from the hard disk apparatus 2 via the IEEE1394 bus 1 and for reproducing the data.

The hard disk apparatus 2 is an apparatus that can record AV data in a magnetic disk medium while protecting the copyright and/or can reproduce the AV data from the magnetic disk medium while exchanging AV data with the host system 3 via the IEEE1394 bus 1.

That is to say, the hard disk apparatus 2 is an apparatus that encrypts AV data, for which copyright protection is necessary such as encrypted content 17, records this on a magnetic disk medium 29, as shown in FIG. 2, and reproduces the encrypted content 17.

The hard disk apparatus 2 is formed of an I/F 4, a controller 10 and a recording means 15.

In addition, the controller 10 is formed of an encryption means 11, a decryption means 12, a device unique key 13 and a control means 14.

The I/F 4 is an interface of the system of the IEEE1394-DTCP (digital transmission content protection) and is an interface that exchanges commands and AV data with an external device, such as a host system 3, via the IEEE1394 bus 1 and, in addition, that encrypts the AV data, certifies the other device and nullifies the key for decrypting the encryption according to whether or not the certification is successful so that the copyright of the AV data that is transmitted to the IEEE1394 bus 1 can be protected.

The encryption means 11 that forms the controller 10 is a means of encrypting AV data sent from the I/F 4 as well as data added to the AV data.

The decryption means 12 is a means of decrypting the AV data read out by the recording means 15 and the data that is added to the AV data.

The configurations of the encryption means 11 and of the decryption means 12 are described below.

The device unique key 13 is a numeral and/or a symbol that is specifically allocated to each of the hard disk apparatuses 2 and is recorded in a region that cannot be accessed from the outside of the hard disk apparatus 2 and/or of the controller 10.

The recording means 15 is formed of a magnetic disk medium for recording data, a magnetic head for recording and reproducing information on the magnetic disk medium, an actuator, on the tip of which the magnetic head is mounted, that carries out an operation for positioning of the magnetic head at an arbitrary radius position of the magnetic disk medium, a spindle motor for rotating the magnetic disk medium, and the like, and is a means of writing data in the magnetic disk medium or of reading data out from the magnetic disk medium. The magnetic disk medium, from which the recording means 15 reads out data and to which the recording means 15 writes in data, is built in into the hard disk apparatus 2 and is not removable from the hard disk apparatus 2.

The control means 14 is a means that designates an LBA and makes the LBA correspond to the head or to the sector of the magnetic disk medium of the recording means 15 and that positions the magnetic head by controlling the actuator and the spindle motor so that data is written into or read out from the magnetic disk medium by the magnetic head.

Now, as described above, FIG. 3 shows a configuration of the encryption means 11.

The encryption means 11 is formed of an encryptor 19, an encryptor 20, an encryptor 21 and an adder 22.

In addition, the device unique key 13 is a numeral and/or a symbol specific to the hard disk apparatus 2 allocated to the hard disk apparatus 2 as described above in FIG. 3. That is to say, a different device unique key 13 is allocated to each of the hard disk apparatuses 2. In addition, the device unique key 13 is stored in a secret region 18 provided within the controller 10 of the hard disk apparatus 2. This secret region 18 is a region that is protected so that an external device can neither write in nor read out information therefrom and only the controller 10 can read out information stored in the secret region 18. Concretely, this secret region 18 can be implemented by using a ROM on a printed circuit board. That is to say, the device unique key 13 is recorded in the ROM on the printed circuit board. Namely, this ROM cannot be accessed from the outside of the hard disk apparatus 2 and/or of the controller 10.

The title key 23 is a numeral and/or a symbol specifically allocated to each piece of AV data.

CCI (copy control information) 24 is attached to the AV data and is a numeral of two bits representing copy permission information that is sent by being attached to the sy region of the isochronous header of the isochronous packet.

Figures 8, 9:
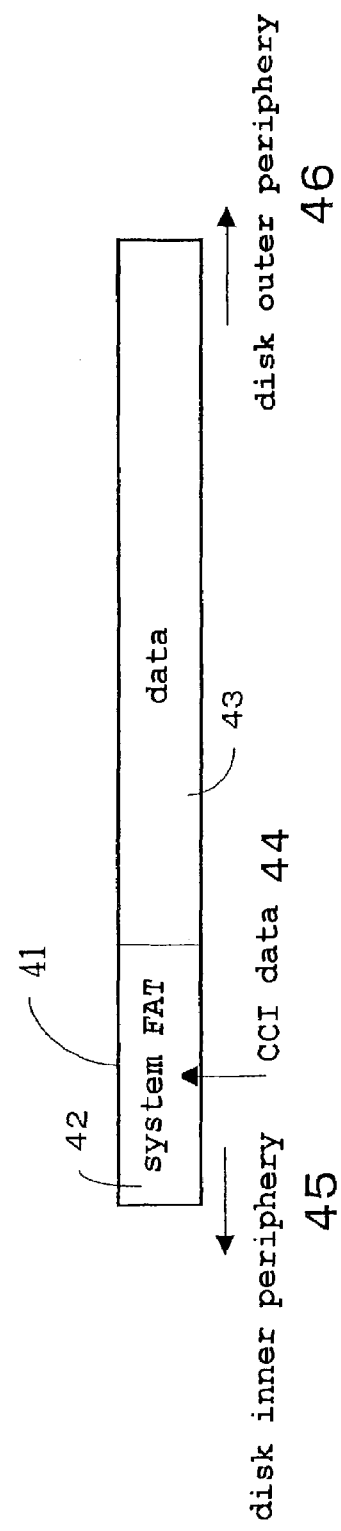
FIG. 8 is a diagram that describes the values of CCI and the meanings thereof.
FIG. 9 is a diagram for describing a magnetic disk format used for recording and reproduction by the hard disk apparatus according to the first embodiment of the present invention.

FIG. 8 shows the binary values that can be taken by the CCI and the meanings thereof. When the CCI is 11 it means "Copy Never." That is to say, though the AV data to which the CCI of this value is attached can be viewed, making copies of this AV data by recording the AV data on the hard disk apparatus 2, or the like, is prohibited.

When the CCI is 10 it means "Copy Once." That is to say, the AV data to which the CCI of this value is attached can be viewed and, furthermore, only the first generation copy of the AV data can be made by recording the AV data on the hard disk apparatus 2, or the like.

When the CCI is 01 it means "No More Copy." That is to say, the AV data copied from the AV data of which the CCI is "Copy Once" becomes of "No More Copy." Namely, this means that the making of additional copies is prohibited. That is, "No More Copy" is necessary to prohibit further copying at the time of reproduction after the content of "Copy Once" is recorded.

When the CCI is 00 it means "Copy Free." That is to say, the AV data to which this value of the CCI is attached can be freely viewed and, in addition, copies can be freely made.

A recording unit number 25 is a number and/or a symbol specific to the recording block that has the size of the recording unit that is the minimum unit when the control means 14 sequentially accesses the recording means 15. That is to say, a different recording unit number 25 is allocated to the above described different recording block. Such a recording unit number 25 is secret information that cannot be seen by the user or by an external device. The recording unit number 25 and a recording unit are described below.

Here, the recording unit number 25 of the present embodiment is an example of the recording unit information of the present invention.

The content 26 is the AV data that forms a program, such as of movies, music or of a drama.

In addition, a magnetic disk medium 29 is a magnetic disk to or from which data is written or read by the recording means 15.

The encryptor 19 is a means that reads out the device unique key 13, which is stored in the secret region 18 and that encrypts the title key 23, so as to output the encrypted title key 28.

The adder 22 is a means of generating information for generating a key wherein the CCI 24 is added so as to follow the lowest bit of the title key 23.

Here, information for generating a key according to the present embodiment is an example of the second information of the present invention.

The encryptor 20 is a means of generating a content key that is encrypted by using the recording unit number 25.

The encryptor 21 is a means of encrypting the content 26 by using the content key.

Figure 4:
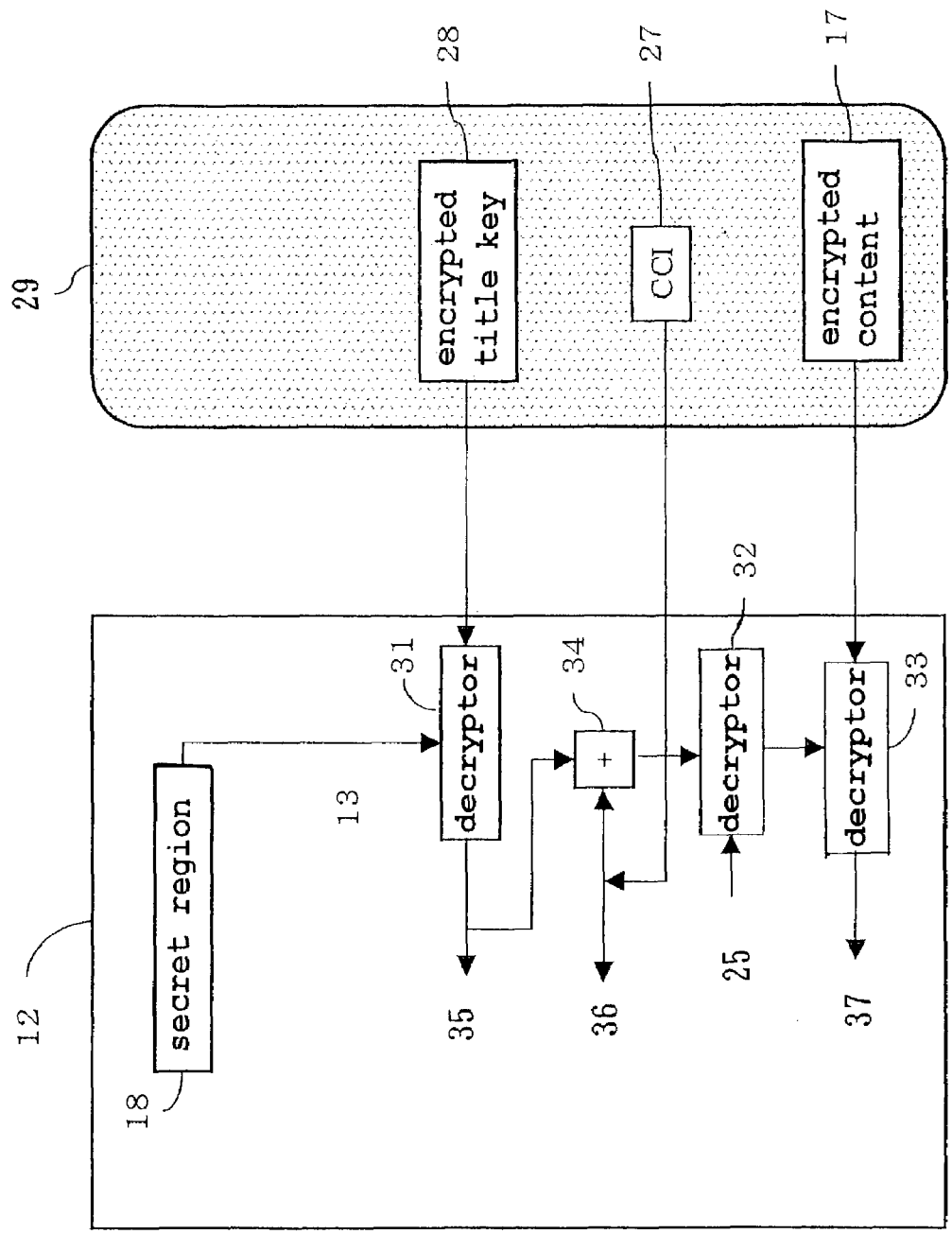
FIG. 4 is a block diagram showing the configuration of a decryption means of the hard disk apparatus according to the first embodiment of the present invention.

In addition, FIG. 4 shows the configuration of the decryption means 12.

The decryption means 12 is formed of a decryptor 31, a decryptor 32, a decryptor 33 and an adder 34.

In addition, FIG. 4 shows the device unique key 13, the title key 35, the CCI 36, the recording unit number 25 and the decrypted content 37, which, respectively, correspond to the device unique key 13, the title key 23, the CCI 24, the recording unit number 25 and the content 26 shown in FIG. 3.

In addition, the magnetic disk medium 29 is a magnetic disk of which the data is read out or written in by the recording means 15, which is the same as in FIG. 3.

The decryptor 31 is a means of reading out the device unique key 13 that is stored in the secret region 18 and of decrypting the encrypted title key 28 by using the device unique key 13 so as to output the title key 35.

The adder 34 is a means of generating information for generating a key to which the CCI 27 is added following the lowest bit of the title key 35.

The decryptor 32 is a means of generating a content key by decrypting the information for generating a key by using the recording unit number 25.

The decryptor 33 is a means of decrypting the encrypted content 17 by using the content key so as to output the decrypted content 37.

Figure 7A:
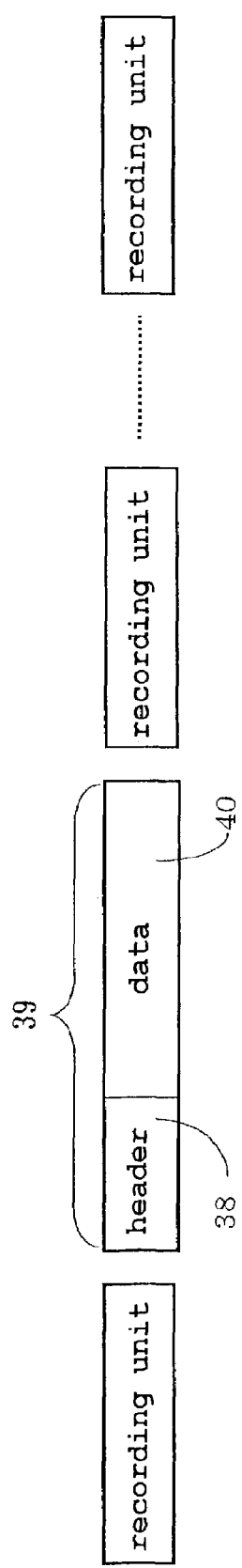
FIG. 7(a) is a diagram for describing a recording format used by the hard disk apparatus according to the first embodiment of the present invention.

FIG. 7(a) shows a recording format of the magnetic disk medium 29 of the recording means 15. The region of the magnetic disk medium 29 is divided into a plurality of recording units 39, which are recording blocks of the size of the recording unit. The control means 14 cannot access regions that are smaller than the recording unit 39 and always accesses the recording block, such as 39, from the head. That is to say, the control means 14 always writes in or reads out data to or from each recording block of the recording unit 39.

In addition, in the present embodiment, one recording unit 39 is divided into the regions of the header 38 and the data 40 for recording AV data.

The data 40 is a region in which a transport packet is recorded. In addition, the encrypted title key 35 is recorded in the header 38. The information recorded in the region of the header 38 of the recording unit 39 and the information recorded in the region of the data 40 is all encrypted.

Figure 7B:
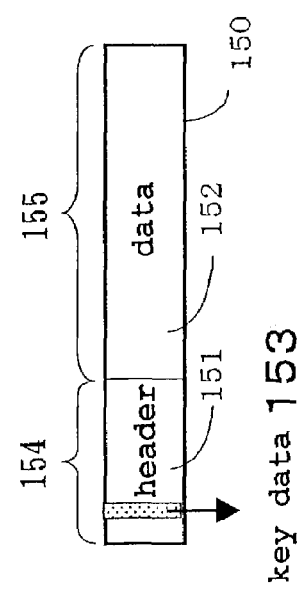
FIG. 7(b) is a diagram showing an example of a format that differs from the format of FIG. 7(a)

Here, another example wherein AV data is recorded in the recording block of the recording medium is shown in FIG. 7(b). The recording block 150 is recorded by being divided into the header 151 and the data 152 in the same manner as of the recording format of the present embodiment. However, the header 151 portion is the non-encryption 154 portion while the data 155 portion is the encryption portion. That is to say, only the data 152 portion is encrypted. Accordingly, the key 153, which is encrypted and transferred at the time when the IEEE1394 bus 1, or the like, is transferred, is recorded in the header 151 part without being encrypted. Accordingly, in the case that an external device incorrectly access the header 151 portion, the external device can gain the key 153 and, therefore, the encryption of the AV data is decrypted and the copyright thereof cannot be protected.

Contrarily, since the recording format of the present embodiment encrypts the entirety data recorded in the recording unit 39 as shown in FIG. 7 (a), the copyright can be protected without fail in comparison with the recording format as shown in FIG. 7(b).

In such a manner, the recording format of the present embodiment is specific to the manufacturer that manufactures the hard disk apparatus. Therefore, it is difficult for external devices that adopt a standard format to read out data recorded in a format specific to such a manufacturer. Accordingly, by using the recording format of the present embodiment, the copyright of the AV data recorded in the magnetic disk medium 29 can be protected. In addition, the sector size or the size of the recording unit of the recording format of the present embodiment can be freely designed.

As a concrete example of the recording unit, for example, a sector of the magnetic disk medium 29 is cited. That is to say, a predetermined number of sequential sectors can be a recording unit 39 such as one sector, sequential 62 sectors, sequential 128 sectors . . . sequential 2048 sectors.

In addition, as a concrete example of the recording unit number 25, for example, the LBA (logical block address) can be used as the recording unit number 25. That is to say, any of the LBA of the head sector of the recording unit 39, the LBA of the second sector from the head of the recording unit 39 or the Nth (N is an integer of the total number, or less, of sectors that form the recording unit) sector from the head of the recording unit 39 can be used as the recording unit number 25.

Or, a number for uniquely specifying the recording unit 39 can be utilized. That is to say, the number when the recording unit 39 is counted in the order of shifting from the inner periphery to the outer periphery of the magnetic disk medium 29 can be the recording unit number 25.

Or, an address for internal management used for managing the recording units can be utilized.

Or, a numeric value or a symbol produced by combining this plurality of examples according to a predetermined rule may be used.

In summary, the recording unit number 25 may merely be information, without overlap, that cannot be seen by the user and that can uniquely specify the entirety of the recording unit 39 of the magnetic disk medium 29.

Here, the hard disk apparatus 2 of the present embodiment is an example of a recording apparatus of the present invention, the hard disk apparatus 2 of the present embodiment is also an example of a reproduction apparatus of the present invention and a recording means of the present embodiment is also an example of a reproduction means of the present invention.

Furthermore, the I/F 4 of the present embodiment is an example of an interface of the present invention and a magnetic disk medium 29 of the present embodiment is an example of a disk of the present invention.

In addition, the controller 13, which includes the encryption means 11, the decryption means 12 and the device unique key 13, and the I/F 4 are integrated and provided on one sheet of printed circuit board. In addition, the encryption means 11, the decryption means 12, the control means 14 and the I/F 4 are, respectively, mounted as one chip LSIs. (large scale integrated). Signals in the terminals of these chips are scrambled by, for example, rearranging of the bits, according to a format that is not disclosed. Accordingly, even in the case that an external device takes out signals that can be reproduced as AV data from these terminals, it is not easy to reproduce AV data since the format that has generated the signals is not known.

Next, the operation of the present embodiment formed in such a manner is described.

First, the operation of the case wherein the hard disk apparatus 2 records AV data that requires copyright protection is described.

Here, according to the present embodiment, the AV data is sent in the MPEG2 transport stream format.

Figure 5:
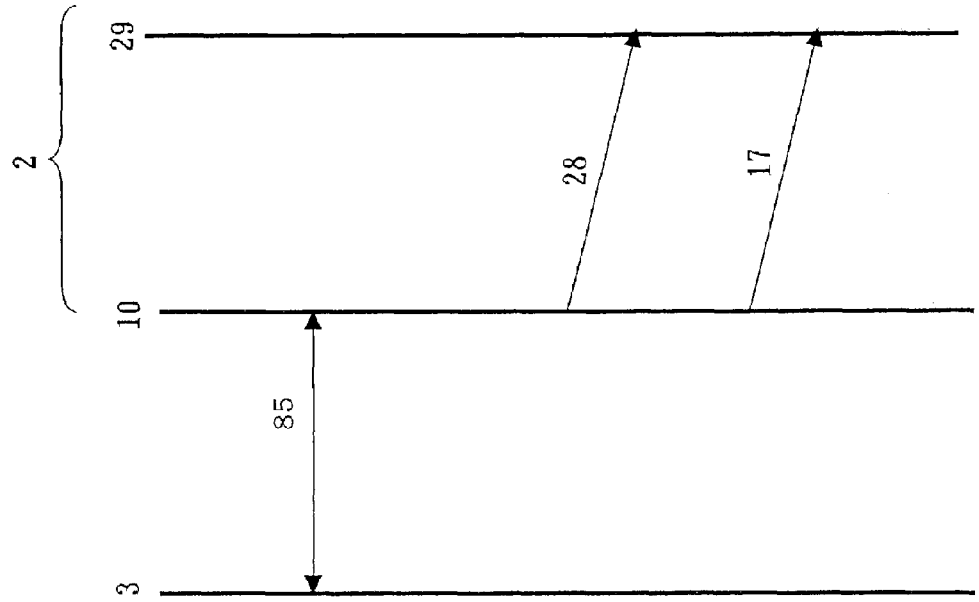
FIG. 5(a) is a flow chart showing the operation at the time of recording of the hard disk apparatus according to the first embodiment of the present invention.
FIG. 5(b) is a schematic diagram showing the operational associations at the time of the recording of the hard disk apparatus according to the first embodiment of the present invention.
Figure 5:
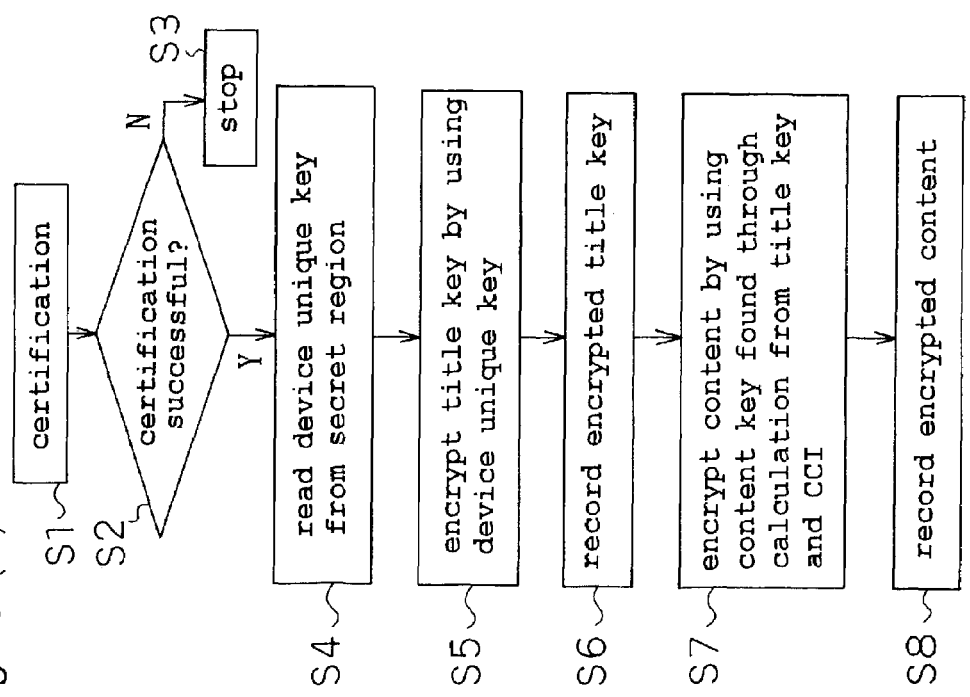

The major operations of the host system 3 and of the hard disk apparatus 2 are shown in the form of a flow chart in FIG. 5(a). In addition, the associations of the operations of the host system 3 and of the hard disk apparatus 2 are shown by using a schematic diagram in FIG. 5(b).

The host system 3 encrypts AV data, for which copyright protection is necessary, that is transmitted to the IEEE1394 bus 1 as an isochronous packet.

The I/F 16 encrypts AV data in MPEG2 transport stream format. Furthermore, a source packet is generated by adding a source packet header to the transport packet of the encrypted MPEG2 transport stream. Then, a CIP is generated by adding a CIP header to a data block from which, or to which, the source packet is divided, or combined. Moreover, an isochronous packet is generated by adding an isochronous header to the CIP and is transmitted to the IEEE1394 bus 1.

In addition, at the time when the isochronous packet is generated, the CCI 24 in FIG. 3 is added to the sy region of the isochronous packet.

The host system 3 issues a command for the starting of the recording of AV data in the hard disk apparatus 2.

This command is sent from I/F 16 to I/F 4 through the IEEE1394 bus 1 as an asynchronous packet.

When receiving the command that indicates the start of recording, the I/F 4 requires the certification from I/F 16.

Upon receiving this, the I/F 16 and the I/F 4 carry out a certification operation (S1). This certification operation is represented by certification 85 in FIG. 5(b)

The I/F 16 judges whether the hard disk apparatus 2 is a proper device or an incorrect device for recording the AV data. In the case of a proper device, the certification is successful, while in the case of an incorrect device, the certification fails (S2).

In the case that the hard disk apparatus 2 is not qualified to record AV data, the certification fails (S3). In this case, the hard disk apparatus 2 cannot record the AV data.

In the case that the hard disk apparatus 2 is a proper device that can record AV data, the certification succeeds.

When the certification is successful, the I/F 4 receives the isochronous packet transmitted by the host system 3 after identifying the isochronous channel of the isochronous packet.

Then, the I/F 4 separates the CCI from the isochronous header of the received isochronous packet.

Then, the following operations are carried out depending on the value of the CCI.

When the CCI has a binary value of 11 in FIG. 8, that is to say in the case of "Copy Never," the I/F 4 makes a notification that no recording processing is to be carried out to the host system 3 and does not instruct the controller 10 to start recording processing because it is not permitted to record the AV data.

When the CCI has a binary value of 10, that is to say in the case of "Copy Once," the I/F 4 makes a notification that recording processing is to be started to the host system 3 and, in addition, instructs the controller 10 to start recording processing.

When the CCI has a binary value of 01, that is to say in the case of "No More Copy," the I/F 4 carries out the same operation as in the case that the CCI is "Copy Never."

When the CCI has a binary value of 00, that is to say in the case of "Copy Free," a notification that recording processing to be started is made to the host system 3 and, in addition, the controller 10 is instructed so as to start recording processing.

Accordingly, in the case that the CCI has a binary value of 10, the I/F 4 decodes the encrypted AV data with the key received from the host system 3 at the time of the certification operation. Then, the decoded AV data is outputted for every transport packet according to the timing indicated by the time stamp for transmission that is added to the source packet header for every transport packet. In the case that the CCI is 00, since the AV data is sent without being encrypted, no decoding processing is carried out and the AV data is outputted for every transport packet according to the timing indicated by the time stamp for transmission.

Though the AV data outputted from the I/F 4 is decrypted in such a manner and becomes of the form of plain sentences, the AV data is outputted by the signal inscribed in a format unique to the hard disk apparatus 2 and, therefore, even in the case that a third party takes out the signal from a terminal of the chip of the I/F 4, it is very difficult to recover the AV data in a form that is useable by the third party.

The MPEG2 transport packet sent from the I/F 4 is inputted to the encryption means 11.

First, the encryptor 19 reads out the device unique key 13 stored in the secret region 18 (S4).

The encryption means 11 detects the title key 23 attached to the AV data sent from the I/F 4. Then, the encryptor 19 encrypts the detected title key 23 by means of the device unique key 13 (S5).

Next, the title key 23 encrypted by the encryptor 19 is recorded, as the title key 28 encrypted, in the magnetic disk medium 29 of the recording means 15 in accordance with the control of the control means 14 (S6). This encrypted title key 28 is shown in FIG. 5(b).

Furthermore, the encryption means 11 detects the CCI 24 that is sent attached to the AV data. The detected CCI 24 is recorded, as the CCI 27, in the magnetic disk medium 29 of the recording means 15 in accordance with the control of the control means 14.

The adder 22 generates information for key generation that is information to which the CCI 24 is attached so as to follow the lowest bit of the title key 23.

On the other hand, information related to which recording unit is to record the AV data is also sent from the control means 14 as additional information to the AV data. The encryption means 11 requires the recording unit number 25 of the recording unit that is to record the AV data.

The encryptor 20 encrypts the information for generating the key generated by the adder by using the recording unit number 25 of the recording unit that is to record the AV data. This encrypted information is referred to as a content key. The content key is encrypted according to the recording unit number 25 and varies for each recording unit.

Next, the encryptor 21 encrypts the content 26, which is the AV data to be recorded thenceforth using the content key (S7).

The encrypted AV data is recorded, as the encrypted content 17, in a recording unit of the magnetic disk medium 29, wherein the data is to be recorded, of the recording means 15, according to the control of the control means 14 (S8). FIG. 5(b) also shows the encrypted content 17.

In the following, the operation is repeated in the same manner wherein information for key generation is encrypted by the recording unit number 25 for every recording unit so as to generate a content key and the generated content key encrypts the content 26 (S7) so that the encrypted content 17 is recorded in the magnetic disk medium 29 (S8).

The hard disk medium 29 records AV data for which copyright protection is necessary in the magnetic disk medium 29 in the above manner.

Next, the operation of the case wherein the hard disk apparatus 2 reproduces AV data for which copyright protection is necessary is described.

FIG. 6(a) shows a flow chart of the main operation of the host system 3 and of the hard disk apparatus 2 at the time of reproduction. In the following, the description is given according to this flow chart. In addition, FIG. 6(b) shows a schematic diagram wherein the associations of the main operations of the host system 3 and the hard disk apparatus 2 at the time of reproduction are described.

The host system 3 issues a command that instructs the hard disk apparatus 2 to start reproduction.

This command is sent from the I/F 16 to the I/F 4 through the IEEE1394 bus 1 as an asynchronous packet.

Furthermore, the I/F 16 requires certification from the I/F 4.

By receiving this, the I/F 16 and the I/F 4 carry out the certification operation (S9). This certification operation is shown as the certification 86 in FIG. 6(*b*).

The I/F 4 judges whether the host system 3 is a proper device or is an incorrect device for utilizing the AV data. In the case of a proper device, certification is successful while in the case that of an incorrect device, certification fails (S10).

In the case that the host system 3 is not qualified to use the AV data, certification fails (S11). In this case, the host system 3 cannot record the AV data.

In the case that the host system 3 is a proper device that can record the AV data, certification is successful.

When the certification is successful, the I/F 4 makes a notification to the controller 10 that a command for reproducing the AV data has been sent.

When the decryption means 12 receives this notification, the decryptor 31 first reads in the device unique key 13 stored in the secret region 18 (S12).

Figure 6:
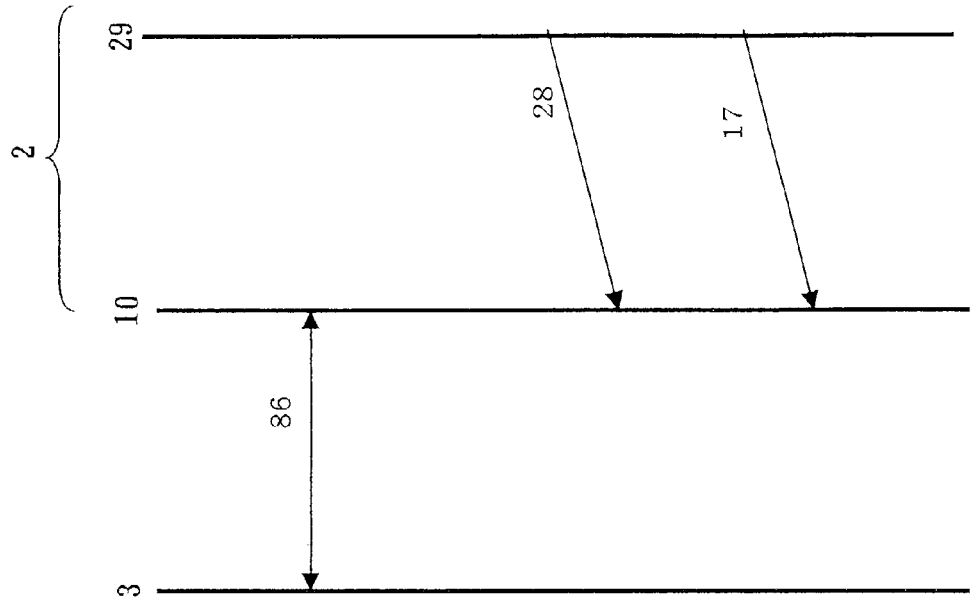
FIG. 6(a) is a flow chart showing the operation at the time of reproduction of the hard disk apparatus according to the first embodiment of the present invention.
FIG. 6(b) is a schematic diagram showing the operational associations at the time of reproduction of the hard disk apparatus according to the first embodiment of the present invention.
Figure 6:
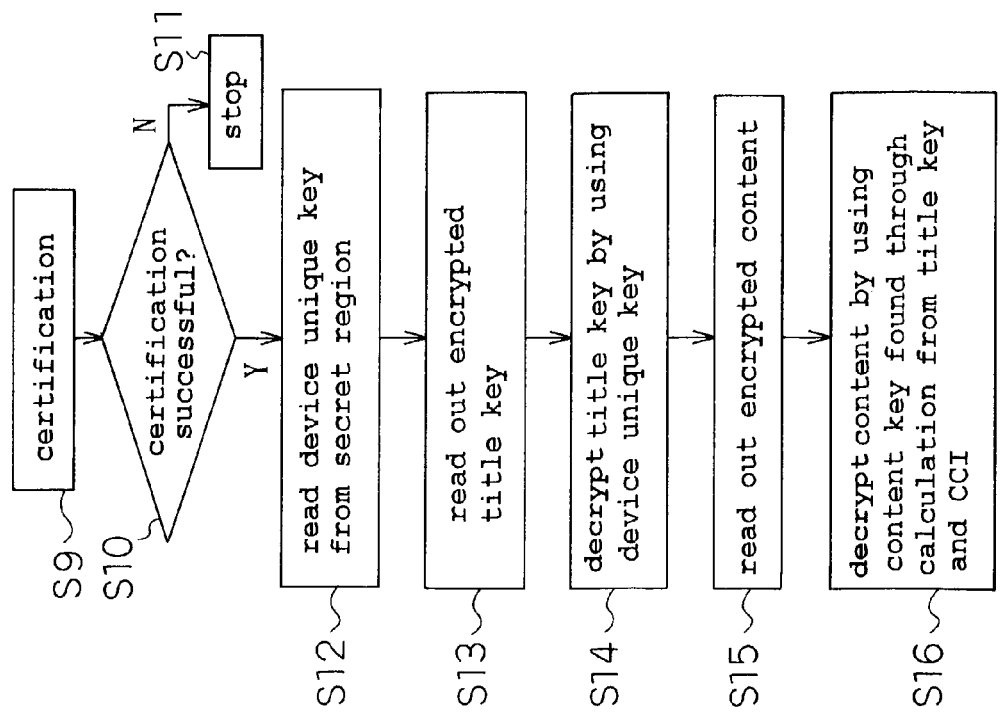

Furthermore, the recording means 15 reads out the encrypted title key 28 from the magnetic disk medium 29 according to the control of the control means 14 (S13). FIG. 6(*b*) also shows the encrypted title key 28.

The decryptor 31 decrypts the encrypted title key 28 with the device unique key 13 (S14). Then, the decryption means 12 transfers the decrypted title key 35 to the I/F 4.

The recording means 15 reads out the CCI 27 from the magnetic disk medium 29 according to the control of the control means 14.

The decryption means 12 transfers the CCI 27 to the I/F 4.

The adder 34 generates key generation information, which is information gained by attaching the CCI 27 sequentially read out to the lowest bit of the decrypted title key 35.

The control means 14 designates the recording unit 39 that is to be read out and controls the recording means 15 so as to read out the encrypted content 17, which is information stored in the recording unit 39.

The decryption means 12 finds out the recording unit number 25 of the recording unit 39.

The decryptor 32 decrypts the key generation information generated by the adder by using the recording unit number 25 of the recording unit 39 that is ready to read out data. This decrypted information referred to as a content key. The content key is decrypted by the recording unit number 25 and, therefore, it varies for each recording unit.

Next, the recording means 15 reads out the encrypted content 17, which is information stored in the recording unit, from which the data is to be read out, of the magnetic disk medium 29, according to the control of the control means 14 (S15). FIG. 6(*b*) also shows the encrypted content 17.

Next, the decryptor 33 decrypts the encrypted content 17 read out by the recording means 15 with the content key (S16).

The decryption means 12 transfers the decrypted content 37 to the I/F 4.

In the following, the operation is repeated in the same manner as above wherein information for key generation is decrypted with the recording unit number 25 for each recording unit so as to generate a content key and the encrypted content 17 is read out (S15) and the encrypted content 17 is decrypted with the content key (S16) so that the decrypted content 27 is transferred to the I/F 4 as an MPEG2 transport stream.

In addition, though the AV data outputted from the decryption means 12 is decrypted, it is a signal inscribed in a format unique to the hard disk apparatus 2 and, therefore, even a third party takes out the signal from a terminal of the chip of the decryption means 12, it is very difficult to recover the AV data in a form that is useable by the third party.

The I/F 4 encrypts the AV data sent from the controller 10. Then, the I/F 4 transfers the AV data to the IEEE1394 bus 1 as an isochronous packet.

The I/F 16 of the host system 3 identifies the isochronous channel and receives the isochronous packet so as to decode the encrypted AV data.

The I/F 16 outputs the received AV data as an MPEG2 transport stream.

The outputted AV data is separated by the transport stream decoder, which is not shown, and contained by the host system 3. Then, the AV decoder, which is not shown, carries out the AV decoding so as to convert the AV data into an analog signal that is displayed on a monitor.

The hard disk medium 29 reproduces the AV data for which copyright protection is necessary from the magnetic disk medium 29 in the above manner.

The hard disk apparatus 2 of the present embodiment can protect the copyright of the AV data, for which copyright protection is necessary, in any case wherein AV data is being recorded, wherein the AV data is being reproduced and wherein the AV data has already been recorded in the recording means 15.

Here, though the magnetic disk 29 is described to be unremovable from the hard disk apparatus 2 in the present embodiment, the invention is not limited to this but, rather, the magnetic disk may be removable.

Furthermore, though the device unique key 13 is described as being stored in a ROM as the secret region 18 on the printed circuit board of the hard disk apparatus 2 in the present embodiment, the invention is not limited to this. The secret region 18 may be provided in the magnetic disk medium 29. That is to say, the device unique key 13 may be stored in a region of the magnetic disk 29 which the user cannot access.

Furthermore, though the encrypted title key 28 is described as being recorded in the user region, which the user can access, in the magnetic disk 29 in the present embodiment, the invention is not limited to this. It may be recorded in a system region that the user cannot access in the disk medium 29. In addition, it may be recorded in a RAM provided on a printed circuit board of the hard disk apparatus 2.

Furthermore, though the recording apparatus and the reproduction apparatus of the present invention are described as being integrated with the hard disk apparatus 2 in the present embodiment, the invention is not limited to this. The recording apparatus of the present invention may be formed of the I/F 4, the encryption means 11, the control means 14 and the recording means 15 and is an apparatus that records AV data while the reproduction apparatus of the present invention may be formed of the I/F 4, the decryption means 12, the control means 14 and the recording means 15 and so on, in summary, the recording apparatus of the present invention may be provided with only an encryption means, a control means and a recording means. In addition, the reproduction apparatus of the present invention may be provided with only a decryption means and a control means.

Furthermore, though the I/F 4, the encryption means 11, the decryption means 12 and the control means 14 of the hard disk apparatus 2 are described as being formed, respectively, of one chip LSIs, the invention is not limited to this. The I/F 4, the encryption means 11, the decryption means 12 and the control means 14 may be formed, respectively, of a plurality of LSI chips. In addition, the AV data is described as being inscribed in an undisclosed format at a terminal of a chip, the invention is not limited to this but, rather, it may be encrypted so as to be transferred between terminals. In addition, the properties of the terminals of the chips may be defined in an undisclosed format. Here, the properties of the terminals of the chips represents properties such as which terminal outputs what kind of signals, which terminals are combined to output what kind of signals or which respective terminals are used for what kinds of applications. Since such properties of the terminals of the chips are defined in an undisclosed format, the user cannot know, for example, which respective terminals are used for what kinds of applications. In summary, a signal that is detected at a terminal that outputs a signal that can be reproduced as AV data by a third party from among the terminals of the printed circuit board and the terminals of the chips where the I/F 4 and the controller 10 are provided may be entirely encrypted and/or described in an undisclosed format or the properties of these terminals may merely be defined in an undisclosed.

Furthermore, the I/F 4, the encryption means 11, the decryption means 12 and the control means 14 of the hard disk apparatus 2 of the present embodiment may be formed of one LSI chip. In such a manner, the copyright of the AV data can, without fail, be made even more secure.

Furthermore, though the AV data is described in the present embodiment as being encrypted using the CCI, the invention is not limited to this. The AV data may be encrypted without using the CCI. That is to say, instead of that, the adder 22 forms in formation for the key generation of the CCI and of the title key 23, the title key 23 may be directly used as the information for key generation without using the adder 22 so that the content key may be generated by encrypting this information for the key generation with the recording unit number. Here, the title key 23 of this case is an example of the third information of the present invention. In the case that the AV data is encrypted without using the CCI in such a manner, the CCI may be recorded in the magnetic disk medium 29 as in the present embodiment or the CCI may not be recorded in the magnetic disk medium 29.

Furthermore, though the hard disk apparatus 2 in the present embodiment is described as follows: in the case that the value of the CCI that is attached to the AV data is "Copy Never," the AV data is not recorded; in the case that the value of the CCI is "Copy Once," the AV data is encrypted and is recorded; in the case that the value of the CCI is "No More Copy," the AV data is not recorded; and in the case that the value of the CCI is "Copy Free," the AV data is encrypted and is recorded, the invention is not limited to this. In any case wherein a value is taken by the CCI that is attached to the AV data, the AV data may be encrypted and recorded. Or, in the case that the value of the CCI attached to the AV data is "Copy Free," the AV data may be recorded as plain sentences without being encrypted.

Furthermore, though in the present embodiment the information for key generation is described as being information to which the read out CCI is attached so as to follow the lowest bit of the decrypted title key, the invention is not limited to this. The information for the key generation may be information to which the read out CCI is attached before the highest bit of the title key. Furthermore, the information for key generation may be information that includes only the title key and the CCI or may include the title key and the CCI and, furthermore, may include other information in addition to the above. In addition, it may be information that includes either the title key or the CCI. In summary, the information for key generation of the present embodiment may be only information that includes, at least, either the title key or the CCI.

Second Embodiment

Next, the second embodiment is described.

In the present embodiment, the process of CCI is mainly described.

FIG. 1 shows a configuration of a hard disk apparatus 2 that is one embodiment of a recording apparatus and a reproduction apparatus of the present invention.

The configuration of the hard disk apparatus 2 of the present embodiment is the same as in the first embodiment.

FIG. 9 shows a format 41 of a magnetic disk medium 29 of a recording means 15. The left side on the paper corresponds to the inner periphery 45 of the disk of the magnetic disk medium 29 while the right side on the paper corresponds to the outer periphery 46 of the disk. The region of the inner periphery 45 side of the disk is system FAT 42 while the outer periphery 46 side of the disk is data 43.

The system FAT 42 is a system region that the user cannot access and is a region such as for file management information where the control means 14 utilizes in order to control the system.

On the other hand, the data 43 is a region that the user can access and AV data is recorded. That is to say, as shown in FIGS. 3 and 4, the encrypted content 17, the encrypted title key 28, and the like, are recorded.

Then, the CCI is recorded in each recording unit that forms data 43 in the system FAT 42 as shown in the CCI data 44. That is to say, the value of the CCI is allocated for each recording unit.

In addition, the file management information includes a FAT (file allocation table) and information that is referred to as directory.

The FAT is a table wherein the address of a recording unit and the address of the next recording unit make a pair and indicates in which recording unit and in which order the data of a file is stored.

In addition, the directory is a table that manages a file in a hierarchical manner and is a table wherein the address of the head recording unit in which a file name and the data stored in the file are stored as well as information indicating the properties such as whether the file is exclusively for reading in or whether the over writing is possible make a pair.

Processing such as file formation, editing, erasing, and the like, can be managed by using the FAT and the directory.

Next, the operation of the present embodiment in such a configuration is described.

AV data is recorded in the hard disk apparatus 2 in the same manner as in the first embodiment. At this time, the AV data is recorded in each recording unit one after another in the same manner as in the first embodiment. Whenever the recording of the AV data in a new recording unit is completed, the control means 14 produces or updates the file management information that indicates in which recording unit the AV data is recorded. Then, this file management information is stored in its own memory.

Then, when the recording of the AV data is all completed, the control means 14 writes the produced or updated file management information into the system FAT 42 so as to update the system FAT 42.

Finally, the control means 14 writes the value of the CCI of the recording unit, into which the AV data is newly written, into the file management information.

Thus the AV data is first recorded in the magnetic disk medium 29 at the time when the AV data is recorded, and after the recording of the AV data is completed the management information is recorded in the magnetic disk medium 29 and finally the CCI is written into the system FAT 42.

In addition, it is assumed that the user turns off the power of the hard disk apparatus 2 by mistakenly pulling out the power plug of the hard disk apparatus 2 while the AV data is being recorded. In such a case, the portions of the file management information and the CCI that have already being recorded in the AV data that is already in recording condition are erased.

The hard disk apparatus 2 of the present embodiment reproduces the AV data, of which the recording is interrupted in such a manner, as follows.

The control means 14 determines the order in which empty recording units of the magnetic disk 29 is used for writing according to predetermined rules.

The control means 14 reproduces the AV data, of which the recording has been interrupted, from the file management information before updating by assuming that the AV data is recorded according to the above rules. Then, the encryption means 11 attempts decrypting by using a combination of the values for 2 bits of the CCI.

Then, furthermore, the AV data is decrypted from the beginning by using the values of the CCI of which the decrypting is successful.

The hard disk apparatus 2 of the present embodiment can normally decrypt the AV data, of which the recording is interrupted, in the above manner.

Furthermore, the end of the AV data is detected from the continuity of the value of PCR that is attached to the transport packet.

That is to say, the PCR is attached to the transport packet at intervals of 100 ms at the longest and the value of PCR is a counter value of the upper 33 bits and the lower 9 bits which counts up at the frequency of 27 MHz. Accordingly, when the value of PCR changes to the value corresponding to 100 ms, or more, it is understood that another piece of AV data is reproduced by exceeding the terminal of the AV data. Accordingly, the encryption means 11 transfers the AV data only in the range, where the value of PCR is continuous, to the I/F 4.

Here, though the hard disk apparatus 2 of the present embodiment is described as encrypting and decrypting in the same manner as in the first embodiment, the invention is not limited to this. Encryption differing from that in the first embodiment may be carried out. In summary, any hard disk apparatus may be used as long as it carries out encryption by using the CCI.

Moreover, though the hard disk apparatus. 2 of the present embodiment is described as attempting decrypting by assuming the value of CCI, the invention is not limited to this. The CCI may be recorded in the magnetic disk 29 before the AV data is recorded so that the CCI is always recorded in the recording means 15 even when the recording of the AV data is interrupted.

Furthermore, though the recording apparatus and the reproduction apparatus of the present invention are described as being integrated in the hard disk apparatus 2 according to the present embodiment, the invention is not limited to this. The recording apparatus of the present invention may be formed of the I/F 4, the encryption means 11, the control means 14 and the recording means 15 and may be an apparatus for recording AV data while the reproduction apparatus of the present invention may be formed of the I/F 4, the decryption means 12, the control means 14 and the recording means 15 and, in other words, the recording apparatus of the present invention may only be provided with an encryption means, a control means and a recording means. In addition, the reproduction apparatus of the present invention may only be provided with a decryption means and a control means.

Furthermore, though the present embodiment is described such that the file management information includes FAT and the directory, the invention is not limited to this. File management information such as the HPFS (high performance file system) in OS/2, the file system of Mac OS, the i node in UNIX, the VFAT (virtual FAT) in Windows 95, the NTFS (new technology file system) of Windows NT, or the like, maybe used. Here, in this case, it is necessary for the recording unit described in the first embodiment to be agreed with the recording block of these types of file management information. In summary, file management information in the OS that allows recording in and reproduction from a hard disk may be used.

Third Embodiment

Next, the third embodiment is described.

Figure 10:
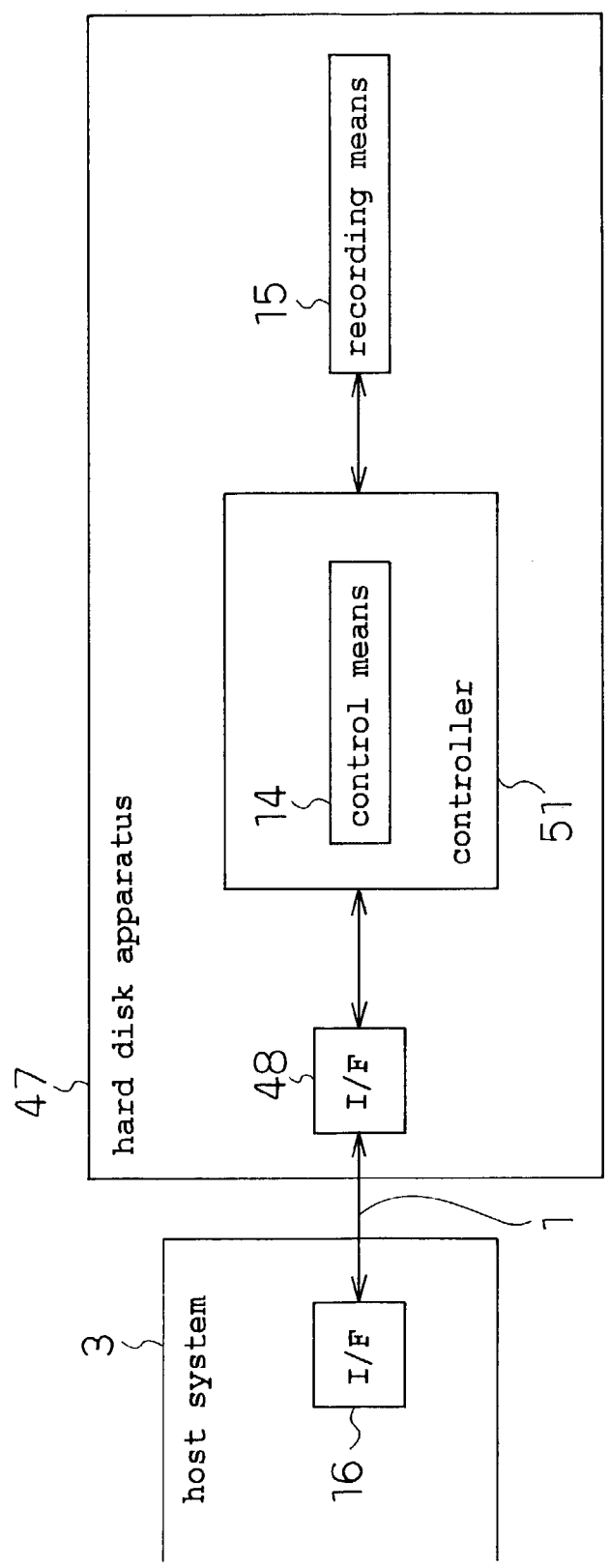
FIG. 10 is a block diagram showing the configuration of a hard disk apparatus according to the third embodiment of the present invention.

FIG. 10 shows a configuration of a hard disk apparatus 47 that is one embodiment of a recording apparatus and a reproduction apparatus of the present invention.

The hard disk apparatus 47 of the present embodiment is provided with an I/F 48 in place of the I/F 4 of the first embodiment. In addition, a controller 51 of the present embodiment does not have the encryption means 11, the decryption means 12 and the device unique key 13.

The I/F 48 is an interface, which does not decrypt the encrypted AV data sent from the IEEE 1394 bus 1 and transfers it to the controller 51, and which transfers the encrypted AV data sent from the controller 51 to the IEEE 1394 bus 1 without change. Other parts are the same as of the I/F 4 of the first embodiment.

Next, the operation of the hard disk apparatus 47 of the present embodiment in the above configuration is described primarily in reference to the points differing from the operation in the first embodiment.

First, the operation at the time of recording AV data is described.

The I/F 16 and the I/F 48 carries out a certification operation in the same manner as in the first embodiment and, then, the certification is assumed to be successful. Then, the I/F 48 identifies an isochronous channel and receives an isochronous packet sent from the host system 3.

Then, an MPEG 2 transport stream is reconstructed from the isochronous packet. Then, the transport packet is sequentially transferred to the controller 51.

The control means 14 controls the recording means 15 to record the encrypted AV data in the magnetic disk 29.

Other parts are the same as in the first embodiment.

The hard disk apparatus 47 of the present embodiment recodes the encrypted AV data without change in the above manner.

Next, the operation at the time when the encrypted AV data is reproduced is described.

The I/F 16 and the I/F 48 carries out the certification operation in the same manner as in the first embodiment and, then, the certification is assumed to be successful. Then, the control means 14 controls the recording means 15 to read out the encrypted AV data and, then, the controller 51 transfers the read out AV data to the I/F 48 as the MPEG 2 transport stream.

The I/F 48 transfers the encrypted MPEG 2 transport stream to the IEEE 1394 bus 1 as an isochronous packet.

All other parts are the same as in the first embodiment.

The hard disk-apparatus 47, having a simple configuration, can protect the copy right of AV data by recording or reproducing the AV data, which is encrypted for transmission, without change.

Fourth Embodiment

Next, the fourth embodiment is described.

FIG. 1 shows a hard disk apparatus 2 that is one embodiment of a recording apparatus and a reproduction apparatus of the present invention. The hard disk apparatus 2 of the present embodiment has another encryption means and another decryption means in place of the encryption means 11 and the decryption means 12 of the hard disk apparatus 2 described in the first embodiment.

Figure 11:
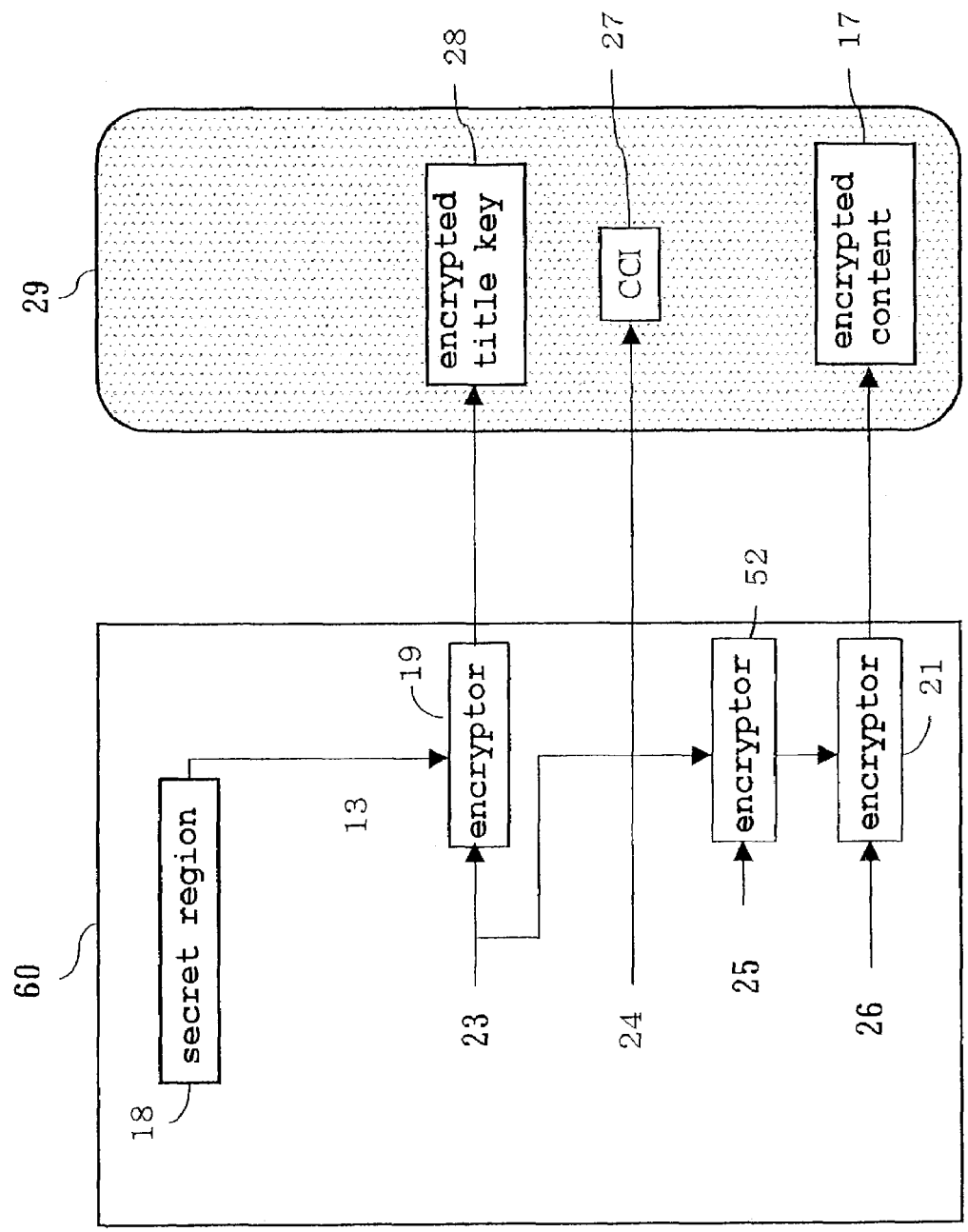
FIG. 11 is a block diagram showing the configuration of an encryption means of the hard disk apparatus according to the fourth embodiment of the present invention.
Figure 12:
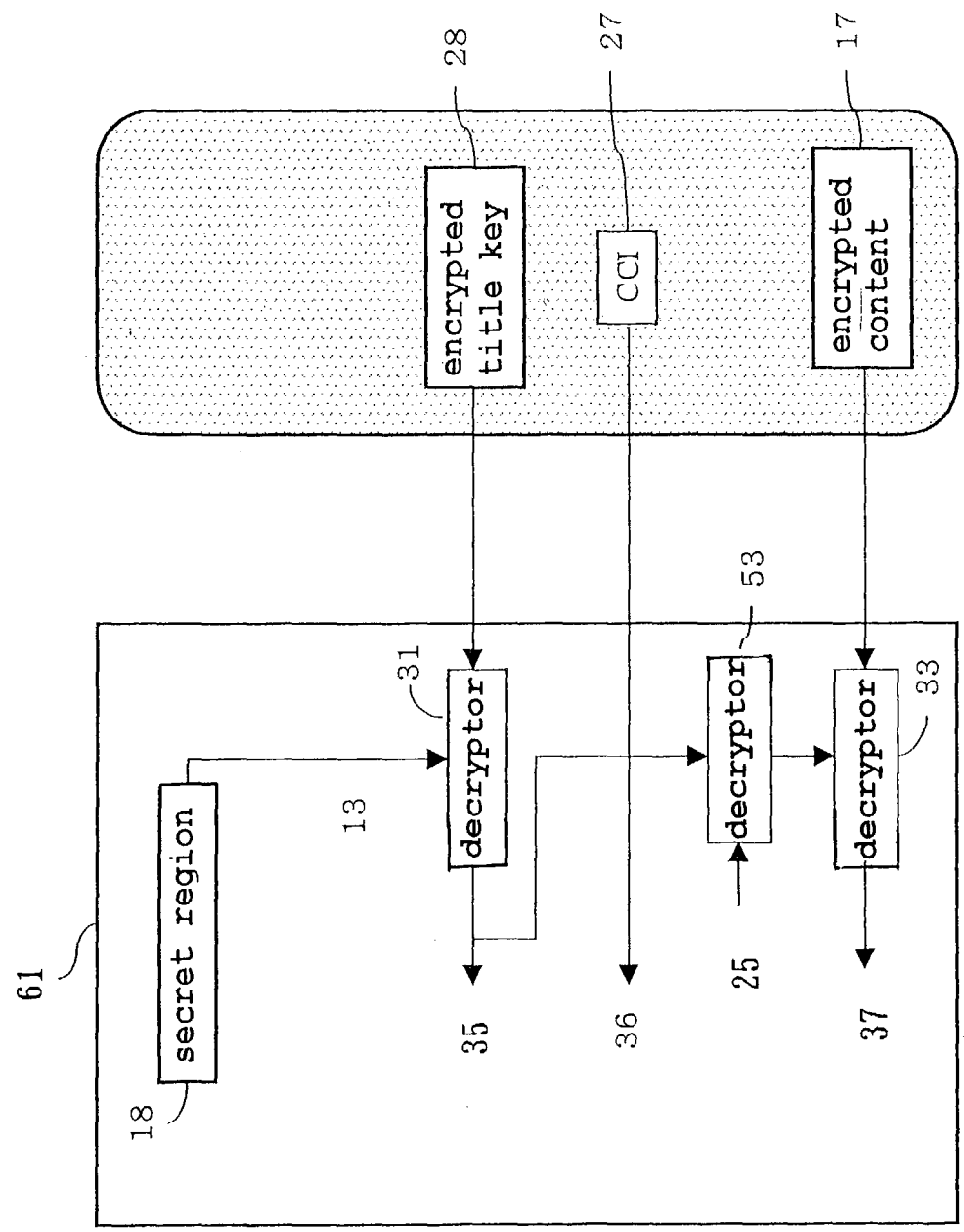
FIG. 12 is a block diagram showing the configuration of a decryption means of the hard disk apparatus according to the fourth embodiment of the present invention.

FIG. 11 shows an encryption means 60 of the hard disk apparatus 2 of the present embodiment. In addition, FIG. 12 shows a decryption means 61 of the present embodiment.

The present embodiment is described primarily in reference to the encryption means 60 and the decryption means 61 that differ from those in the first embodiment.

In FIG. 11, the encryption means 60 is formed of an encryptor 19, an encryptor 52 and an encryptor 21. That is to say, the encryption means 60 differs from the encryption means 11 of the first embodiment and does not use the CCI for encryption.

That is to say, the encryptor 19 is a means of reading in the device unique key 13 that is stored in the secret region 18 and of encrypting the title key 23 so that the encrypted title key 28 is outputted.

Here, the title key 23 of the present embodiment is an example of the first information of the present invention.

The encryptor 52 is a means of generating a content key that is gained by encrypting the title key 23 by using the recording unit number 25.

The encryptor 21 is a means of encrypting the content 26 by using a content key.

FIG. 12 shows a decryption means 61 of the hard disk apparatus 2 of the present embodiment.

In FIG. 12, the decryption means 61 is formed of a decryptor 31, a decryptor 53 and a decryptor 33. The decryption means 61 differs from that of the first embodiment and does not use the CCI for decrypting.

That is to say, the decryptor 31 is a means of reading in the device unique key 13 that is stored in the secret region 18 and of decrypting the encrypted title key 28 by using the device unique key 13 so that the title key 35 is outputted.

Here, the title key 28 of the present embodiment is an example of the second information of the present invention.

The decryptor 53 is a means of decrypting the title key 35 by using the recording unit number 25 so as to generate a content key.

The decryptor 33 is a means of decrypting the encrypted contents 17 by using a content key so as to output the decrypted content 37.

Next, the operation of the present embodiment in such a configuration is described primarily in reference to the operations of the encryption means 60 and the decryption means 61 that differ from those of the first embodiment.

First, the operation of the encryption means 60 is described.

The encryptor 19 reads in the device unique key 13 stored in the secret region 18.

The encryption means 60 detects the title key 23 that is added to the AV data sent from the I/F 4. Then, the encryptor 19 encrypts the detected title key 23 by means of the device unique key 13.

Next, the title key 23 encrypted by the encryptor 19 is recorded according to the control of the control means 14 in the same manner as of the encrypted title key 28 in the magnetic disk medium 29 of the recording means 15.

Furthermore, the encryption means 60 detects the CCI 24 that is sent by being added to the AV data. The detected CCI 24 is recorded in the magnetic disk medium 29 of the recording means 15 as the CCI 27 according to the control of the control means 14.

The encryption means 60 finds the recording unit number 25 of the recording unit in which the CCI is recorded.

The encryptor 52 encrypts the title key 23 by using the recording unit number 25 of the recording unit in which the AV data is to be recorded. This encrypted information is referred to as content key. The content key is encrypted by using the recording unit number 25 and varies for each recording unit.

Next, the encryptor 21 encrypts the content 26 that is the AV data to be recorded by using the content key.

The encrypted AV data is recorded, as the encrypted contents 17, in the recording unit, wherein it is to be recorded, of the magnetic disk medium 29 of the recording means 15 according to the control of the control means 14.

In the following the operation is repeated wherein the title key 23 is encrypted by using the recording unit number 25 for each recording unit so as to generate a content key in the same manner as the above and the generated content key is used to encrypt the content 26 so that the encrypted content 17 is recorded in the magnetic disk medium 29.

Thus the hard disk medium 29 records the AV data, of which the copyright protection is necessary, in the magnetic disk medium 29.

Next, the operation of the decryption means 61 is described.

The decryptor 31 reads in the device unique key 13 stored in the secret region 18.

Furthermore, the recording means 15 reads out the encrypted title key 28 from the magnetic disk medium 29 according to the control of the control means 14.

The decryptor 31 decrypts the encrypted title key 28 by means of the device unique key 13. Then, the decryption means 61 transfers the decrypted title key 35 to the I/F 4.

The recording means 15 reads out the CCI 27 from the magnetic disk medium 29 according to the control of the control means 14.

The decryption means 12 transfers the CCI 27 to the I/F 4.

The control means 14 designates the recording unit 39 from which the encrypted content 17 is to be read out and controls the recording means 15 to read out the content 17 that is the information stored in the recording unit 39.

The decryption means 61 finds the recording unit number 25 of the recording unit 39.

The decryptor 53 decrypts the title key 35 by using the recording unit number 25 of the recording unit 39 from which data is to be read out. This decrypted information is referred to as content key. Since the content key is decrypted by using the recording unit number 25, it varies for each recording unit.

Next, the recording means 15 reads out the encrypted content 17 that is the information stored in the recording unit, from which the information is to be read out, of the magnetic disk medium 29 according to the control of the control means 14.

Next, the decryptor 33 decrypts the encrypted content 17 read out by the recording means 15 by using the content key.

The decryption means 61 transfers the decrypted content 37 to the I/F 4.

In the following, the operation is repeated in the same manner, wherein the title key 35 is decrypted for each recording unit by using the recording unit number 25 so as to generate a content key, wherein the encrypted content 17 is read out and wherein the encrypted content 17 is decrypted by using the content key so. that the decrypted content 27 is transferred to the I/F 4 as an MPEG 2 transport stream.

The same effects as in the first embodiment can be gained by using the encryption means 60 and the decryption means 61, which are described in the present embodiment, in the hard disk apparatus 2.

In addition, the encryption means 60 and the decryption means 61 can of course be applied to a variety of modifications described in the first embodiment.

Fifth Embodiment

Next, the fifth embodiment is described.

FIG. 1 shows a hard disk apparatus 2 that is one embodiment of a recording apparatus and a reproduction apparatus of the present invention. The hard disk apparatus 2 of the present embodiment has another encryption means and another decryption means in place of the encryption means 11 and the decryption means 12 of the hard disk apparatus 2 described in the first embodiment.

Figure 13:
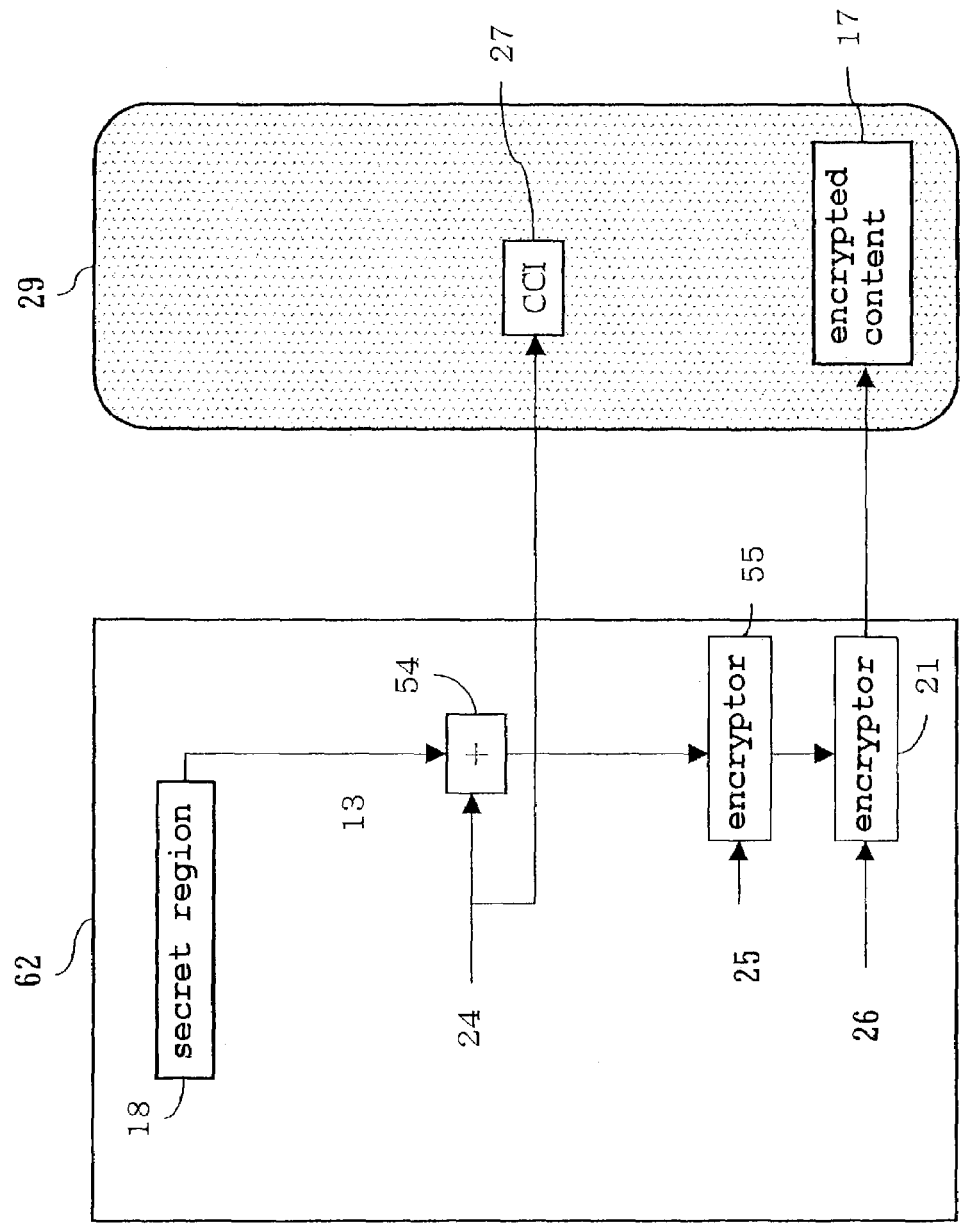
FIG. 13 is a block diagram showing the configuration of an encryption means of the hard disk apparatus according to the fifth embodiment of the present invention.
Figure 14:
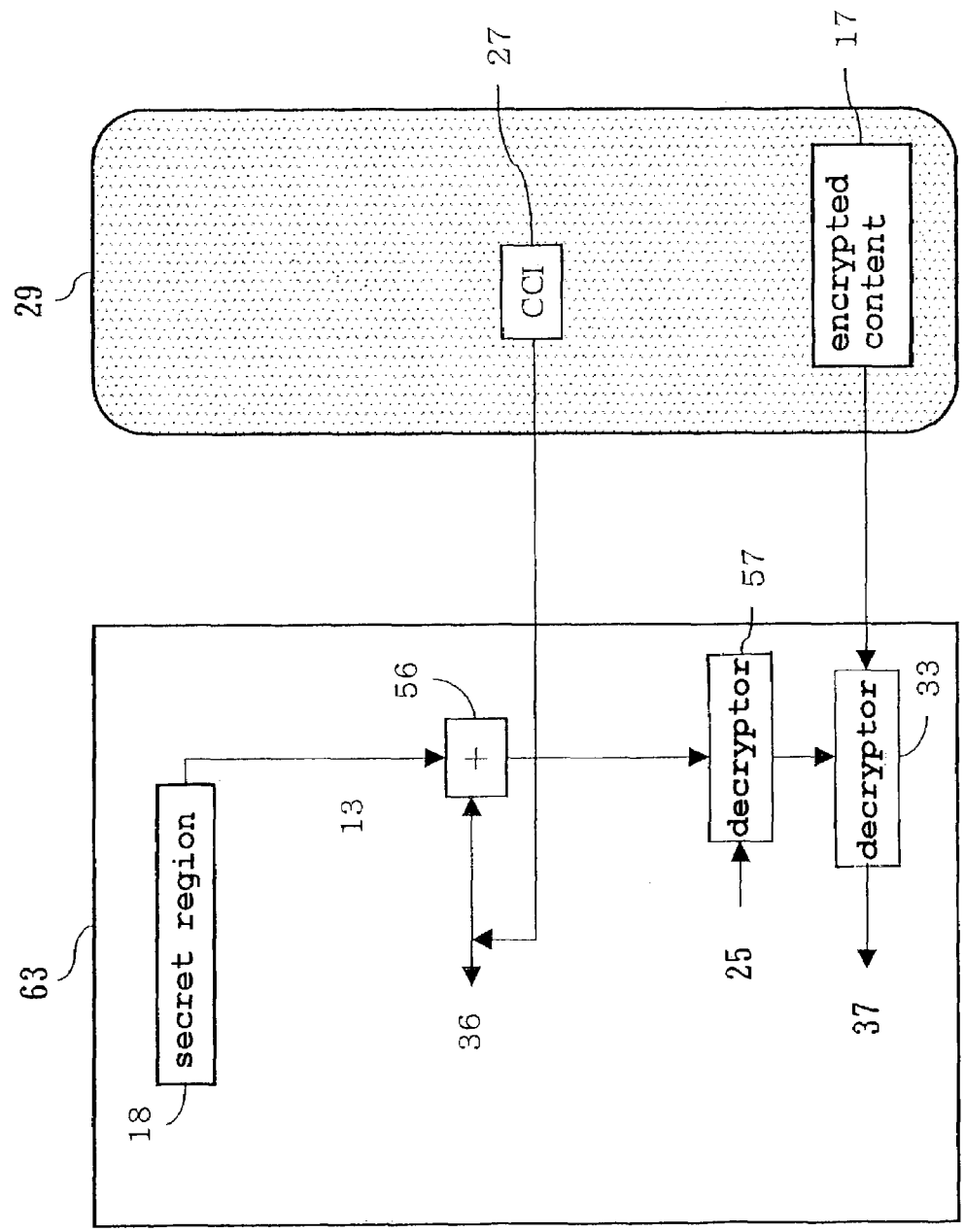
FIG. 14 is a block diagram showing the configuration of a decryption means of the hard disk apparatus according to the fifth embodiment of the present invention.

FIG. 13 shows an encryption means 62 of the hard disk apparatus 2 of the present embodiment. In addition, FIG. 14 shows a decryption means 63 of the present embodiment.

The present embodiment is described primarily in reference to the encryption means 62 and the decryption means 63 that differ from those of the first embodiment.

In FIG. 13, the encryption means 62 are formed of an adder 54, an encryptor 55 and an encryptor 21. The encryption means 62 of the present embodiment differs from the encryption means 11 and does not use a title key for the encryption of the AV data.

That is to say, the adder 54 is a means of generating information for key generation to which the CCI 24 is added so as to follow the lower bit of the device unique key 13.

Here, the information for key generation of the present embodiment is an example of the first information of the present invention.

The encryptor 55 is a means of generating a content key that is gained by encrypting the information for key generation using the recording unit number 25.

The encryptor 21 is a means of encrypting the content 26 by using a content key.

FIG. 14 shows a decryption means 63 of the hard disk apparatus 2 of the present embodiment.

In FIG. 14, the decryption means 13 is formed of an adder 56, a decryptor 57 and a decryptor 33.

The adder 56 is a means of reading in the device unique key 13 stored in the secret region 18 and of generating information for key generation to which the CCI 36 is added so as to follow the lower bit of the device unique key 13.

The decryptor 57 is a means of decrypting the information for key generation by using the recording unit number 25 so as to generate a content key.

The decryptor 33 is a means of decrypting the encrypted content 17 by using a content key so as to output the decrypted content 37.

Next, the operation of the present embodiment in such a configuration is described primarily in reference to the operations of the encryption means 62 and the decryption means 63 that differ from the first embodiment.

First, the operation of the encryption means 62 is described.

The adder 54 reads in the device unique key 13 stored in the secret region 18. Then, information for key generation to which the CCI 24 is added so as to follow the lower bit of the device unique key 13 is generated.

Furthermore, the encryption means 62 detects the CCI 24 that is sent by being attached to the AV data. The detected CCI 24 is recorded, as the CCI 27, in the magnetic disk medium 29 of the recording means 15 according to the control of the control means 14.

Then, the adder 54 generates information for key generation to which the CCI 24 is added so as to follow the lower bit of the device unique key 13.

The encryption means 62 finds the recording unit number 25 of the recording unit in which data is to be recorded.

The encryptor 55 encrypts the information for key generation by using the recording unit number 25 of the recording unit in which the AV data is to be recorded. This encrypted information is referred to as a content key. Since the content key is encrypted by using the recording unit number 25, it varies for each recording unit.

Next, the encryptor 21 encrypts the content 26 that is the AV data to be recorded by using the content key.

The encrypted AV data is recorded, as the encrypted content 17, in the recording unit, wherein the data is to be recorded, of the magnetic disk medium 29 of the recording means 15 according to the control of the control means 14.

In the following, the operation is repeated in the same manner wherein the information for key generation is encrypted for each recording unit by using the recording unit number 25 so as to generate a content key and the generated content key is used to encrypt the content 26 so that the encrypted content 17 is recorded in the magnetic disk medium 29.

Thus the hard disk medium 29 records the AV data, of which the copyright protection is necessary, in the magnetic disk medium 29.

Next, the operation of the decryption means 63 is described.

The adder 56 reads in the device unique key 13 stored in the secret region 18.

The recording means 15 reads out the CCI 27 from the magnetic disk medium 29 according to the control of the control means 14.

The decryption means 63 transfers the CCI 27 to the I/F 4.

The adder 56 generates information for key generation to which the CCI 27 is added so as to follow the lower bit of the device unique key 13.

The control means 14 designates the recording unit 39 from which the encrypted content 17 is to be read out and controls the recording means 15 to read out the content 17 that is the information stored in the recording unit 39.

The decryption means 63 finds the recording unit number 25 of the recording unit 39.

The decryptor 57 decrypts the information for key generation by using the recording unit number 25 of the recording unit 39 from which data is to be read out. This decrypted information is referred to as content key. Since the content key is decrypted by the recording unit number 25, it varies for each recording unit.

Next, the recording means 15 reads out the encrypted content 17 that is the information stored in the recording unit, from which the information is to be read out, of the magnetic disk medium 29 according to the control of the control means 14.

Next, the decryptor 33 decrypts the encrypted content 17 read out by the recording means 15 using the content key.

The decryption means 63 transfers the decrypted content 37 to the I/F 4.

In the following, the operation is repeated in the same manner wherein the information for key generation is decrypted for each recording unit by using the recording unit number 25 so as to generate a content key, wherein the encrypted content 17 is read out so that the encrypted content 17 is decrypted by using the content key and wherein the decrypted content 27 is transferred to the I/F 4 as an MPEG 2 transport stream.

The same effects as in the first embodiment can be gained by using the encryption means 62 and the decryption means 63, which are described in the present embodiment, in the hard disk apparatus 2.

In addition, the encryption means 62 and the decryption means 63 can of course be applied to a variety of modifications described in the first embodiment.

Sixth Embodiment

Next, the sixth embodiment is described.

FIG. 1 shows a hard disk apparatus 2 that is one embodiment of a recording apparatus and a reproduction apparatus of the present invention. The hard disk apparatus 2 of the present embodiment has another encryption means and another decryption means in place of the encryption means 11 and the decryption means 12 of the hard disk apparatus 2 described in the first embodiment.

Figure 15:
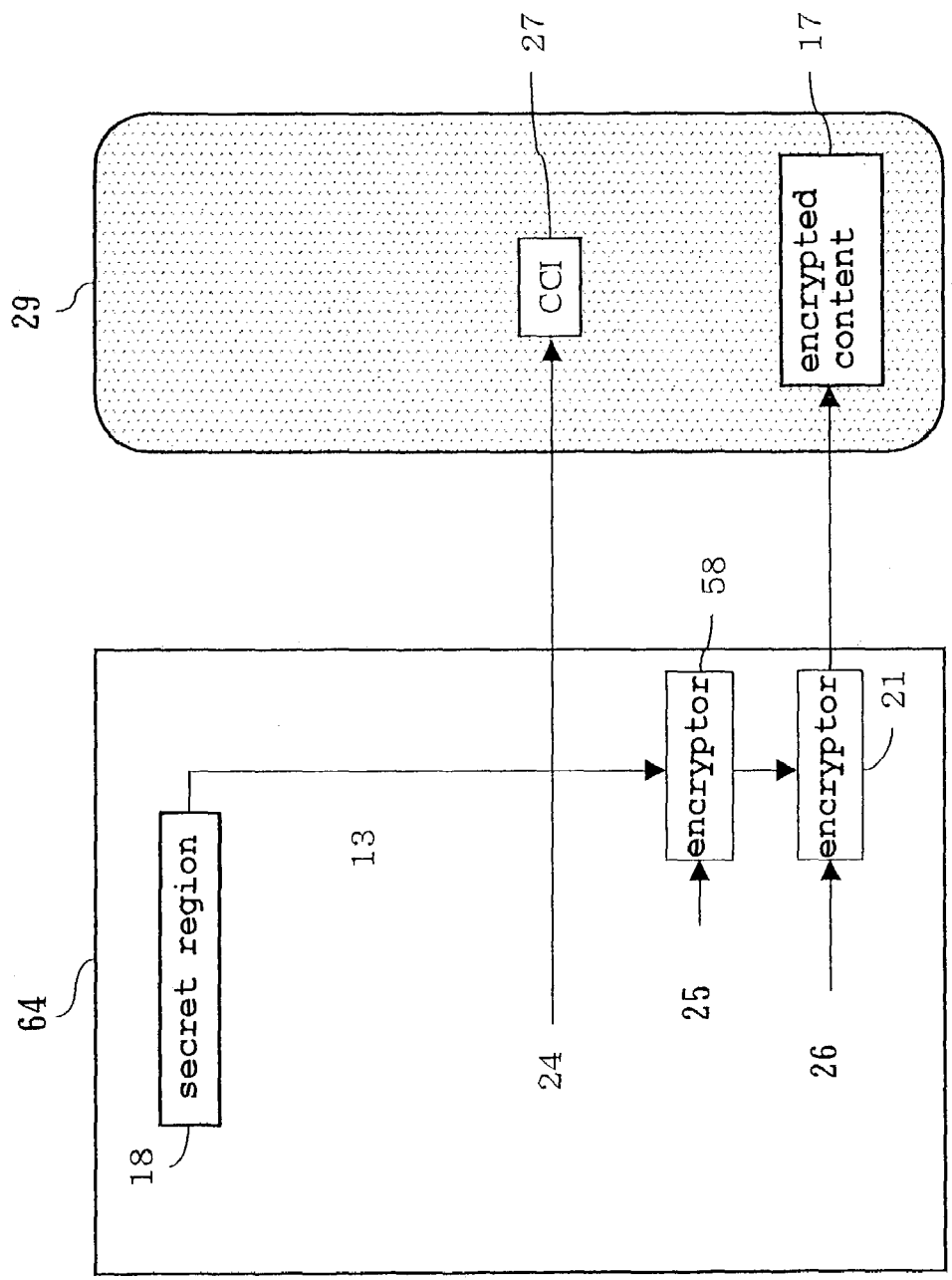
FIG. 15 is a block diagram showing the configuration of an encryption means of the hard disk apparatus according to the sixth embodiment of the present invention.
Figure 16:
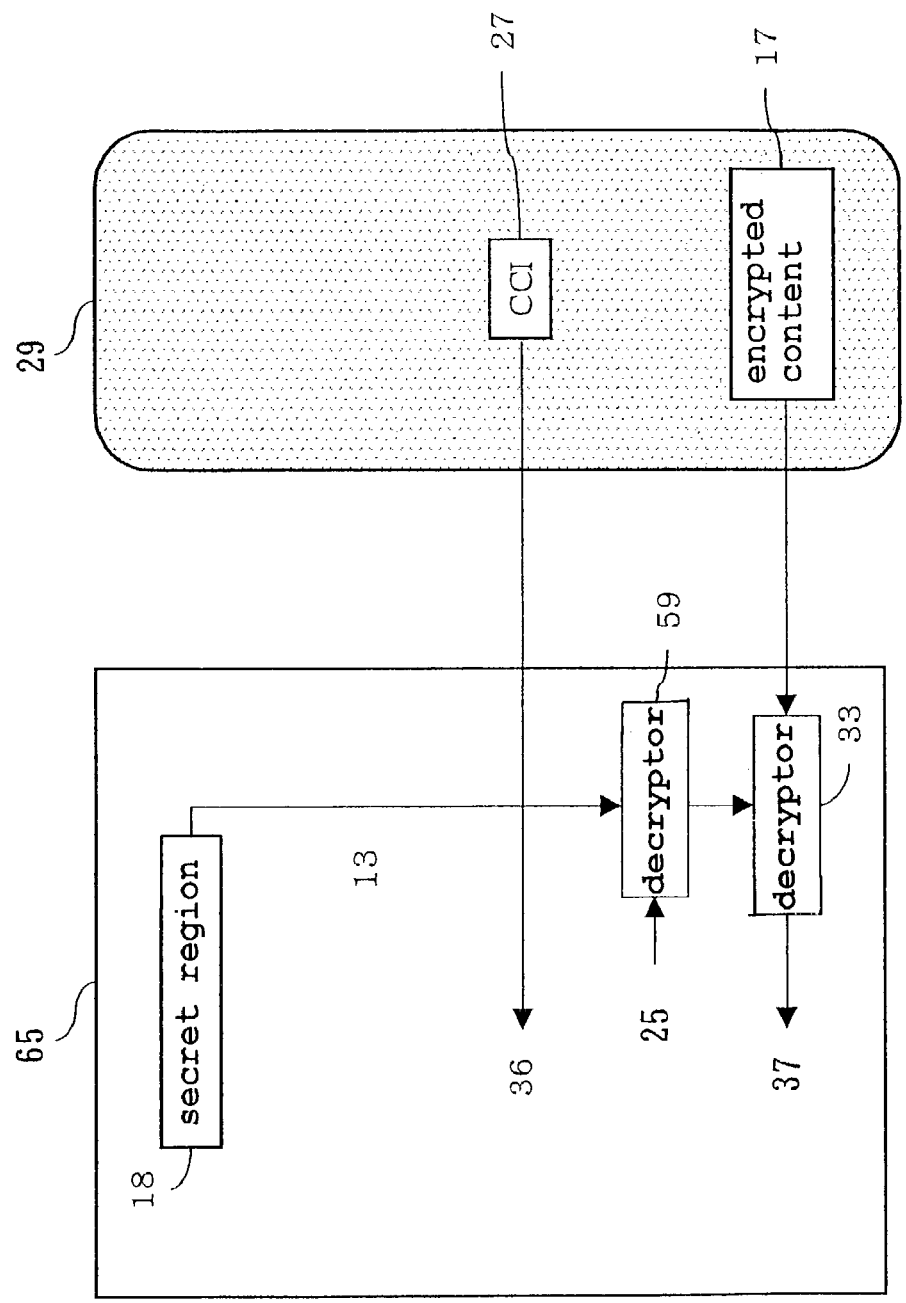
FIG. 16 is a block diagram showing the configuration of a decryption means of the hard disk apparatus according to the sixth embodiment of the present invention.

FIG. 15 shows an encryption means 64 of the hard disk apparatus 2 of the present embodiment. In addition, FIG. 16 shows a decryption means 65 of the present embodiment.

The present embodiment is described primarily in reference to the encryption means 64 and the decryption means 65 that differ from those of the first embodiment.

In FIG. 15, the encryption means 64 is formed of an encryptor 58 and an encryptor 21. The encryption means 64 of the present embodiment differs from the encryption means 11 and does not use the title key and the CCI for the encryption of the AV data.

That is to say, the encryptor 58 is a means of generating a content key that is gained by encrypting the device unique key 13 using the recording unit number 25.

Here, the device unique key 13 of the present embodiment is an example of the first information of the present invention.

The encryptor 21 is a means of encrypting the content 26 by using a content key.

FIG. 16 shows the decryption means 65 of the hard disk apparatus 2 of the present embodiment.

In FIG. 16, the decryption means 65 is formed of a decryptor 59 and a decryptor 33.

The decryptor 59 is a means of decrypting the device unique key 13 by using the recording unit number 25 so as to generate a content key.

The decryptor 33 is a means of decrypting the encrypted content 17 by using the content key so as to output the decrypted content 37.

Next, the operation of the present embodiment in such a configuration is described primarily in reference to the operations of the encryption means 64 and the decryption means 65 that differ from those of the first embodiment.

First, the operation of the encryption mean 64 is described.

The encryption means 64 detects the CCI 24 that is sent by being added to the AV data. The detected CCI 24 is recorded, as the CCI 27, in the magnetic disk medium 29 of the recording means 15 according to the control of the control means 14.

The encryptor 58 reads out the device unique key 13 from the secret region 18.

The encryption means 64 finds the recording unit number 25 of the recording unit in which the CCI is to be recorded.

The encryptor 58 encrypts the disk unique key 13 by using the recording unit number 25 of the recording unit in which the AV data is to be recorded. This encrypted information is referred to as content key. Since the content key is encrypted by using the recording unit number 25, it varies for each recording unit.

Next, the encryptor 21 encrypts the content 26 that is the AV data to be recorded by using the content key.

The encrypted AV data is recorded, as the encrypted content 17, in the recording unit, wherein the data is to be recorded, of the magnetic disk medium 29 of the recording means 15 according to the control of the control means 14.

In the following, the operation is repeated in the same manner, wherein the device unique key 13 is encrypted for each recording unit by using the recording unit number 25 so as to generate a content key, wherein the generated content key is used to encrypt the content 26 and wherein the encrypted content 17 is recorded in the magnetic disk medium 29.

The AV data, of which the copyright protection is necessary, is recorded in the magnetic disk medium 29 in such a manner.

Next, the operation of the decryption means 63 is described.

The decryptor 59 reads in the device unique key 13 stored in the secret region 18.

The recording means 15 reads out the CCI 27 from the magnetic disk medium 29 according to the control of the control means 14.

The decryption means 65 transfers the CCI 27 to the I/F 4.

The control means 14 designates the recording unit 39, from which the CCI is to be read out, and controls the recording means 15 to read out the encrypted content 17 that is the information stored in the recording unit 39.

The decryption means 63 finds the recording unit number 25 of the recording unit 39.

The decryptor 59 decrypts the device unique key by using the recording unit number 25 of the recording unit 39 from which data is to be read out. This decrypted information is referred to as content key. Since the content key is recorded by using the recording unit number 25, it varies for each recording unit.

Next, the recording means 15 reads out the encrypted content 17 that is the information stored in the recording unit, from which the information is read out, of the magnetic disk medium 29 according to the control of the control means 14.

Next, the decryptor 33 decrypts the encrypted content 17 read out by the recording means 15 using the content key.

The recording means 63 transfers the decrypted content 37 to the I/F 4.

In the following, the operation is repeated in the same manner wherein the device unique key 13 is decrypted for each recording unit by using the recording unit number 25 so as to generate a content key, wherein the encrypted content 17 is read out so that the encrypted content 17 is decrypted by using the content key and wherein the decrypted content 27 is transferred to the I/F 4 as an MPEG 2 transport stream.

The decryption means 65 decrypts the encrypted content 17 in such a manner.

The same effects as of the first embodiment can be gained by using the encryption means 64 and the decryption means 65, which are described in the present embodiment, in the hard disk apparatus 2.

In addition, the encryption means 64 and the decryption means 65 can of course be applied to a variety of modifications described in the first embodiment.

Figure 17:
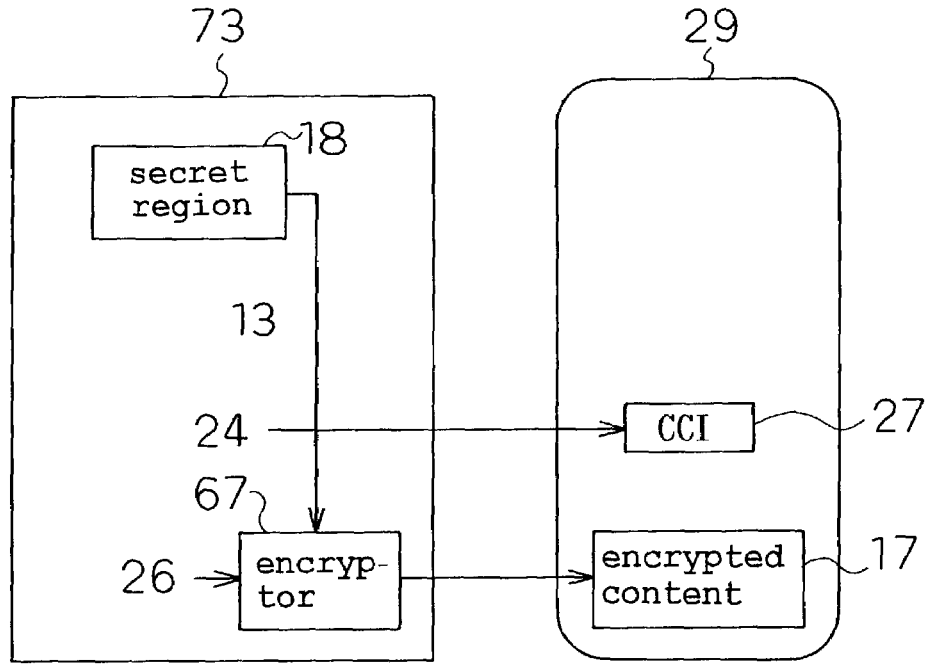
FIG. 17(a) is a block diagram showing the configuration of an encryption means of a hard disk apparatus according to an embodiment of the present invention.
FIG. 17(b) is a block diagram showing the configuration of a decryption means of a hard disk apparatus according to an embodiment of the present invention.
Figure 17:
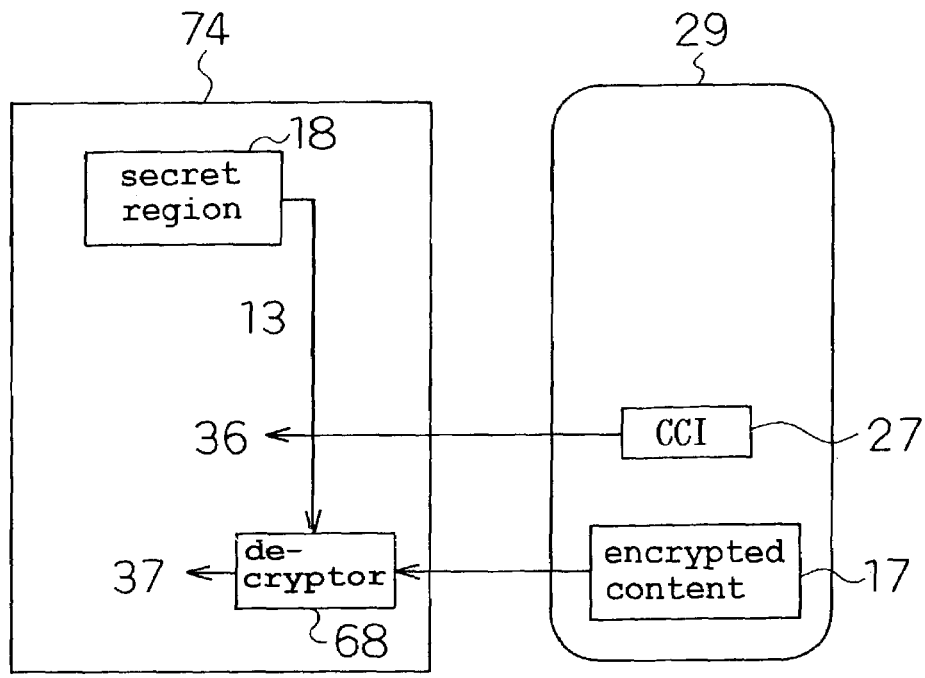
Figure 18:
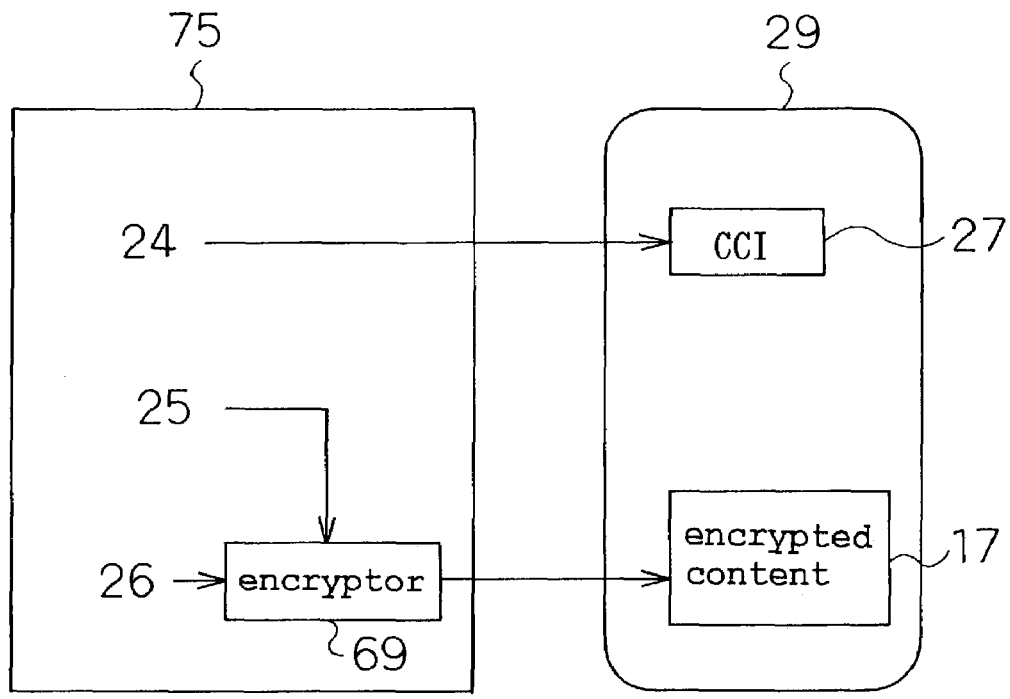
FIG. 18(a) is a block diagram showing the configuration of an encryption means of a hard disk apparatus according to an embodiment of the present invention.
FIG. 18(b) is a block diagram showing the configuration of a decryption means of a hard disk apparatus according to an embodiment of the present invention.
Figure 18:
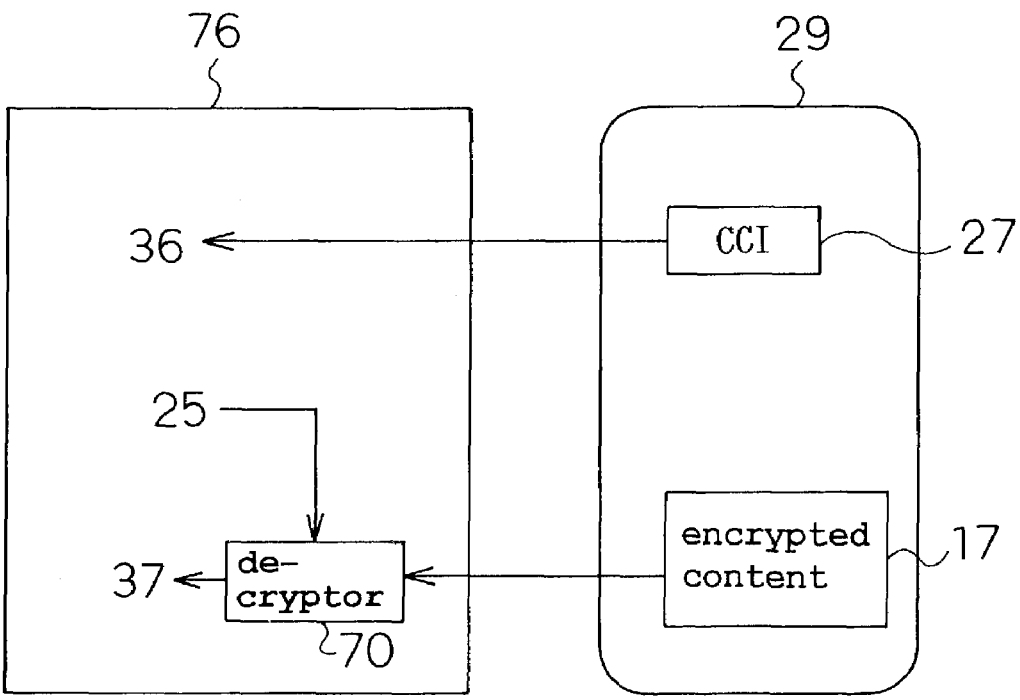
Figure 19:
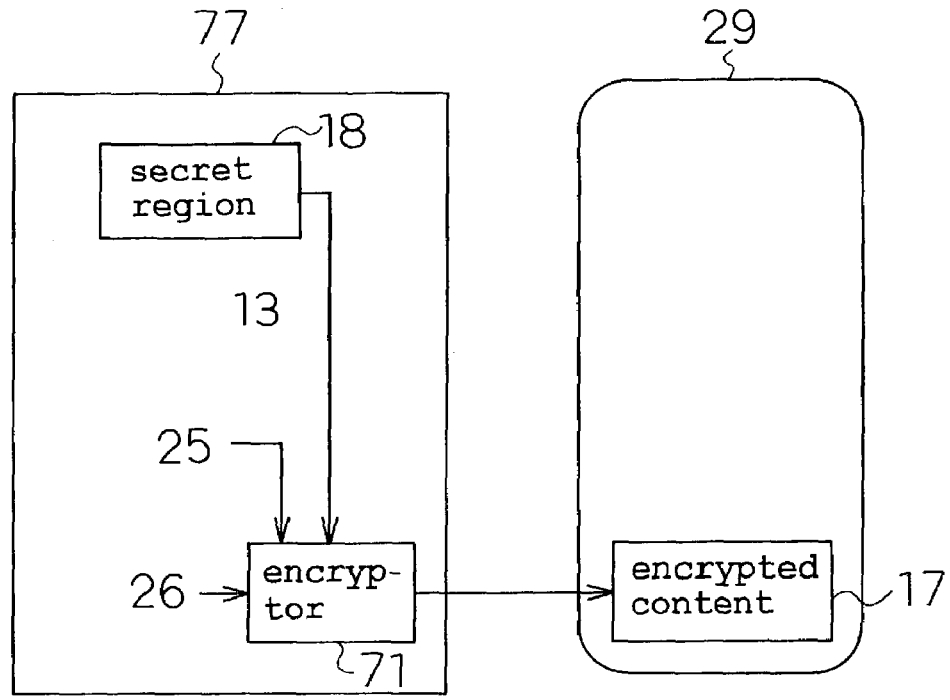
FIG. 19(a) is a block diagram showing the configuration of an encryption means of a hard disk apparatus according to an embodiment of the present invention.
FIG. 19(b) is a block diagram showing the configuration of a decryption means of a hard disk apparatus according to an embodiment of the present invention.
Figure 19:
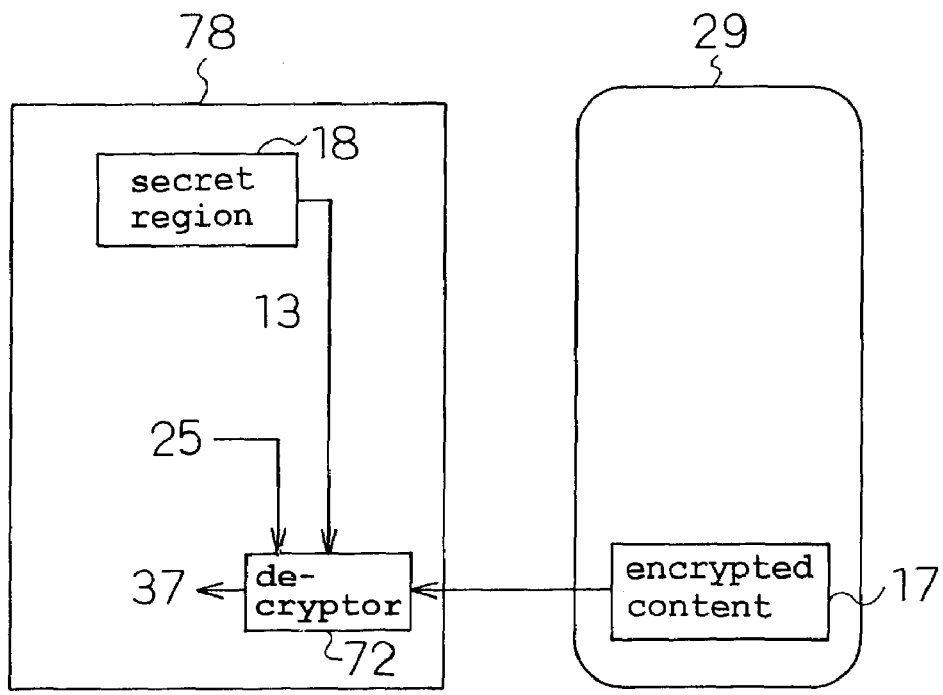

Here, though a variety of encryption means and decryption means are shown in the fourth to the sixth embodiments, the invention is not limited to these, but rather, the encryption means and the decryption means, for example, as shown in FIGS. 17, 18 and 19 can also be used in place of the encryption means 11 and the decryption means 12 of the hard disk apparatus 2.

FIG. 17(a) shows an encryption means 73. The encryption means 73 uses the device unique key 13 so that the encryptor 67 encrypts the content 26.

In addition, FIG. 17(b) shows a decryption means 74. A decryptor 68 decrypts the content 17 that is encrypted by the encryption means 73 by using the device unique key 13 so that the decryption means 74 outputs the decrypted content 37.

FIG. 18(a) shows an encryption means 75. The encryption means 75 uses the recording unit number 25 so that an encryptor 69 encrypts the content 26.

FIG. 18(b) shows a decryption means 76. A decryptor 70 decrypts the encrypted content 17, which is encrypted by the encryption means 75, by using the recording unit number 25 so that the decryption means 76 outputs the decrypted content 37.

FIG. 19(a) shows an encryption means 77. Encryptor 71 encrypts the content 26 by using the device unique key 13 and the recording unit number 25 in the encryption means 77. Here, the encryption means 77 can have a configuration wherein an adder is added so that the adder combines the device unique key 13 and the recording unit number 25 and so that the encryptor 71 encrypts the content 26 by using this information.

FIG. 19(b) shows a decryption means 78. A decryptor 72 decrypts the encrypted content 17 that is encrypted by the encryption means 77 by using the device unique key 13 and the recording unit number 25 in the decryption means 78.

Here, the decryption means 78 may have the configuration wherein an adder is added so that the adder combines the device unique key and the recording unit number 25 and so that the decryptor 72 decrypts the encrypted content 17 by using this information.

Seventh Embodiment

Next, the seventh embodiment is described.

Figure 20:
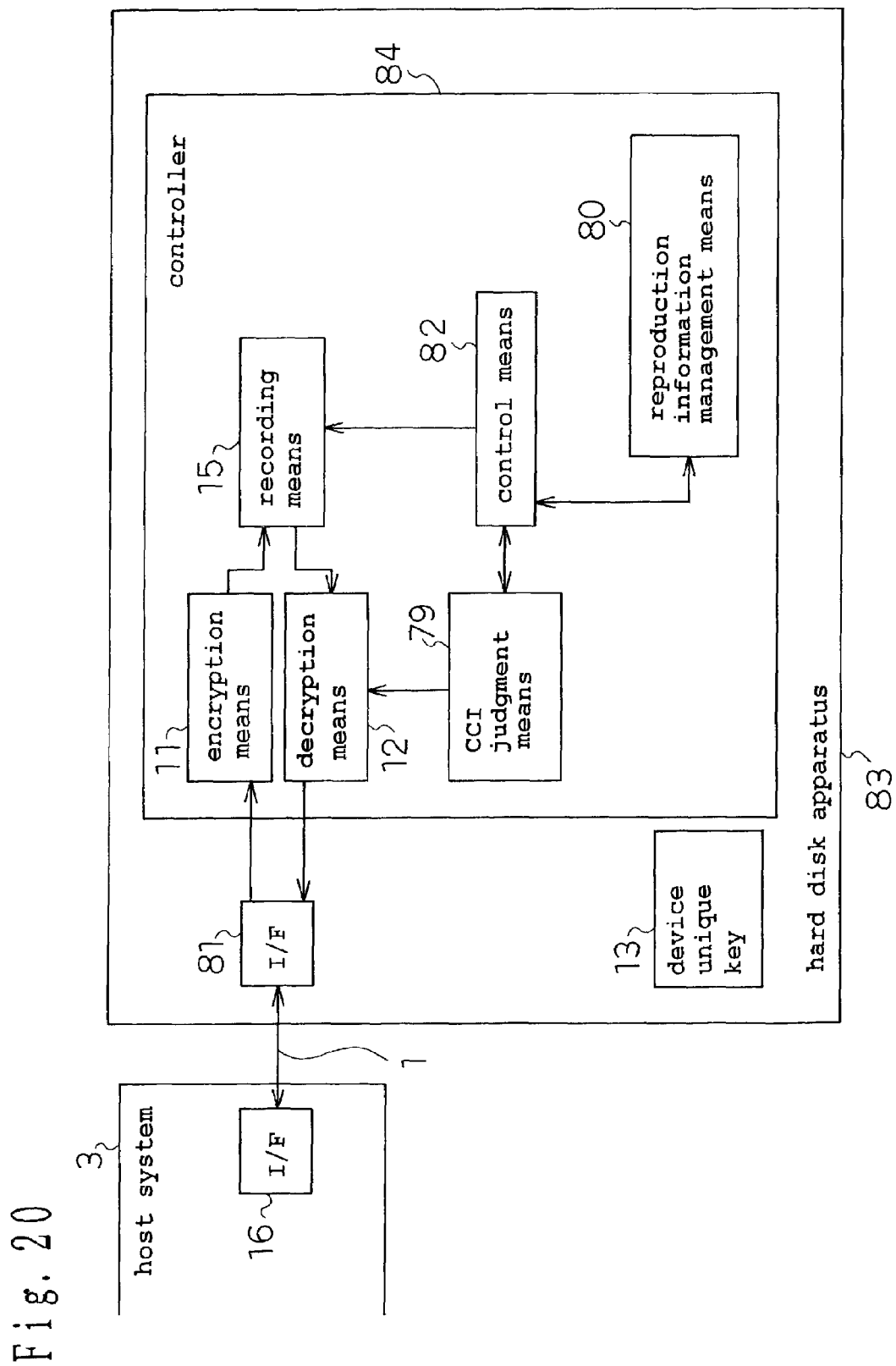
FIG. 20 is a block diagram showing the configuration of a hard disk apparatus according to the seventh embodiment of the present invention.

FIG. 20 shows a configuration of a hard disk apparatus 83 that is one embodiment of a recording apparatus and a reproduction apparatus of the present invention.

The hard disk apparatus 83 is provided with a CCI judgment means 79 and a reproduction information management means 80 in addition to the hard disk apparatus 2 of the first embodiment. In addition, it is provided with an I/F 81 in place of the I/F 4 of the first embodiment and a control means 82 in place of the control means 14 of the first embodiment.

The point wherein the I/F 81 differs from the I/F 4 of the first embodiment is that the I/F 81 makes a notification of starting the recording process to the controller 10 even in the case that the CCI of the AV data received from the IEEE 1394 bus 1 is "Copy Never" and the controller 10 can record the AV data under predetermined conditions according to the notification from the I/F 81 even in the case that the CCI of the AV data is "Copy Never."

In addition, the CCI judgment means 79 is a means of judging the value of the CCI of the reproduced AV data so as determine the value of the CCI after reproduction.

The reproduction information management means 80 is a means of managing the reproduction information that is information of whether or not the AV data recorded in the recording means 15 is once reproduced for each recording unit.

In addition, the reproduction management means 80 is also a means of managing the information of whether the AV data recorded in the recoding means 15 has been copied, or has not yet been copied, in another device for each recording unit.

In reference to the reproduction information, it can be known whether or not the AV data recorded in the recording unit has been once reproduced, or has not been reproduce at all, and the reproduction information can, for example, be represented with a flag of one bit.

In addition, in reference to copy information, it can be known if the AV data recorded in the recording unit has been once copied, or has not been copied at all.

The control means 82 is a means, in addition to the control means 14 of the first embodiment, for supplying the CCI of the AV data during reproduction to the CCI judgment means 79 so as to control the recording means 15 to carry out, or not to carry out, the reproduction of the AV data in accordance with the CCI of the AV data during reproduction and the reproduction information that is generated and updated by the reproduction information management means 80 and for supplying the CCI of the AV data while being copied to another device to the CCI judgment means 79 so as to control the recording means 15 to make, or not to make, a copy of the AV data in accordance with the CCI of the AV data while being copied and the copy information generated and updated by the reproduction information management means 80.

Here, the CCI judgment means 79, the control means 82 and the reproduction information management means 80 of the present embodiment are examples of control means of the present invention while the I/F 81 of the present embodiment is an example of an interface of the present invention.

Next, the operation of the present embodiment in such a configuration is described primarily in reference to the point differing from that of the first embodiment.

First, the operation at the time of recording is described.

AV data is sent from the host system.

The I/F 81 makes a notification of starting recording to the controller 84 in the case that the CCI of the AV data is "Copy Never."

The encryption means 11 encrypts the AV data.

The recording means 15 records the encrypted AV data in the magnetic disk 29 according to the control of the control means 82. At this time, the CCI is also recorded in the same manner as in the first embodiment.

Here, the control means 82 records the AV data in the case that the CCI is "Copy Never." The AV data where the CCI recorded in the recording means 15 is "Copy Never," however, becomes unreproducible a predetermined period of time after being recorded. How it becomes unreproducible after the predetermined period of time is described below.

In addition, the control means 82 outputs the CCI so that it copies the AV data of "Copy Once" and becomes unreproducible a predetermined period of time after being outputted for copying. This is also described below.

The reproduction information management means 80 generates reproduction information and copy information as follows when the AV data is recorded in the recording means 15 for each recording unit.

That is to say, when the AV data is newly recorded, reproduction information is set to be not yet reproduced for each recording unit while copy information is set to be not yet copied. Furthermore, the time when the AV data is recorded is recorded.

Next, the operation in the case that the AV data that is recorded in such a manner is reproduced is described.

The reproduction information management means 80 refers to the reproduction information of the AV data in the recording unit that is to be reproduced and makes a notification to the control means 82.

Furthermore, the CCI judgment means 79 judges the value of the CCI of the AV data to be reproduced so as to determine the value of CCI in the case of reproduction and output.

That is to say, in the case that the CCI of the reproduced AV data is "Copy Never," the CCI at the time of being outputted from the I/F 81 is set to be "Copy Never." In addition, in the case that the CCI of the reproduced AV data "Copy Once," the CCI at the time of being outputted from the I/F 81 is changed to "No More Copy." In addition, in the case that the CCI is "Copy Free," the CCI at the time of being outputted from the I/F 81 is set to be "Copy Free." In addition, since the AV data of which the value of the CCI is "No More Copy" is not recorded the CCI does not become "No More Copy."

The recording means reproduces the AV data according to the control of the control means 82.

The reproduction information management means 80 updates the reproduction management information as follows.

That is to say, when the AV data for the recording unit is reproduced a notification of this reproduction information is made to the control means 82. In addition, when the AV data for the recording unit is reproduced, the reproduction information for this portion is set as completion of reproduction.

In the case that the reproduction information of the AV data that is being reproduced at present has already completed reproduction, the reproduction information management means 80 makes a notification to the control means 82.

In addition, the reproduction information management means 80 makes a notification of the time information of the AV data that is being reproduced at present to the control means 82.

The control means 82 carries out the following operation in accordance with the value of the CCI before being changed by means of the CCI judgment means 79.

That is to say, in the case that the CCI is the AV data of "Copy Never," the reproduction information controls the reproduction of the completed reproduction portion to stop. In addition, in the case that a predetermined period of time, for example, 240 hours (10 days), or more, has passed up to the present time since the time shown by the time information concerning to the above AV data of which the notification is made by the reproduction information management means 80, the above AV data is controlled so as not to be reproduced.

In addition, in the case that the CCI is the AV data of "Copy Once," the reproduction is controlled to continue irrelevant of the value of the reproduction information.

In addition, in the case that the CCI is the AV data of "Copy Free," the reproduction is controlled to continue.

The reproduced AV data is decrypted by the decryption means 12 in such a manner.

Then, it is encrypted for transmission by the I/F 81 so as to be outputted as an isochronous packet to the IEEE 1394 bus 1. At this time, the CCI determined by the CCI judgment means 79 is added to the isochronous header as described above.

Next, the operation in the case that the AV data recorded in such a manner is copied is described.

The reproduction information controls means 80 refers to the copy information of the AV data of the recording unit to be copied and makes a notification to the control means 82.

Furthermore, the CCI judgment means 79 judges the value of the CCI of the AV data to be copied and determines the value of the CCI in the case of reproduction and output.

That is to say, in the case that the CCI of the reproduced AV data is "Copy Never," the CCI at the time of the output from the I/F 81 is either not set or set to be "Copy Never." In addition, in the case that the CCI of the reproduced AV data is "Copy Once," the CCI at the time of the output from the I/F 81 is made to remain "Copy Once" and is not changed to "No More Copy." In addition, in the case that the CCI is "Copy Free," the CCI at the time of the output from the I/F 81 is set to be "Copy Free." In addition, since the AV data of which the value of the CCI is "No More Copy" is not recorded, the CCI does not become "No More Copy."

The recording means reproduces the AV data to be copied in accordance with the control of the control means 82.

The reproduction information management means 80 updates the copy management information as follows.

That is to say, when the AV data for the recording unit is copied a notification of this copy information is made to the control means 82. In addition, when the AV data for the recording unit is copied, the copy information for this portion is set as completion of copy.

The reproduction information management means 80 makes a notification to the control means 82 in the case that the copy information of the AV data that is being copied at present is already copy completion.

The control means 82 operates as follows in accordance with the value of the CCI before being changed by means of the CCI judgment means 79.

That is to say, in the case that the CCI is the AV data of "Copy Never," the means controls the data not to be copied.

In addition, in the case that the CCI is the AV data of "Copy Once," the copy information is controlled not to copy the portion of copy completion while in the case that the copy information is not copied, the copy information is controlled not to continue copying only when the apparatus wherein the AV data of that portion is recorded is an apparatus for recording the above data for a backup.

In addition, in the case that the CCI is the AV data of "Copy Free," the means controls the copying to be continued.

The AV data reproduced for being copied is decrypted by the decryption means 12 in such a manner.

Then, it is encrypted for transmission by the I/F 81 so as to be outputted as an isochronous packet to the IEEE 1394 bus 1. At this time, the CCI determined by the CCI judgment means 79 is added to the isochronous header in the above manner. It is received by another device through the IEEE 1394 bus 1 so as to be recorded.

In addition, in the case that the CCI of the copied AV data is "Copy Once," the AV data cannot be reproduced in a place where it is recorded for the backup and it cannot be reproduced unless it is returned to the original hard disk 83.

That is to say, the hard disk apparatus 83 of the present embodiment records the AV data of "Copy Never" which can be reproduced only once.

The AV data of which the CCI is "Copy Never" is not permitted to be recorded and therefore, it is viewed and listened to only during the time it is broadcast.

By using the hard disk apparatus 83 of the present embodiment, however, the AV data can be viewed and listened to during a time that is different from the time when it is broadcast, while the intention of the copyright holder is protected.

In addition, the AV data of which the CCI is "Copy Once" is permitted to be copied once. That is to say, when the AV data of "Copy Once" is recorded once, this AV data can only be reproduced from the apparatus in which the AV data is recorded.

By using the hard disk apparatus 83 of the present embodiment, however, the AV data of "Copy Once" can be copied only once while remaining as the CCI of "Copy Once" and, therefore, the AV data can be moved to another recording and reproduction apparatus while protecting the intention of the copyright.

Here, though in the present embodiment when the AV data for the recording unit is reproduced the reproduction information management means 80 makes a notification of this reproduction information to the control means 82 and when the AV data for the recording unit is reproduced the reproduction information for this portion is set as completion of reproduction and thereby the hard disk apparatus 83 of the present embodiment is described of being able to reproduce only once the AV data of which the CCI is "Copy Never" the invention is not limited to this. A method where the reproduction information management means 80 updates the reproduction information may be as follows.

That is to say, the reproduction information management means 80 may count the number of times that the AV data for the recording unit is reproduced so that the reproduction information of the AV data for this recording unit may be set as completion of reproduction only after it has been reproduced for a predetermined number of times, for example, five times.

In addition, the reproduction information management means 80 may count the number of times where a portion of one piece of AV data that is recorded in each recording unit is reproduced so that the reproduction information management means 80 may set the portion of the reproduction management information that is recorded in the entire recording units of this piece of AV data as completion of reproduction at the point in time when the entire portions that are recorded in the entire recording units of one piece of AV data are reproduced. In such a configuration, the hard disk apparatus 83 can reproduce a portion of the AV data of which the CCI is "Copy Never" as many times as desired and the reproduction becomes impossible only at the point in time when the entirety of the AV data is reproduced.

Furthermore, though in the present embodiment, the AV data of which the CCI is "Copy Never" is described as becoming unreproducible after a predetermined time has elapsed since the AV data is recorded, the invention is not limited to this, but rather, the AV data of which the CCI is "Copy Never" may become unreproducible depending on the money imposing condition. As for such a money imposing condition, there is a condition such that the AV data of which the CCI is "Copy Never" becomes reproducible in the case that a payment procedure of a predetermined amount of money is carried out when the AV data is recorded while it becomes unreproducible in the case that such a payment procedure is not carried out.

Furthermore, though the present embodiment is described such that the AV data of which the CCI is "Copy Once" is controlled to continue to be copied in the case that the copy information is not copied and only in the case that the apparatus wherein the AV data of that portion is recorded is an apparatus wherein the above data is recorded for a backup, the invention is not limited to this, but rather, when a predetermined time has passed after the AV data of which the CCI is "Copy Once" is recorded this recorded AV data or the key used for the encryption at the time when this data is recorded may be erased.

The hard disk apparatus 83 of the present embodiment records the AV data of which the CCI is "Copy Never" or reproduces only once the AV data of which the CCI is "Copy Once" so that the CCI remains "Copy Once" in the above manner and, therefore, the copyright can be interpreted as being breached even while the intention of the copyright holder is said to be protected. That is to say, in the case that the CCI is "Copy Never," it means that copying cannot be carried out by any means. Therefore, the utilization of the expanded CCI wherein the meaning of the CCI is expanded in such a manner is at present under investigation. In the expanded CCI, the meanings of "Copy Never" or "Copy Once" can be interpreted as being expanded. The hard disk apparatus 83 of the present embodiment can carry out the above described operation by using the expanded CCI in place of the conventional CCI as described in the above. In the case that the hard disk apparatus 83 of the present embodiment carries out the above described operation by using the expanded CCI in such a manner, a breach of copyright is not committed.

When the hard disk apparatus 83 of the present embodiment is used in such a manner, the AV data that is not permitted to be recorded can be viewed and received at an arbitrary time other than the time when it is broadcast. In addition, it can be utilized as a backup apparatus since the AV data that is permitted to be copied only once can be transferred to another recording apparatus.

Here, viewing and listening to, or backing up, the AV data that is not permitted to be recorded during an arbitrary time other than the time when it is broadcast is further described in detail in the following embodiments.

Here, a variety of the modifications described in the first embodiment is of course possible in the hard disk apparatus 83 of the present embodiment.

Furthermore, though the hard disk apparatus 83 of the present embodiment is described to be provided with the encryption means 11 and the decryption means 12, the encryption means and the decryption means that are described after the description of the first embodiment may be used.

Furthermore, the data of the present invention is not limited to the AV data in the present embodiment. It may be document data or image data sent through the Internet, or the like or a computer program such as a game software or a document processing software sent through the Internet, or the like. In summary, the data of the present invention may be any data that can be utilized by recording in the disk of the present invention and by reproducing from the disk of the present invention.

Furthermore, the interface of the present invention is not limited to the IEEE 1394 interface in the present embodiment, but rather, may be an interface of the USB.

Furthermore, the disk of the present invention is not limited to the magnetic disk medium in the present embodiment, but rather, may be an optical disk medium or an optical magnetic disk medium. In summary, the disk of the present invention may be any recording medium wherein the data can only be accessed at random at the time of recording and/or at the time of reproduction.

Furthermore, the copy permission information of the present invention is not limited to the CCI or the expanded CCI in the present embodiment, but rather, may be any information that only shows the permission with respect to the copying of the data.

Here, though in the above embodiments, the values of the CCI added to the AV data are described to include "Copy Never," "Copy Once," "No More Copy" and "Copy Free," in the below described eighth to eleventh embodiments, the AV data of which the value of the CCI is any of "Copy Never," "Copy Once" or "No More Copy" is collectively dealt with as a copy prohibition data. In addition, to which of the above described "Copy Never," "Copy Once" or "No More Copy"

the CCI of the copy prohibition data corresponds is individually described in the eighth to the eleventh embodiments.

Eighth Embodiment

Next, the configurations of an AVHDD 1001 and an archive device 1002 of the eighth embodiment of the present invention are described.

Figure 21:
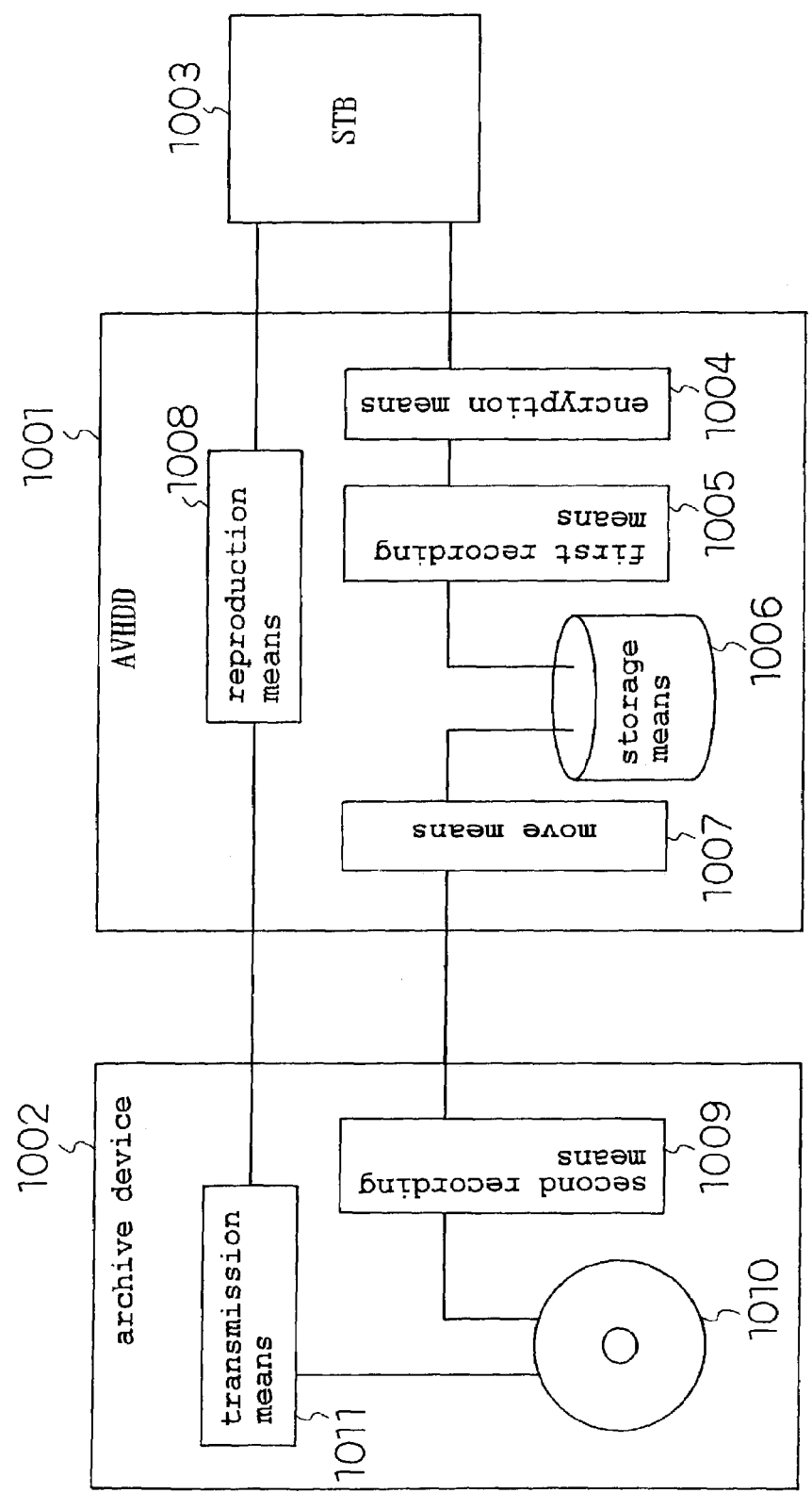
FIG. 21 is a block diagram of an AVHDD1 and an archive device 2 according to Embodiment 8 of the present invention.

FIG. 21 shows a block diagram of the AVHDD 1001 and the archive device 1002 according to the eighth embodiment of the present invention. Here, FIG. 21 shows an STB (set top box) 1003 for convenience of description.

Now, the AVHDD 1001 of the eighth embodiment of the present invention is, as shown in FIG. 21, formed of an encryption means 1004 for encrypting data from an STB 1003 with an encryption key specific to the AVHDD 1001, a first recording means 1005 for recording the data encrypted by the encryption means 1004 in a recording medium within a storage means 1006, the storage means 1006 for storing data, a move means 1007 for moving the data stored in the storage means 1006 to the archive device 1002 and a reproduction means 8 for decrypting and reproducing the data from the archive device 1002 encrypted with the encryption key specific to the AVHDD 1001. Here, the storage means 1006 has a first recording medium for recording data and data is recorded in this first recording medium.

Here, in the "embodiments of the invention" the AVHDD is used as a word representing an apparatus for recording or reproducing data such as audio, video, or the like, by using a hard disk drive (HDD).

Next, the archive device 1002 according to the eighth embodiment of the present invention is formed, as shown in FIG. 21, of a second recording means 1009 for recording data from the AVHDD 1001 in a second recording medium 1010, the second recording medium 1010 and a transmission means 1011 for reading out the data recorded in the second recording medium 1010 and for transmitting it to the AVHDD 1001. Here, as for the archive device 1002, for example, a DVD apparatus or a D-VHS apparatus correspond to this. In the present embodiment, a DVD apparatus is used for the description as an example of the archive device 1002. Accordingly, a DVD corresponds to an example of the second recording medium 1010.

Here, the STB 1003 is a means of receiving data from, for example, a broadcast station so as to output the data to the AVHDD 1001 and of reproducing data from the AVHDD 1001, wherein the reproduced data is displayed on a display connected to the STB 1003 in the case that it is video data or the reproduced data is outputted from a speaker connected to the STB 1003 in the case that it is audio data. Here, the display and the speaker are not shown in the figures.

In addition, in the eighth embodiment, the AVHDD 1001 is used as an example of the data processing apparatus and the archive device 1002 is used as an example of the recording and reproduction apparatus according to the present invention, respectively.

In addition, the first recording medium within the storage means 1006 of the AVHDD 1001 may be a removable recording medium or a stationary installed-type recording medium. In the same manner, the second recording medium 1010 within the archive device 1002 may be a removable recording medium or a stationary installed-type recording medium.

In addition, the connection between the AVHDD 1001 and the archive device 1002 may be carried out via an interface according to the IEEE 1394 standard or may be carried out via an interface according to the IDE standard. Or it may be carried out via another interface. As for the connection between the AVHDD 1001 and the STB 1003, it may be carried out via any interface.

Next, the operations of the AVHDD 1001 and the archive device 1002 according to the eighth embodiment of the present invention are described.

For convenience of the following description, the recording capacity of the first recording medium within the storage means 1006 of the AVHDD 1001 is assumed to be nearing the limit and is in the condition wherein new data from the STB 1003 cannot be stored unless some data is overwritten, or is deleted, while the user has instructed the AVHDD 1001 as well as the archive device 1002 to move the data within the storage means 1006 to the second recording medium 1010 within the archive device 1002.

Here, move of data means to move data recorded in, for example, the first recording medium to another, the second, recording medium so that the moved data does not remain in the first recording medium after the move.

In addition, for convenience of the following description, the data moved from the AVHDD 1001 to the archive device 1002 is encrypted by the encryption means 1004 using the encryption key specific to the AVHDD 1001 and is recorded in the first recording medium within the storage means 1006 by means of the first recording means 1005. In addition, the above data that is the object moved is copy prohibited data that is prohibited from being copied for copyright protection while the move to another recording apparatus is permitted.

Here, the move means 1007 reads out the copy prohibited data, which has been encrypted with the encryption key specific to the AVHDD 1001, from the first recording medium within the storage means 1106 and transmits it to the archive device 1002. When the move means 1007 transmits (moves) the copy prohibited data in such a manner, the move means 1007 outputs the copy prohibited data as data that can be copied only once.

Then, in the archive device 1002, the second recording means 1009 records the copy prohibited data from the AVHDD 1001 in the second recording medium 1010. Here, the data transferred to the archive device 1002 by the move means 1007 is transferred to the archive device 1002, as remaining encrypted, without being decrypted in the AVHDD 1001. Accordingly, the data recorded in the second recording medium 1010 by the second recording medium 1009 is copy prohibited data that is encrypted by using the encryption key specific to the AVHDD 1001.

Next, a case is described wherein the encrypted copy prohibited data, which is recorded in the second recording medium 1010, is reproduced. As shown in FIG. 21 the archive device 1002 is not provided with a means of decrypting and of reproducing the encrypted copy prohibited data and, therefore, it is necessary to move the data again to the reproduction means 1008 of the AVHDD 1001 that can decrypt and reproduce the copy prohibited data.

Therefore, in the case that the encrypted copy prohibited data, which is recorded in the second recording medium 1010, is reproduced, the transmission means 1011 reads out the data recorded in the second recording medium 1010, which is transmitted to the AVHDD 1001 and, then, in the AVHDD 1001, the reproduction means 1008 decrypts and reproduces the encrypted copy prohibited data.

The decrypted and reproduced data is outputted at the STB 1003, which is displayed on the display connected to the STB 1003, in the case of video data and is outputted from the display connected to the STB 1003 in the case of audio data.

Even in the case that the recording capacity of the first recording medium within the storage means 1006 of the AVHDD 1001 has almost reached to the limit in the above described manner, the data within the storage means 1006 can be moved to another recording medium without deleting the data by, for example, overwriting or the like the data so as to gain the merit that the data transferred afterward can be reproduced.

In addition, even in the case that media in the same form as of the second recording medium 1010, which corresponds to the archive device 1002, is illegally copied by a large amount and then is delivered, the data can only be reproduced by the AVHDD 1001 since the data recorded in this media is the data encrypted by the encryption means 1004 of the AVHDD 1001 by using the encryption key specific to the AVHDD 1001 and, therefore, the copy prohibited data that is the data of the object for copyright protection can be moved to another apparatus, that is to say, the archive device 1002 while protecting the copyright. Accordingly, a safe data move can be implemented. Here, a plurality of encryption keys specific to the produced AVHDD 1001 differ, respectively.

Here, though, in the above described embodiment, the copy prohibited data is encrypted by the encryption means 1004 of the AVHDD 1001 by using the encryption key specific to the AVHDD 1001, the copy prohibited data is not limited to the data that is encrypted by the encryption means 1004. For example, at a production stage of the AVHDD 1001, the copy prohibited data encrypted by using the encryption key that is particular to the AVHDD 1001 may be recorded in the first recording medium within the storage means 1006.

In addition, though, in the above described embodiment, the copy prohibited data is recorded in the first recording medium within the recording means 1006 after being encrypted by the encryption means 1004, the encryption means 1004 may be provided between the storage means 1006 and the move means 1007 so that the copy prohibited data is encrypted by using the encryption key specific to the AVHDD 1001 at the time when it is moved by means of the move means 1007. In summary, the copy prohibited data that is to be transferred by the move means 1007 may be any data that is encrypted by using the encryption key specific to the AVHDD 1001, at least, at the time when being outputted from the AVHDD 1001.

In addition, in the present embodiment, the copy prohibited data is data that is allowed to be transferred to another recording apparatus and that is prohibited from being copied, wherein the "copy prohibited data" in "Embodiments of the Invention" includes the data represented as "01" in 2 bits meaning "prohibition of further copying" and the data represented as "11" in 2 bits meaning "absolute copy prohibition."

Figure 22:
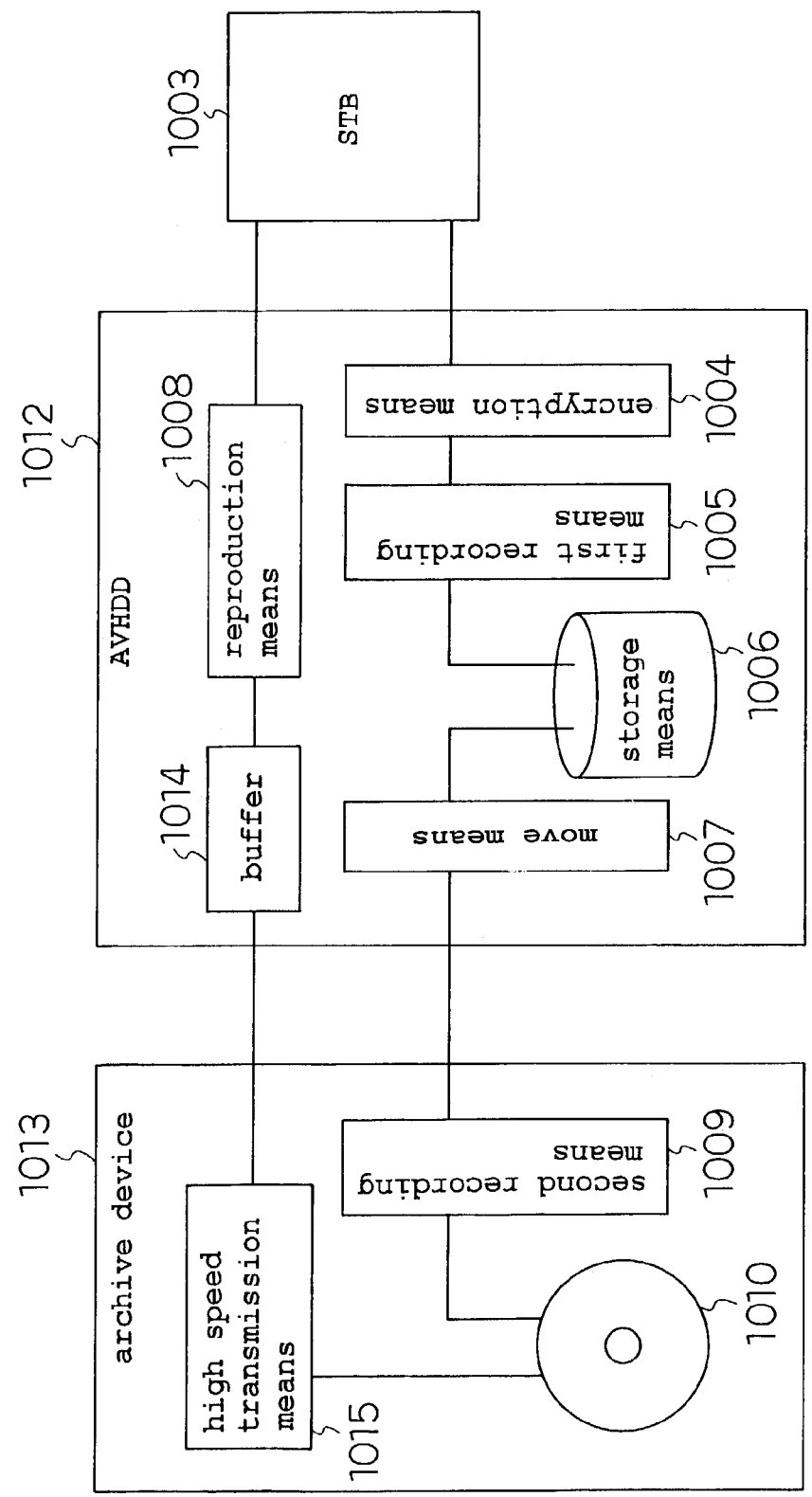
FIG. 22 is a block diagram of an AVHDD12 and an archive device 13 according to Embodiment 8 of the present invention.

In addition, the transmission means 1011 in the above embodiment described in reference to FIG. 21 may be replaced with a high speed transmission means 1015 that transmits the data recorded in the second recording medium 1010 to the AVHDD 1001 at a speed N(N is a positive number that exceeds 1) times as fast as the conventional speed as shown in FIG 22. In this case, the AVHDD 1001 of FIG 21 is replaced with an AVHDD 1012 that is further provided with a buffer 1014 as a data storage means so that the data from the high speed transmission means 1015 is temporarily stored in the buffer 1014 and, then, the temporarily stored data can be reproduced in the reproduction means 1008.

Thus the merit is gained that a data transfer is carried out from the archive device 1013 to the AVHDD 1012 at the speed N times as fast as the standard (high speed) and the data can be normally reproduced in the AVHDD 1012. Here, the buffer 1014 may be provided within the storage means 1006. In addition, "the speed N times as fast as the conventional speed" means a speed faster than the data reproduction speed that is required when the reproduction means 1008 reproduces data that is viewed and listened to by the user.

Here, though, in the example described in reference to FIG. 22, a high speed transmission means 1015 is provided with the archive device 1013 so that data is transferred from the archive device 1013 to the AVHDD 1012 at the speed N time as fast as the conventional speed (high speed), the move means 1007 of the AVHDD may be replaced with a high speed move means of moving the data to the archive device at the speed N(N is a positive number that exceeds 1) times as fast as the conventional speed. In this case, it is preferable to provide a buffer that temporarily stores data in the archive device. In the case that a high speed move means is provided in the AVHDD in such a manner, there is the merit that the data move can be carried out from the AVHDD to the archive device for a short period of time. In addition, in the below described AVHDD in Embodiment 9, effects are gained that a data move can be carried out for a short period of time in the case that a high speed move means is provided in place of the move means.

Figure 23:
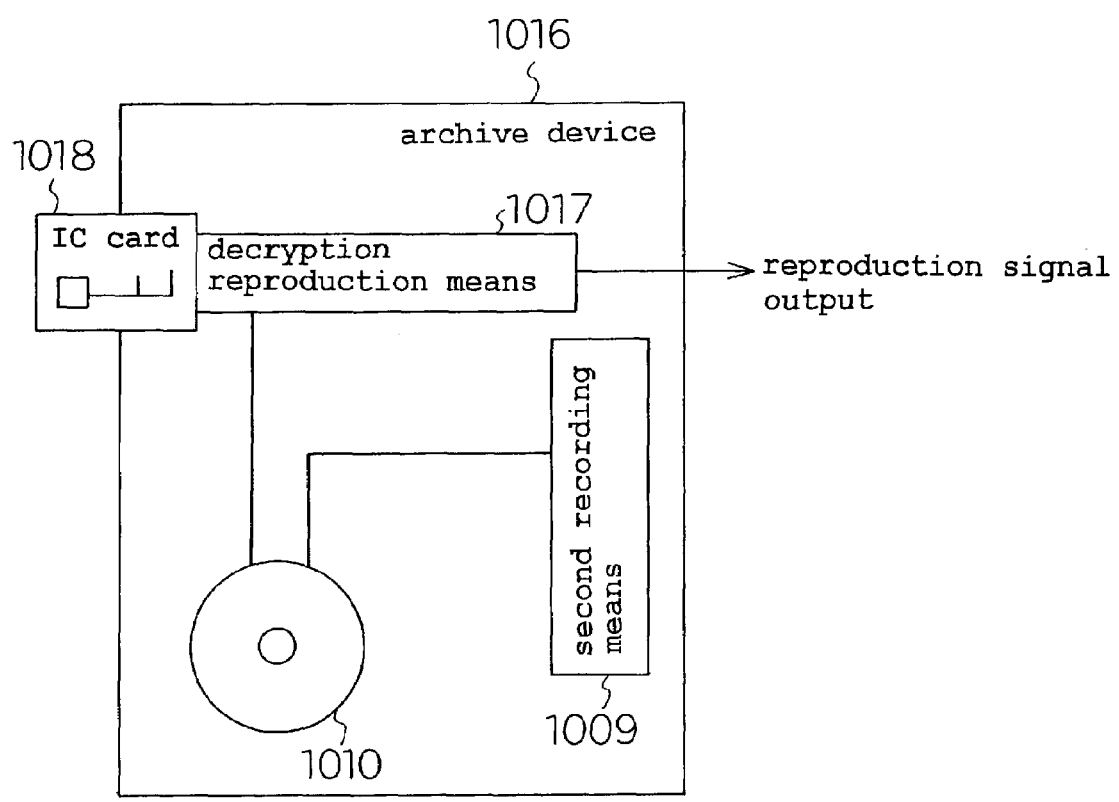
FIG. 23 is a block diagram of an archive device 16 according to Embodiment 8 of the present invention.

In addition, though in the above described embodiment, the archive device 1002 is not provided with a means of decryption and of reproducing the encrypted data by using the encryption key specific to the AVHDD 1001, the archive device 1002 may be replaced with an archive device 1016 that is provided with a decryption and reproduction means 1017 for decrypting and reproducing the encrypted data by using the encryption key specific to the AVHDD 1001 as shown in FIG. 23 so that the encrypted data may be decrypted and reproduced by using the encryption key specific to the AVHDD 1001 in the archive device 1016 without a data transmission to the AVHDD 1001.

In the case that the encrypted data can be decrypted and reproduced by using the encryption key specific to the AVHDD 1001 in the archive device 1016 in the above manner, the problem is solved that the archive device 1002 and the AVHDD 1001 must be connected to each other only for reproducing the data.

Here, the encryption key specific to the AVHDD 1001 becomes necessary in order for the decryption and reproduction means 1017 of the archive device 1016 to decrypt and reproduce the encrypted data and, therefore, an IC card slot may be provided in advance in the archive device 1016 so that in the case that the IC card 1018 wherein the encryption key specific to the AVHDD 1001 is recorded is inserted to the IC card slot as shown in FIG. 23, the decryption and reproduction means 1017 acquires the encryption key specific to the AVHDD 1001 from the IC card 1018 so as to decrypt and reproduce the encrypted data by using this encryption key.

In addition, in the case that the IC card 1018 is used, in addition to the decryption and reproduction means 1017, a key reproduction means of reproducing the IC card 1018 may be provided in the archive device 1016. In addition, a key memory means of storing the encryption key specific to the AVHDD 1001 from the IC card 1018 may be provided in the archive device 1016. In the case that a key memory means is provided in the archive device 1016 in such a manner, the problem can be avoided that the IC card 1018 must be inserted into the IC card slot whenever the encrypted data is decrypted and is reproduced by using the encryption key specific to the AVHDD 1001 that is recorded in the second recording medium 1010. Here, as for the key recorded in the IC card 1018, a secret key and a public key can be combined in order to prevent the leakage of the key.

In addition, though, in the above description, the decryption and reproduction means 1017 acquires the encryption key specific to the AVHDD 1001 directly or indirectly from the IC card 1018, the decryption and reproduction means 1017 may acquire the encryption key from a key disk or a key cassette, in place of the IC card 1018, wherein the encryption key specific to the AVHDD 1001 is recorded or hidden. Here, the encryption key specific to the AVHDD 1001 may be recorded in the second recording medium 1010. In this case, the IC card 1018, the key disk and the key cassette become unnecessary.

In addition, instead of using the IC card 1018, the key disk or the key cassette, a means of transmitting the encryption key specific to the AVHDD 1001 is provided in the AVHDD 1001 and a means of receiving the encryption key from the AVHDD 1001 is provided in the archive device 1016 so that the decryption and reproduction means 1017 decrypts and reproduces the encrypted data by using the transmitted encryption key.

Figure 24:
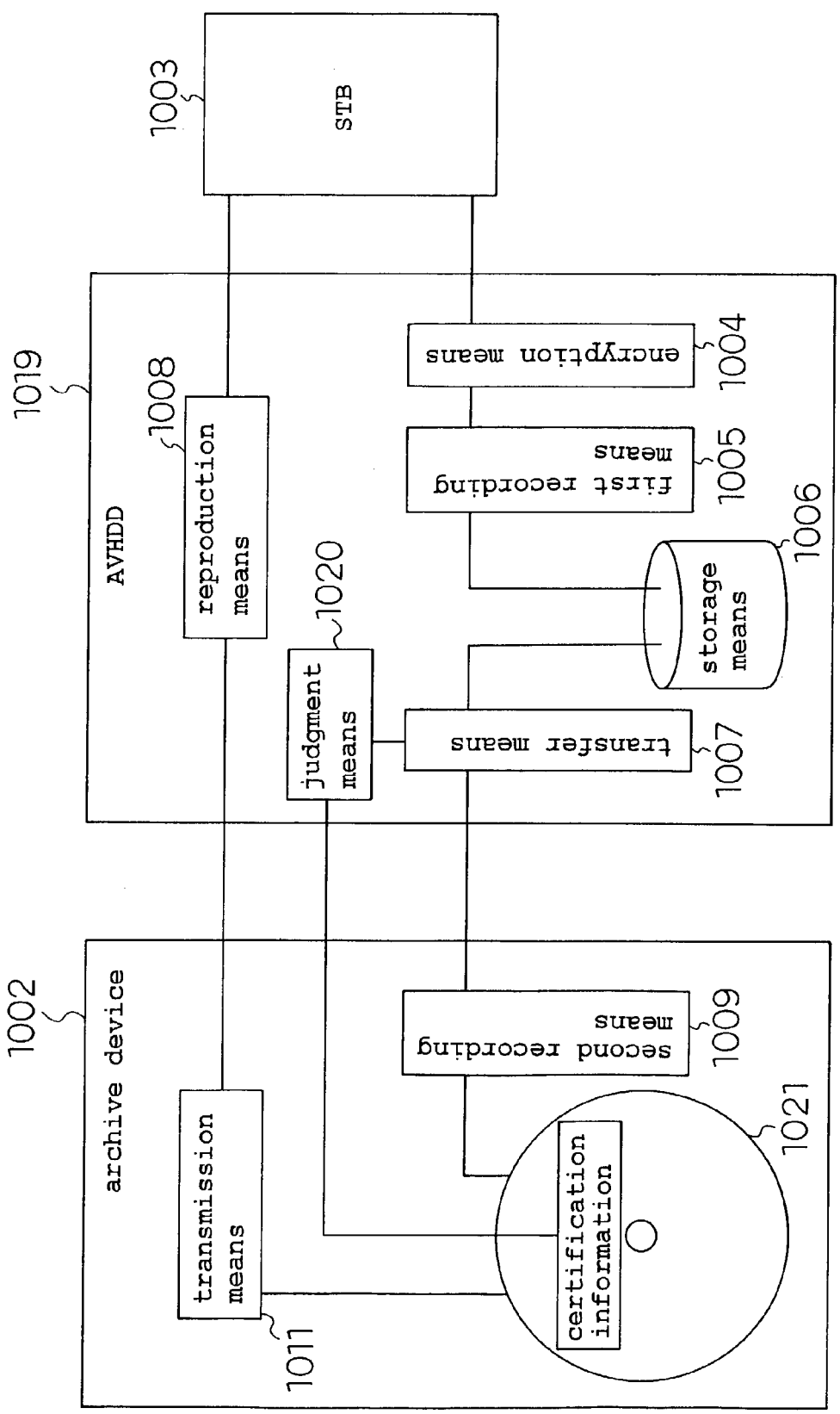
FIG. 24 is a block diagram of an AVHDD19 and the archive device 2 according to Embodiment 8 of the present invention.

In addition, though in the above described embodiment, the AVHDD 1001 unconditionally moves the encrypted data to the archive device 1002 as shown in FIG. 21, as shown in FIG. 24, the second recording medium 1010 of the archive device 2 of FIG. 21 may be replaced with the second recording medium 1021 wherein the certification information that indicates the recording medium corresponding to the AVHDD 1019 is recorded and, at the same time, the AVHDD 1001 may be replaced with the AVHDD 1019 wherein a judgment means 1020 for judging whether or not the second recording medium 1021 is a recording medium corresponding to the AVHDD 1019 is provided so that the move means 1007 moves data from the AVHDD 1019 to the archive device 1002 only in the case that the judgment means 1020 judges that the second recording medium 1021 is the recording medium corresponding to the AVHDD 1019.

Here, the judgment means 1020 judges that the second recording medium 1021 is the recording medium corresponding to the AVHDD 1019 in the case that the certification information is recorded in the second recording medium 1021 and judges that the second recording medium 1021 does not correspond to the AVHDD 1019 in the case that the certification information is not recorded.

In addition, the second recording medium 1021 wherein the certification information is recorded may be a disk of which the color of the surface differs from the color of the surface of the recording medium, wherein the certification information is not recorded in order to distinguish the second recording medium wherein the certification information is recorded from the recording medium wherein the certification information is not recorded and, moreover, the recording medium wherein the certification information is recorded is a recording medium for copyright protected information and, therefore, may be more expensive by a predetermined amount than the recording medium wherein the certification information is not recorded. Then the entirety, or a portion of, the difference between the recording medium wherein the certification information is recorded and the recording medium wherein the certification information is not recorded may be returned to the copyright holder, which may be an individual or an organization.

Here, instead of the configuration wherein in the case that the second recording medium 1021 is a recording medium corresponding to the AVHDD 1019 data is transferred from the AVHDD 1019 to the archive device 1002, in the case that the archive device 1002 is an apparatus corresponding to the AVHDD 1019 data may be moved from the AVHDD 1019 to the archive device 1002. In this case, the AVHDD 1019 is provided with a judgment means that judges whether or not the archive device 1002 is an apparatus that corresponds to the AVHDD 1019.

In addition, when a management apparatus having a fee imposing ability concerning, at least, the move of the copy prohibited data is confirmed to be connected to the interface to which AVHDD 1001 and the archive device 1002 are connected, the transfer means 1007 of the AVHDD 1001 may transfer the copy prohibited data to the archive device 1002. Here, an STB can be cited as an example of the management apparatus.

In addition, in the above described embodiment the copy prohibited data is moved from the AVHDD to the archive device. That is to say, after the copy prohibited data is moved to the archive device, the copy prohibited data is deleted from the AVHDD. However, a case may be considered wherein the copy prohibited data cannot be processed in the archive device and, therefore, in some cases it is preferable that the copy prohibited data be allowed to remain in the AVHDD as a backup.

In this case, when the move means 1007 of each of the AVHDDs in the above described embodiment is replaced with a copy means of copying the copy prohibited data in the archive device, the copy prohibited data is transmitted to the archive device and, at the same time, the copy prohibited data can be stored as a backup within the AVHDD so as to produce the merit wherein the copy prohibited data stored in the AVHDD as a backup can be utilized even in the case that the copy prohibited data are not able to be processed in the archive device.

Figure 28:
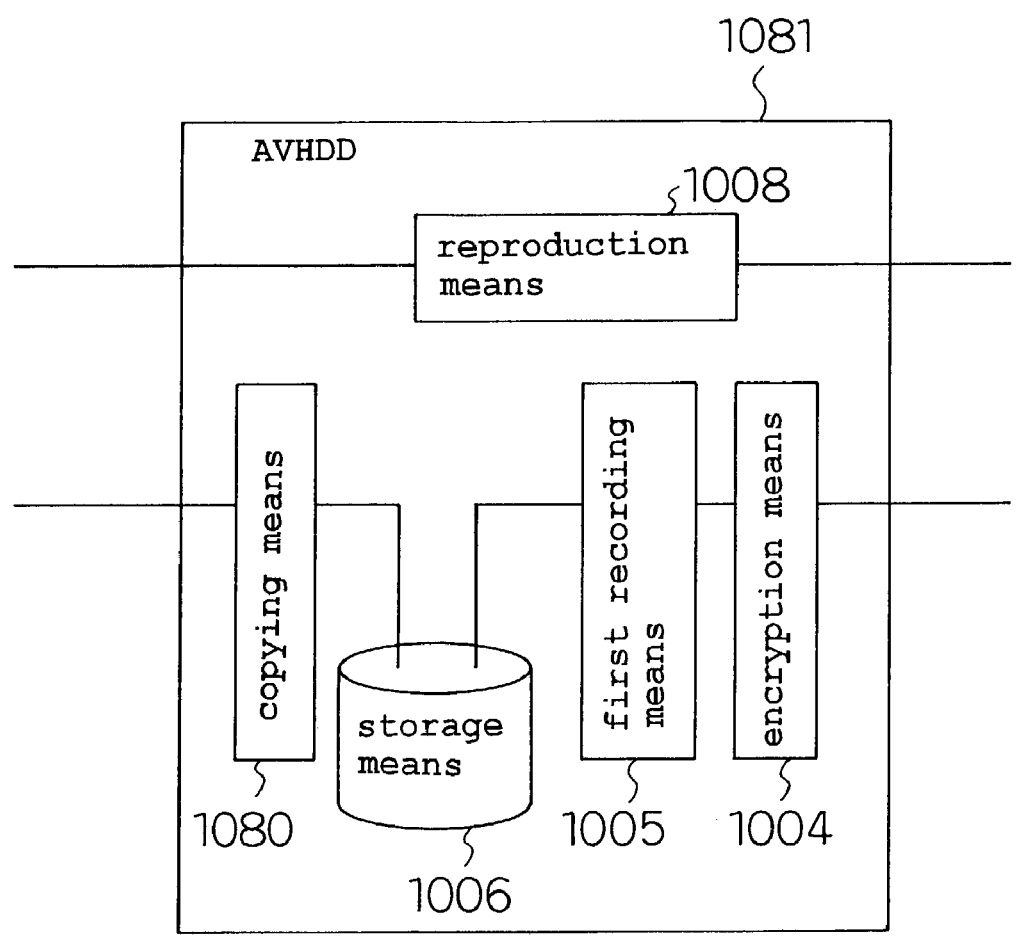
FIG. 28 is a block diagram of an AVHDD81 with a copying means 80 according to Embodiment 8 of the present invention.

Here, as one example of the configuration of the AVHDD that is provided with a copy means, FIG. 28 shows the case wherein the AVHDD 1001 that is provided with a move means 1007, shown in FIG. 21, is replaced with the AVHDD 1081 that is provided with a copy means 1080 instead of the move means 1007.

Ninth Embodiment

Next, the configurations of an AVHDD 1022 and an archive device 1023 according to the ninth embodiment of the present invention are described.

Figure 25:
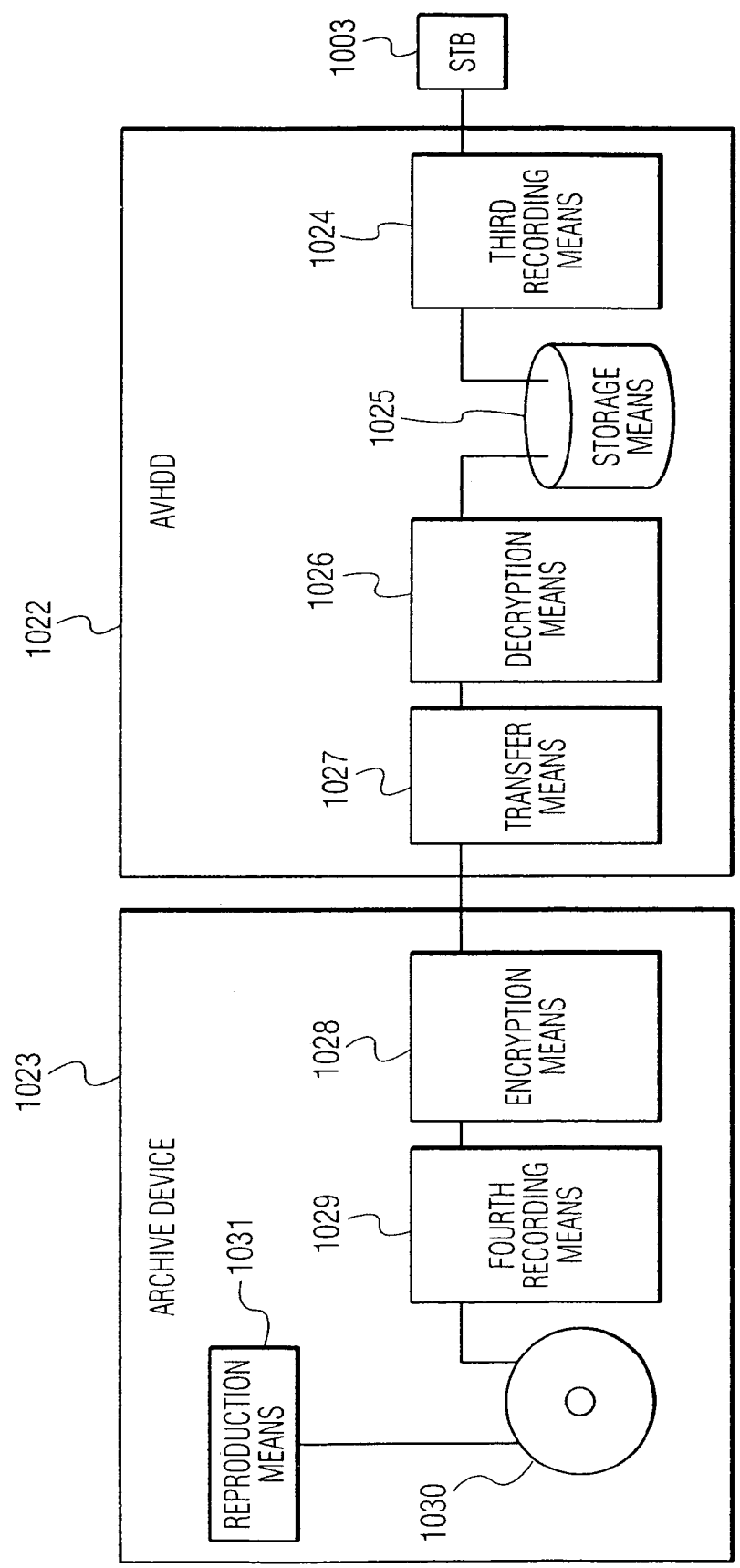
FIG. 25 is a block diagram of an AVHDD22 and an archive device 23 according to Embodiment 9 of the present invention.

FIG. 25 shows a block diagram of the AVHDD 1022 and the archive device 1023 according to ninth embodiment of the present invention. Here, for convenience of description, FIG. 25 also shows the STB 1003 in the same manner as in FIG. 21 of the above described eighth embodiment.

Now, the AVHDD 1022 according to the ninth embodiment of the present invention is formed, as shown in FIG. 25, of a third recording means 1024 of recording data from the STB 1003 in a recording medium within a storage means 1025, the storage means 1025 for storing data, decryption means 1026 for converting data stored in the storage means 1025 into a plain sentence and a move means 1027 for moving the data that is converted into a plain sentence by means of the decryption means 1026 and that is stored in the storage means 1025 into the archive device 1023.

An archive device 1023 according to the ninth embodiment of the present invention is formed of, as shown in FIG. 25, an encryption means 1028 for encrypting the data from the AVHDD 1022 by using the encryption key specific to the archive device 1023, a fourth recording means 1029 for recording the data encrypted by the encryption means 1028 in a third recording medium 1030, the third recording medium 1030 and a reproduction means 1031 for decrypting and reproducing the data recorded in the third recording medium 1030 by using the encryption key specific to the archive device 1023. Here, as for the archive device 1023, for example, a DVD apparatus or a D-VHS apparatus correspond to this. A DVD apparatus is used as an example of the archive device 1023 and a DVD is used as an example of the third recording medium 1030 in the present embodiment.

In addition, in the ninth embodiment an AVHDD 1022 is used as one example of the data processing apparatus of the present invention and an archive device 1023 is used as one example of the recording and reproduction apparatus, respectively.

In addition, the recording medium within the storage means 1025 of the AVHDD 1022 may be a removable recording medium or may be a stationary installed-type recording medium. A third recorded medium 1030 within the archive device 1023 may be a removable recorded medium or may be a stationary installed-type recording medium in the same manner.

In addition, the connection between the AVHDD 1022 and the archive device 1023 may be effected via any interface in the same manner as in the eighth embodiment described in reference to FIG. 21.

Next, the operations of the AVHDD 22 and the archive device 23 according to the ninth embodiment of the present invention are described.

It is assumed that the user directs the AVHDD 1022 and the archive device 1023 to transfer data within the storage means 1025 to the third recorded medium 1030 within the archive device 1023. Here, the move of data means, as described in the eighth embodiment, that, for example, the data recorded in the first recording medium is moved into another, the second recording medium so that the moved data does not remain in the first recording medium after the move.

In addition, for the convenience of the description below, the data that is the object moved is copy prohibited data that is allowed to be moved to another recording apparatus and is prohibited from being copied for copyright protection and is recorded in the recording medium within the storage means 1025 by means of the third recording medium 1024.

Here, at this time, a decryption means 1026 converts data stored in the storage means 1025 into plain sentences while a move means 1027 reads out the copy prohibited data of a plain sentence from the recording medium within the storage means 1025 and transmits it to the archive device 1023. In such a manner when the move means 1027 transmits (moves) the copy prohibited data, the move means 1027 outputs the copy prohibited data only once as data of which copying is allowable.

Then, in the archive device 1023, the encryption means 1028 encrypts the data from the AVHDD 1022 by using the encryption key specific to the archive device 1023 and the fourth recording means 1029 records the data that is encrypted by the encryption means 1028 in the third recording medium 1030. Here, the data is treated as copy prohibited data at the time when it is inputted to the archive device 1023 or at the time when it is recorded in the third recording medium 1030.

Here, transmission data in the transmission path of the data from the AVHDD 1022 to the archive device 1023 may be, for example, protected by the DTCP.

Next, a case is described wherein the encrypted copy prohibited data that is recorded in the third recording medium 1030 is reproduced by using the encryption key specific to the archive device 1023. In this case, the reproduction means 1031 reproduces copy prohibited data recorded in the third recording medium 1030 by using the encryption key specific to the archive device 1023.

Since the archive device 1023 encrypts and records data by using the encryption key specific to the archive device 1023 in the above manner, there is the merit that the data recorded in the archive device 1023 can be reproduced.

Here, though in the above described embodiment the encryption means 1028 of the archive device 1023 encrypts the copy prohibited data from the AVHDD 1022 by using the encryption key specific to the archive device 1023, in the case that the encryption key is recorded in the third recording medium 1030, the encryption means 1028 may encrypt the copy prohibited data from the AVHDD 1022 by using the encryption key recorded in the third recording medium 1030. In this case, the reproduction means 1031 reproduces the copy prohibited data by using the encryption key that is recorded in the third recording medium 1030.

In addition, though in the above described embodiment the data moved from the AVHDD 1022 to the archive device 1023 is plain sentence data, the moved data may be the data encrypted by using the encryption key specific to the archive device 1023 or may be the data encrypted by the encryption key that is recorded in the third recording medium 1030 in the case that the encryption key is recorded in the third recording medium 1030.

In this case, the AVHDD 1022 is provided with the encryption means of encrypting the copy prohibited data by using the encryption key specific to the archive device 1023 or by using the encryption key recorded in the third recording medium 1030. In addition, the AVHDD 1022 is provided with a means of acquiring the encryption key specific to the archive device 1023 from the archive device 1023 and a means of acquiring the encryption key described in the third recording medium 1030 from the archive device 1023. Here, the encryption means 28 becomes unnecessary in the archive device 1023.

In addition, the data moved from the AVHDD 1022 to the archive device 1023 may be data in a format used in the archive device 1023. In this case, the AVHDD 1022 can be provided with a format conversion means that converts the transferred data into data in a format for the archive device 1023. In addition, when data is recorded within the storage means 1025 in the AVHDD 1022, the data may be recorded in a format used in the archive device 1023.

In addition, as described in the eighth embodiment in reference to FIG. 24, the AVHDD 1022 is provided with a judgment means of judging whether or not the third recording medium 1030 is a recording medium corresponding to the AVHDD 1022 so that the move means 1027 may move the copy prohibited data that is in plain sentences or that is encrypted to the archive device 1023 in the case that the third recording medium 1030 is judged to be a recording medium corresponding to the AVHDD 1022 according to the above judgment means.

Here, in the case that a key is attached to the third recording medium 1030 that shows that the third recording medium 1030 is a recording medium corresponding to the AVHDD 1022, the judgment means provided in the AVHDD 1022 may judge whether or not the third recording medium 1030 is a recording medium corresponding to the AVHDD 1022 by utilizing the key that is attached to the third recording medium 1030.

In addition, instead of the configuration wherein data move is carried out by judging whether or not the third recording medium 1030 is a recording medium corresponding to the AVHDD 1022, data transfer may be carried out by judging whether or not the archive device 1023 is an apparatus corresponding to the AVHDD 1022. In this case, AVHDD 1022 is provided with a judgment means that judges whether or not the archive device 1023 is an apparatus corresponding to the AVHDD 1022 and the move means 1027 may move the copy prohibited data that is of plain sentence or that is encrypted to the archive device 1023 in the case that the archive device 1023 is judged to be an apparatus corresponding to the AVHDD 1022 according to above judgment means.

Here, in the case that the archive device 1023 has a key that shows that the archive device is an apparatus corresponding to the AVHDD 1022, the judgment means provided in the AVHDD 1022 may utilize the key that the archive device 1023 has so as to judge whether or not the archive device 1023 is an apparatus corresponding to the AVHDD 1022.

In addition, when a management apparatus that has a fee imposing ability concerning the move of, at least, copy prohibited data is confirmed to be connected to the interface to which the AVHDD 1022 and the archive device 1023 are connected, the move means 1027 of the AVHDD 1022 may transfer the copy prohibited data to the archive device 1023. Here, an STB can be cited as an example of the management apparatus.

In addition, the AVHDD in the eighth embodiment and the AVHDD 2 may, respectively, be provided with a means of transmitting fee imposition information concerning the move of data to a management apparatus for managing each of the AVHDDs at the time when the data move is carried out. In addition, an STB 1003 in which a means of imposing a fee is integrated can be used as an example of the management apparatus.

In addition, in the above described embodiment, the copy prohibited data is moved from the AVHDD to the archive device. That is to say, the copy prohibited data is deleted from the AVHDD after the copy prohibited data is moved to the archive device. However, there may be a case wherein the copy prohibited data cannot be processed in the archive device and, therefore, in some cases it is preferable to allow the copy prohibited data to remain in the AVHDD as a backup.

In this case, when the move means 1027 of the AVHDD of the above described embodiment is replaced with a copy means of copying the copy prohibited data in the archive device, the copy prohibited data can be transmitted to the archive device and the copy prohibited data can be stored in the AVHDD as a backup so as to produce the merit that the copy prohibited data stored in the AVHDD as a backup can be utilized even in the case that the copy prohibited data cannot be processed in the archive device.

Figure 29:
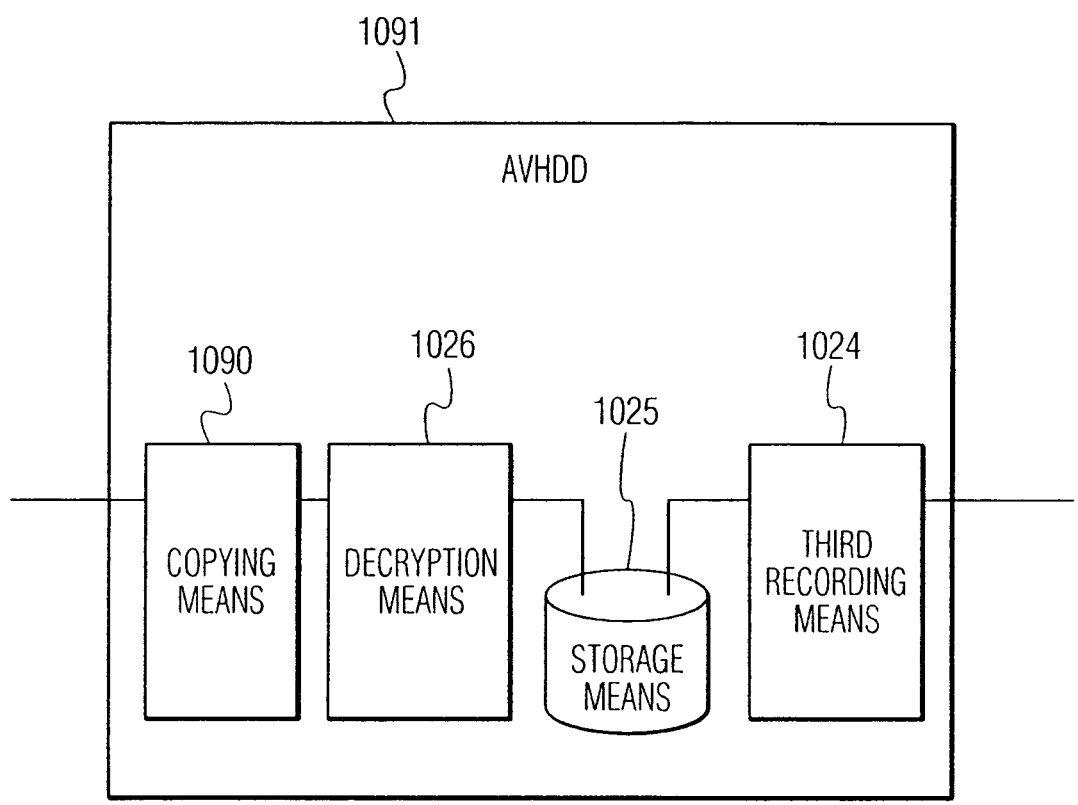
FIG. 29 is a block diagram of an AVHDD91 with a copying means 90 according to Embodiment 9 of the present invention.

Here, as one example of the configuration of the AVHDD that is provided with a copy means, FIG. 29 shows a case wherein the AVHDD 1022, which is provided with the move means 1007 shown in FIG. 24, is replaced with the AVHDD 1091 that is provided with the copy means 1090 instead of the move means 1027.

Tenth Embodiment

Next, an encryption data decrypting and recording system according to the tenth embodiment of the present invention is described.

Figure 30:
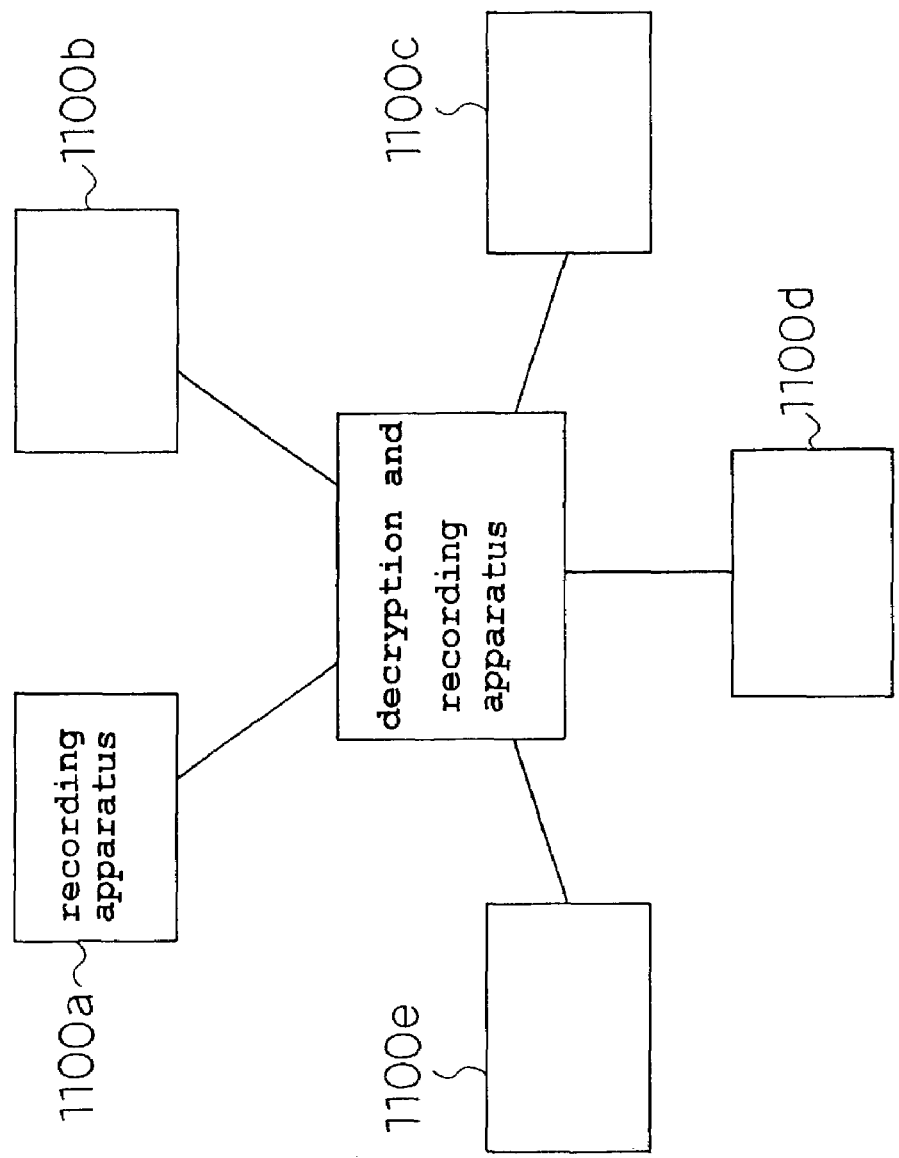
FIG. 30 is a block diagram of an encrypted data decryption recording system according to Embodiment 10 of the present invention.

FIG. 30 shows the configuration of the encryption data decrypting and recording system according to the present tenth embodiment. As shown in FIG. 30, the encryption data decrypting and recording system according to the present tenth embodiment is formed of five recording apparatuses 1100*a* to 1100*e* and a decrypting and recording apparatus 1101.

Figure 31:
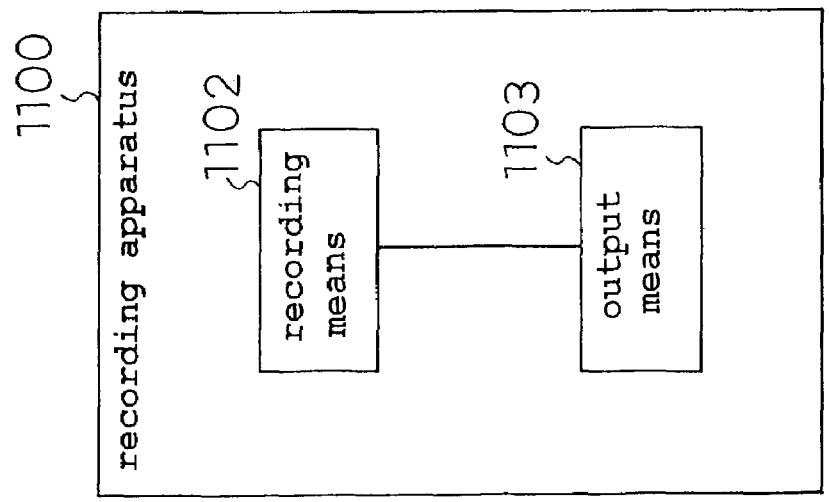
FIG. 31 is a block diagram of a recording apparatus 100 according to Embodiment 10 of the present invention.

FIG. 31 shows the configuration of each of the recording apparatuses 1100 according to the present tenth embodiment. As shown in FIG. 31, each recording apparatus 1100 has a recording means 1102 and an output means 1103 that outputs data recorded in the recording means 1102. Here, the data recorded in the recording means 1102 is data gained by encrypting the copy prohibited data that is prohibited from being copied and the encrypted copy prohibited data of the same content is recorded in the recording means 1102 of each recording apparatus 1100.

Figure 32:
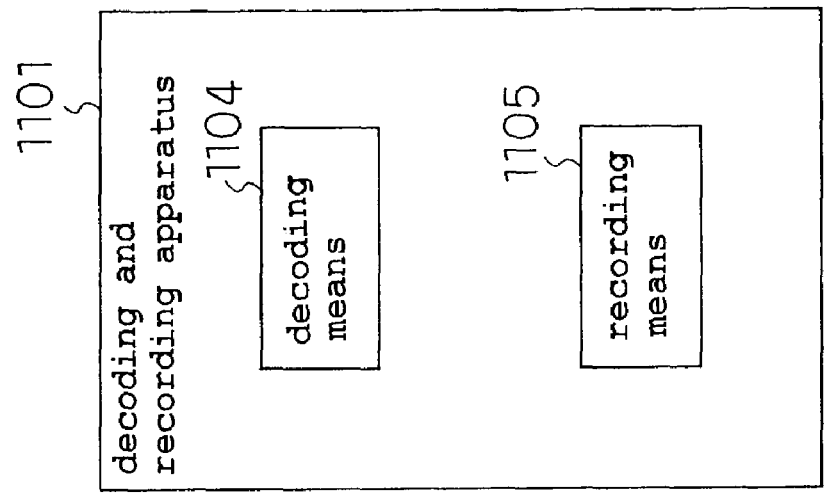
FIG. 32 is a block diagram of a decryption recording apparatus 101 according to Embodiment 10 of the present invention.

Next, FIG. 32 shows the configuration of the decrypting and recording apparatus 1101 according to the present tenth embodiment. As shown in FIG. 32, the decrypting and recording apparatus 1101 has a decryption means 1104 and a recording means 1105. Here, the decryption means 1104 is a means of decrypting the encrypted copy prohibited data that is outputted from the recording apparatus 1100 while the recording means 1105 is a means of recording the encrypted copy prohibited data or unencrypted copy prohibited data, which is data that has the same content as that of the copy prohibited data recorded in the recording apparatus 1100.

In addition, in the above described encryption data decrypting and recording system according to the present tenth embodiment, though the data of the same content is recorded in five recording apparatuses 1100*a* to 1100*e* and in the decrypting and recording apparatus 1101, respectively, the encrypted copy prohibited data can only be decrypted by the decryption means 1104 of the decrypting and recording apparatus 1101.

Accordingly, when the encryption data decrypting and recording system according to the present tenth embodiment is used, effects are gained that copyright is protected while the data of which the copyright is to be protected can be backed up.

Here, though in the encryption data decrypting and recording system according to the above described embodiment, the recording apparatus 1100 is provided with 1100*a* to 1100*e*, the number of the recording apparatuses 1100 is not limited to 5. In summary, any plural number of recording apparatuses may exist.

Eleventh Embodiment

Next, an AVHDD 1032, according to the eleventh embodiment of the present invention is described. Here, transmission of data from the AVHDD 1032 is described in the eleventh embodiment and the transmitted data is recorded in the DVD 1037 of the DVD apparatus 1033.

Figure 26:
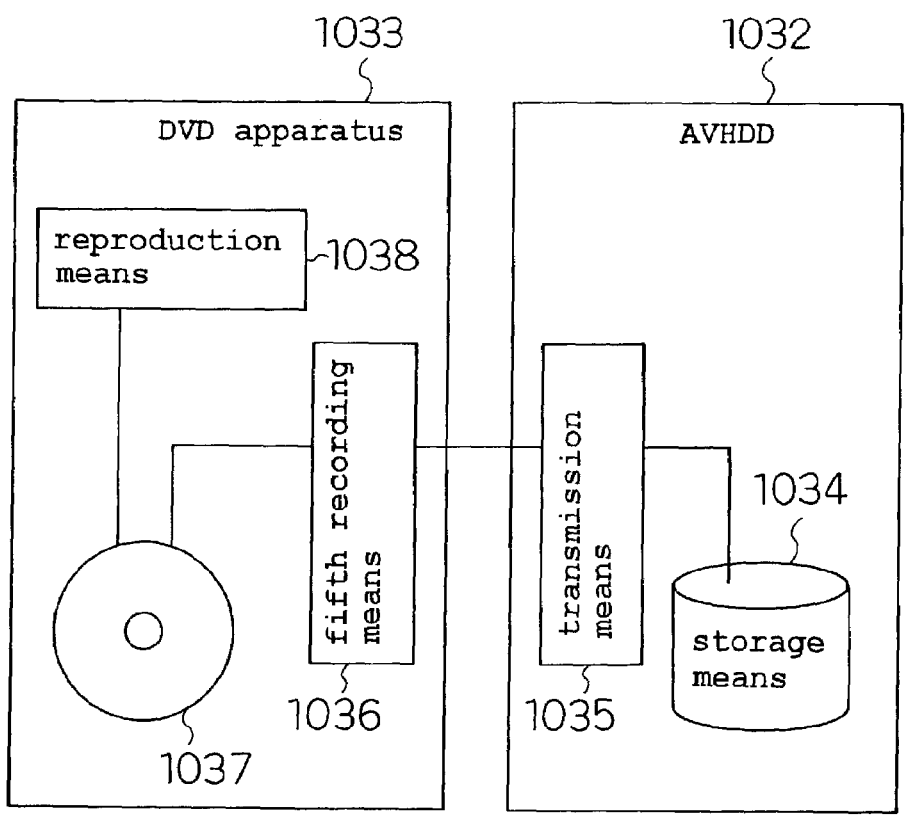
FIG. 26 is a block diagram of an AVHDD32 and a DVD apparatus 33 according to Embodiment 11 of the present invention.

FIG. 26 shows a block diagram of the AVHDD 1032 and the DVD apparatus 1033 according to the eleventh embodiment of the present invention.

Now, the AVHDD 1032 according to the eleventh embodiment of the present invention is formed of, as shown in FIG. 26, a storage means 1034 of storing data and a transmission means 1035 of transmitting data stored in the storage means 1034 to the DVD apparatus 1033.

The DVD apparatus 1033 according to the eleventh embodiment of the present invention is formed of, as shown in FIG. 26, a fifth recording means 1036 of recording data from the AVHDD 1032 in the DVD 1037 and a reproduction means 1038 of reproducing data recorded in the fifth recording means 1036.

Here, the AVHDD 1032 of the eleventh embodiment is used as one example of the data transmission apparatus of the present invention.

In addition, the connection between the AVHDD 1032 and the DVD apparatus 1033 may be effected via any type of interface.

Next, the operations of the AVHDD 1032 and the DVD apparatus 1033 according to the eleventh embodiment of the present invention are described.

Figure 27:
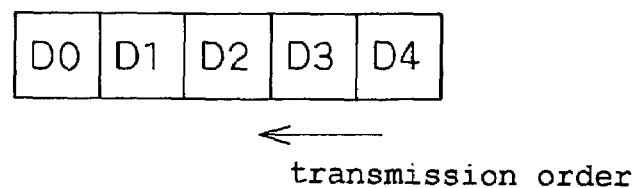
FIG. 27 is a configuration diagram of a stream according to Embodiment 4 of the present invention.

Here, the data transmitted by the AVHDD 1032 is assumed to be a stream formed of a plurality of data packets. FIG. 27 shows the configuration of a portion of this stream. This stream is, as shown in FIG. 27, a stream formed of a plurality of blocks formed of five data packets D0, D1, D2, D3 and D4, wherein D0, D1, D2, D3 and D4 are, respectively, data packets that are chronologically sequential in ascending order of number and the data is encrypted in a chain manner so that each packet cannot be reproduced unless the packet chronologically one before is reproduced.

Accordingly, when the data packets D0, D1 and D2 are picked up, the data packet D0 is chronologically followed by the data packet D1, which is then followed by the data packet D2 so that the data packet D1 is not reproduced unless the data packet D0 is reproduced while the data packet D2 is not reproduced unless the data packet D1 is reproduced.

As for the operation, at the time when the AVHDD 1032 transmits such a stream to the DVD apparatus 1033, when the transmission means 1035 of the AVHDD 1032 transmits a stream stored in the storage means 1034 to the DVD apparatus 1033, the data packets of each block forming the stream are transmitted in the order of D4, D3, D2, D1 and D0.

The fifth recording means 1036 in the DVD apparatus 1033 records the data from the AVHDD 1032 in the DVD 1037.

When the data recorded in the DVD 1037 is reproduced the reproduction means 1038 reproduces the data packets in the order of D0, D1, D2, D3 and D4 with respect to each block forming the stream and then reproduces the entire stream.

The data packets transmitted from the AVHDD 1032 to the DVD apparatus 1033 are transmitted in the order of D4, D3, D2, D1 and D0 in the above manner and, therefore, the block formed of the data packets D0, D1, D2, D3 and D4 is not reproduced unless D4, D3, D2, D1 and D0 are transmitted in the case that the power is cut off in the course of data transmission due to a power failure, or the like, so that the situation where transmission data is decrypted in another apparatus can be avoided even in the case that the transmission data is leaked to the apparatus.

Here, though in the above described embodiment chain encryption of the data packets D0, D1, D2, D3 and D4 is not described in detail, the data packets D0, D1, D2, D3 and D4 that are encrypted in a chain manner may be stored in the storage means 1034 of the AVHDD 1032 or the data packets of each block may be encrypted in a chain manner at the time when the transmission means 1035 of the AVHDD 1032 transmits the stream by providing the AVHDD 1032 with a means of carrying out a chain encryption.

In addition, though in the above described embodiment the stream is formed of a plurality of blocks formed of five data packets D0, D1, D2, D3 and D4, the number of data packets that form each block is not limited to five. In addition, the stream is not limited to a stream formed of a plurality of blocks. The stream may not be formed of a plurality of blocks, but rather, may be a stream formed of a plurality of data packets. In this case, the transmission means 1035 transmits the data packets forming the stream in the order from the rear to the head.

In addition, though in the above described embodiment the transmission of the stream is described, the data packets D0, D1, D2, D3 and D4 are closely observed and this results in finding that the data packets D1 to D4 are erased from the recording medium before the move of the stream after the move of the data packets D4, D3, D2, and D1 has been completed and the data packet D0 is transferred after the above erasure has been completed and, then, the data packet D0 is erased from the recording medium before the transfer of the stream.

Here, in the above described eighth to eleventh embodiments, the AV data of which the value of the CCI is any of "Copy Never," "Copy Once" or "No More Copy" is collectively referred to as copy prohibited data while in the following twelfth to sixteenth embodiments the content wherein copying of the AV data, or the like, of which the CCI is "Copy Never" is prohibited is referred to as copy prohibited content.

Twelfth Embodiment

Figure 33:
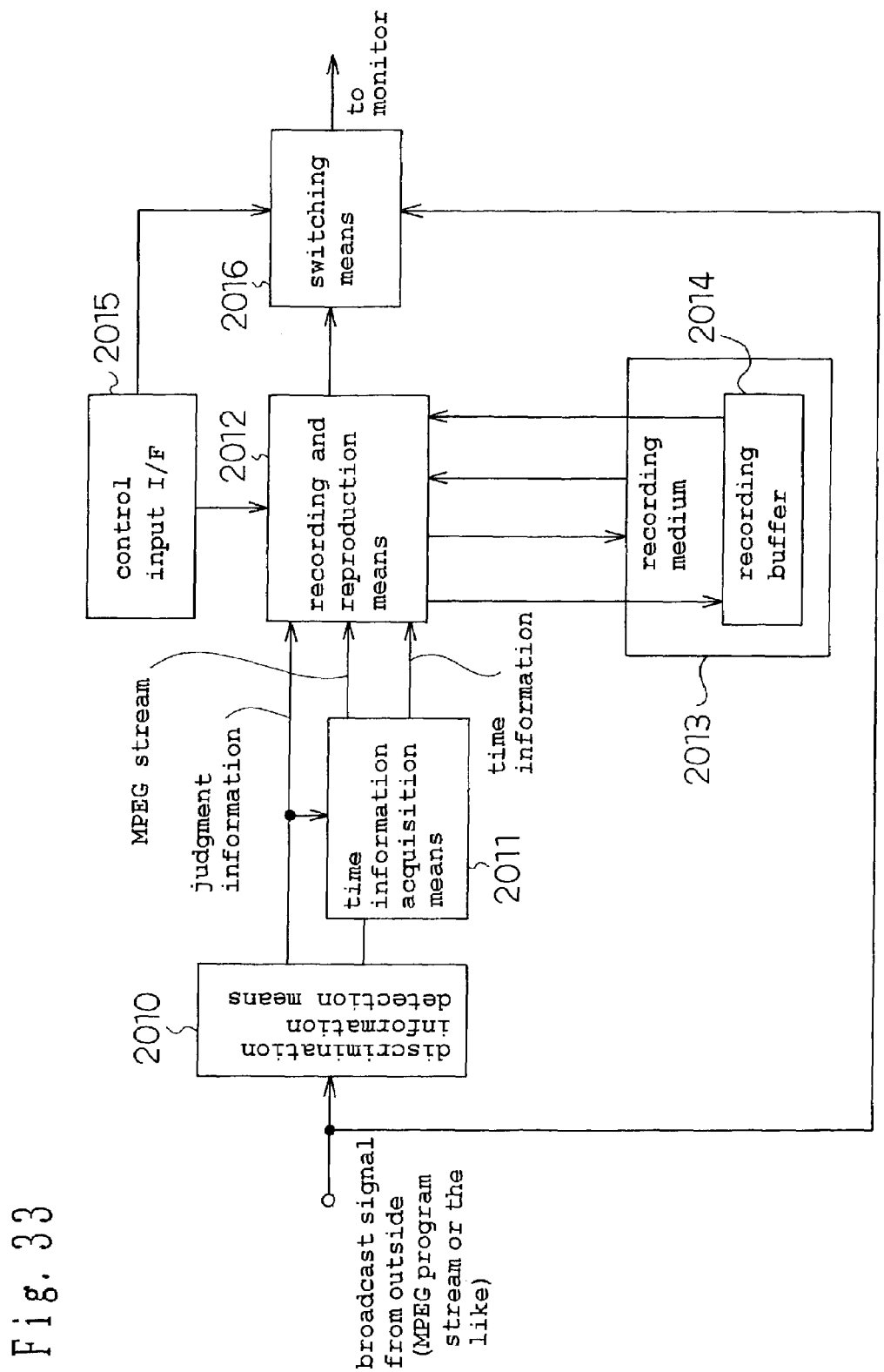
FIG. 33 is a configuration diagram of a recording and reproduction apparatus according to Embodiment 12 of the present invention.

FIG. 33 is a configuration diagram of a recording and reproduction apparatus according to the twelfth embodiment of the present invention. As shown in the figure, a judgment information detection means 2010 is a means of detecting judgment information with respect to the copy limitation in broadcasting signals from the outside, a time information acquisition means 2011 is a means of a acquiring time signals with respect to time from broadcasting signals from the outside, a recording and reproduction means 2012 is a means of recording and reproducing broadcasting signals from the outside, a recording medium 2013 is a means of storing broadcast data that can be implemented by a hard disk, or the like and that allows recording and reproduction at the same time and allows a random access, a control input interface (hereinafter, control input I/F) 2015 is a means of receiving the control from the user and a switching means 2016 is a means of receiving an input from the recording and reproduction means 2012 and a broadcast input from the outside so as to select either of the se and output it to the external monitor, or the like. In addition, in the recording medium 2013, the recording buffer 2014 is a region that exclusively records the data that is restricted from being copied. Here, the broadcast that is dealt with in the present embodiment is a digital broadcast using an MPEG transport stream or an MPEG program stream (hereinafter, referred to, in general, as MPEG stream) and means concerning the decoding process, and the like, are omitted. Each of the following embodiments is described in the same manner. In addition, the judgment information detection means 2010, the time information acquisition means 2011 and the recording and reproduction means 2012 are examples of recording means of the present invention.

The operation of the recording and reproduction apparatus according to the twelfth embodiment of the present invention that has the above described configuration is described as follows.

First, the judgment information detection means 2010 refers to each packet forming a header or a data column when receiving an input of the MPEG stream from the outside and detects information concerning copyright such as a copy guard or CCI (copy control information) so as to judge whether or not a copy prohibition or a copy restriction has been placed on the inputted content. Here, it is assumed that only the copy prohibited content that is prohibited from being copied is inputted.

Next, when the inputted MPEG stream is identified as the copy prohibited content, the judgment information detection means 2010 outputs detection information to the recording and reproduction means 2012. As examples of detection information, copyright information, a copy guard, and the like, included in the MPEG stream are cited. The recording and reproduction means 2012 prepares to record the MPEG stream in the recording buffer 2014 within the recording medium 2013 based on the detection information after the recording and reproduction means receives the detection information.

When an MPEG stream is inputted from the outside via the judgment information detection means 2010, the recording and reproduction means 2012 records the MPEG stream in the recording buffer 2014.

Figure 34:
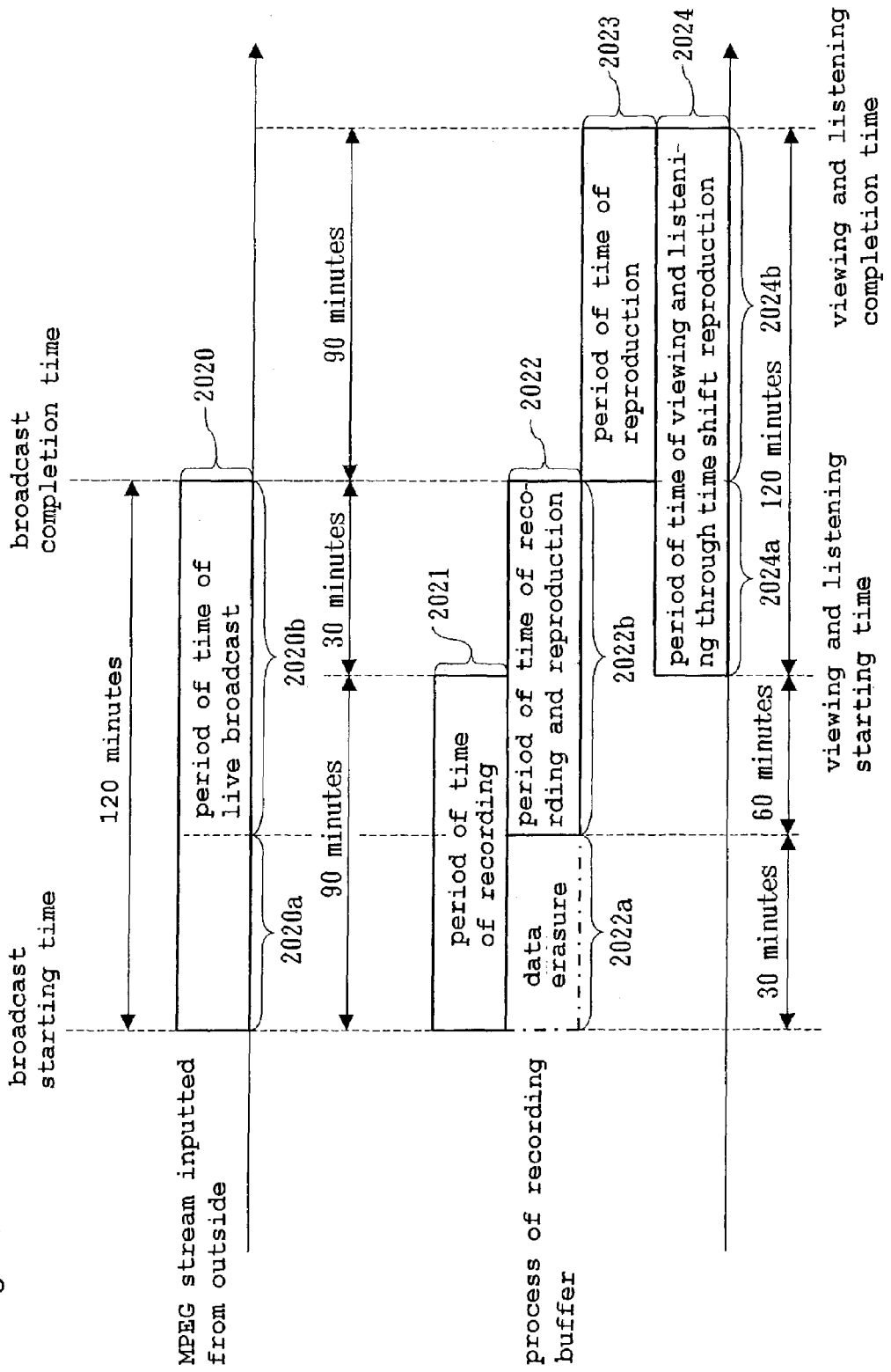
FIG. 34 is a time chart for describing the operation of a recording and reproduction apparatus according to Embodiment 12 of the present invention.

Next, the operation of recording in the recording buffer 2014 by the recording and reproduction means 2012 is described in detail. FIG. 34 is a time chart for describing the operation of the recording and reproduction apparatus according to the present twelfth embodiment. As shown in the figure, as an example of the operation of the present embodiment, it is assumed that a recording and reproduction apparatus according to the present embodiment is used in order to temporarily record the amount of data that corresponds to a 90 minute period of broadcast time in the recording buffer 2014 and that the copy prohibited content of the 120 minutes of broadcast time that is broadcast during the period of time of the live broadcast 2020 is viewed and listened to based on the time shift reproduction after 90 minutes has elapsed since the broadcast starting time.

First, at the time when the broadcast starts, the recording and reproduction means 2012 starts recording data that form the copy prohibited content in the recording buffer 2014. After the broadcast starting time, the recording and reproduction means 2012 keeps sequentially recording the data in the recording buffer 2014 and does not carry out reproduction.

On the other hand, the time information acquisition means acquires time information such as a PCR packet or a time stamp from the MPEG stream so as to start measuring the recording time at the point in time when the recording and reproduction means 2012 starts recording the copy prohibited content in the recording buffer 2014.

Next, after the period of time of recording 2021 (90 minutes) has elapsed according to the measurement by the time information acquisition means 2011 since the broadcast starting time, the recording and reproduction means 2012 starts erasing the data recorded after the broadcast starting time from the recording buffer 2014 while continuing the sequential recording of the MPEG stream that is inputted from the outside. Here, in this example of the operation, the time when the period of time of recording 2021 has elapsed since the broadcast starting time is the viewing and listening starting time when the viewing and listening period of time 2024 starts due to the time shift reproduction and, therefore, the recording and reproduction means 2012 reproduces the recorded data before it is erased and outputs it to an external monitor via the switching means 2016.

That is to say, the data that corresponds to the portion 2022a of the first 30 minutes (content that is broadcast during the period of time of the live broadcast 2020a) from among the data recorded during the period of time of recording 2021 is reproduced (content viewed and listened to during the viewing and listening period of time 2024a according to the time shift reproduction) after 90 minutes has elapsed since the broadcast starting time, that is when the viewing and listening starting time according to the time shift reproduction and, after that, it is immediately erased.

Next, when the period of time of recording and reproduction 2022a has elapsed since the viewing and listening starting time according to the time shift reproduction, the recording and reproduction means 2012 continues the sequential recording of the data until the broadcast completion time during the period of time of recording and reproduction 2022b and, at the same time, reproduction of the data that has already been stored in the recording buffer 2014 is continued so that it succeeds the data portion 2022a.

Next, at the time when the broadcast is completed, the recording and reproduction means 2012 stops the sequential recording of the data and implements reproduction of the data recorded in the recording buffer 2014 until the viewing and listening completion time (period of time of reproduction 2023).

Here, in the above described operation, the reproduced data may be stored once in the recording buffer 2014 during the period of time of recording and reproduction 2022b and during the period of time of reproduction 2023 so as to be erased together after the viewing and listening completion time and it is desirable to erase the data immediately after the reproduction in order to prevent the situation where the data is stored in the recording medium 2013 in the case that the power of the recording and reproduction apparatus is cut off due to an accident.

In addition, in the case that the time shift reproduction is not carried out after the viewing and listening starting time, the recording and reproduction means 2012 erases the entire data recorded in the recording buffer 2014. Thereby, the copy prohibited content can be prevented from being reproduced in a form other than by time shifting.

In addition, though in the above description when the judgment information detection means 2010 detects judgment information included in the data of the copy prohibited content, the recording and reproduction means 2012 automatically starts the recording operation for the time shift reproduction, the start of the recording operation of the recording and reproduction means 2012 may not be triggered by the judgment information but, rather, may be carried out by control from the outside (user) via the control input I/F 2015.

Figure 35:
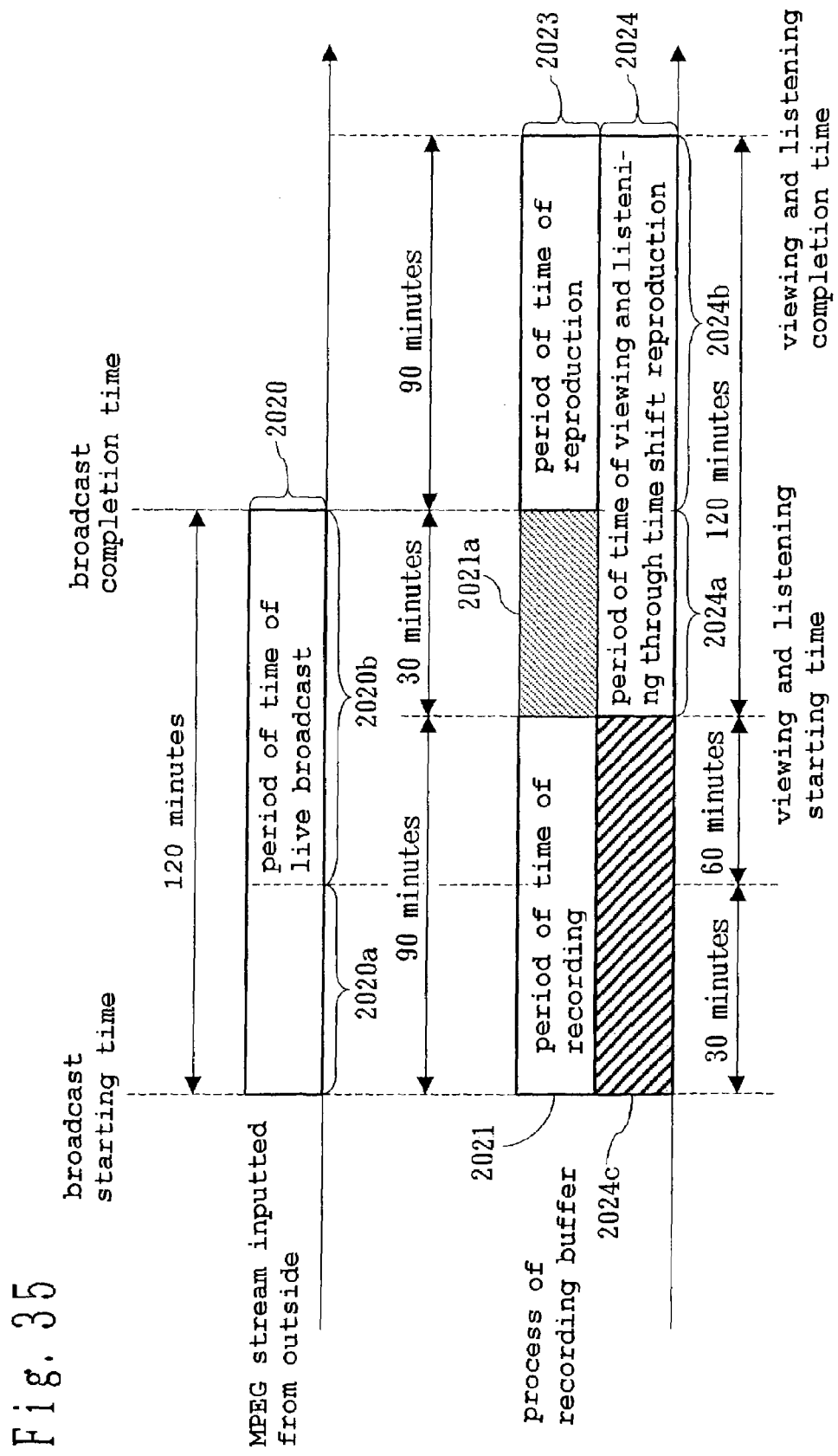
FIG. 35 is a time chart for describing the operation of a recording and reproduction apparatus according to Embodiment 12 of the present invention.

In addition, though in the above description the completion of the period of time of recording 2021 and the viewing and listening starting time according to the time shift reproduction are set at the same time and the operation of time shift reproduction of the copy prohibited content and the operation of the erasure of the data that form this copy prohibited content are interlocked, the invention is not necessarily limited to this but, rather, the viewing and listening starting time may be set at an arbitrary time or viewing and listening may be carried out through a direct order to the recording and reproduction means 2012, without carrying out time setting, based on control from the control input I/F 2015 as long as the viewing and listening starting time is within the period of time of recording 2021 (period of time 2024c wherein the time shift reproduction can be set at any time). At this time in the case that a direct order of the time shift reproduction to the recording and reproduction means 2012 is not carried out within the period of time of recording 2021, it is preferable for the recording and reproduction means 2012 to stop the recording operation (period of time 2021a in FIG. 35). In addition, at the same time, it is desirable to not accept a direct order even in the case that the direct order for time shift reproduction is again carried out.

In addition, in the case that the period of time of recording 2021 has elapsed in the above operation, though it is described above that the recording and reproduction means 2012 erases the data recorded after the broadcast starting time from the recording buffer 2014 while continuing sequential recording of the MPEG stream that is inputted from the outside, this data may be rewritten into an unreproducible condition, and in addition to that, the data may be maintained in the recording buffer 2014.

Thirteenth Embodiment

A recording and reproduction apparatus according to the thirteenth embodiment of the present invention uses a ring buffer as a recording buffer for recording the copy prohibited content.

Figure 36:
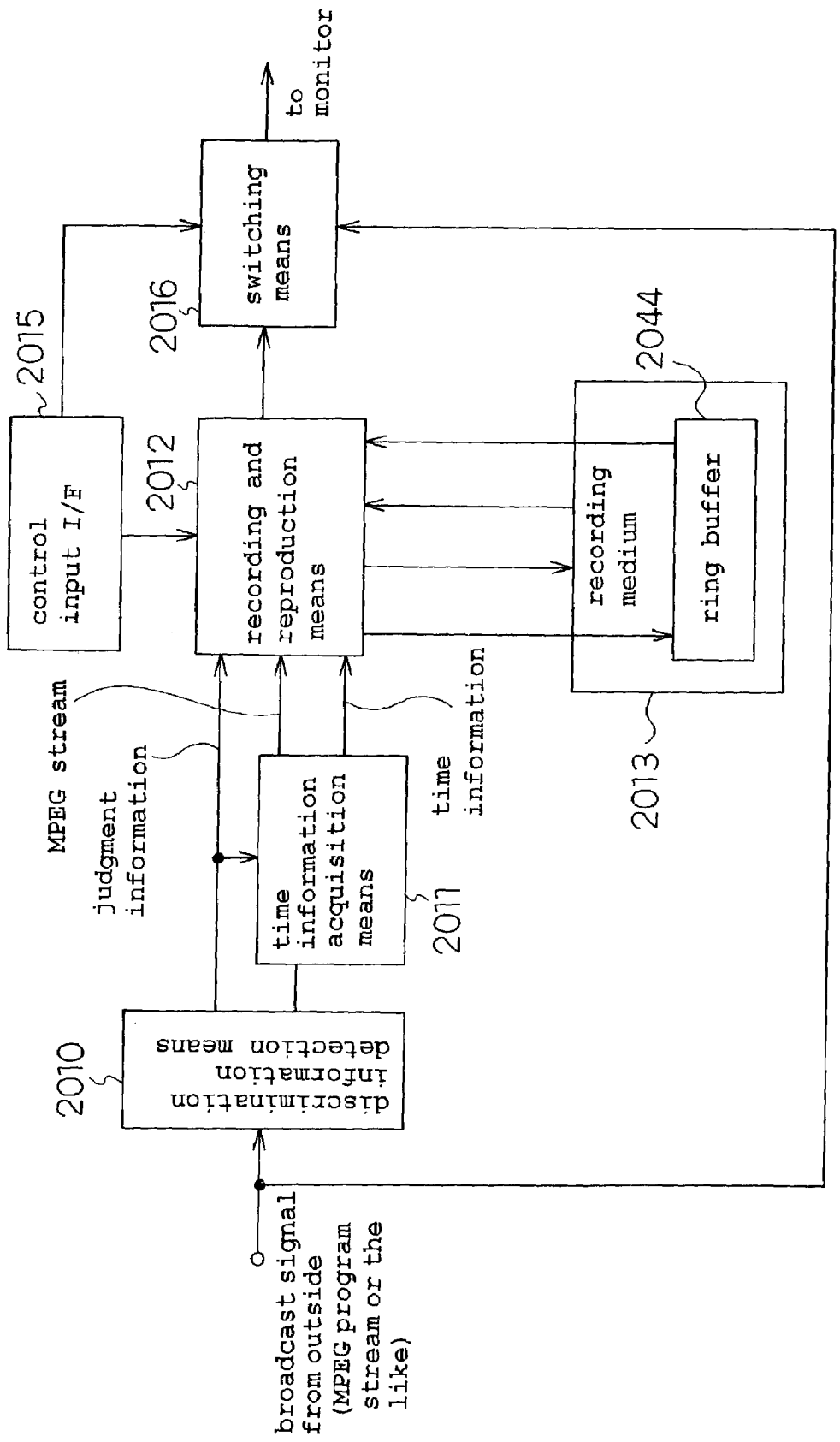
FIG. 36 is a configuration diagram of a recording and reproduction apparatus according to Embodiment 13 of the present invention.

FIG. 36 is a configuration diagram of a recording and reproduction apparatus according to the present thirteenth embodiment of the present invention. In the figure, the same symbols are attached to the same parts as, or corresponding parts to, those in FIG. 33, of which the descriptions are omitted. In addition, the ring buffer 2044 is a means of temporarily recording a constant amount of data by repeating the overwrite recording in the same region.

The operation of the recording and reproduction apparatus according to the thirteenth embodiment of the present invention, which has a configuration as described above, is described as follows.

First, the operation wherein the judgment information detection means 2010 refers to an MPEG program stream from the outside and the recording and reproduction means 2012 records the copy prohibited content in the ring buffer 2044 is carried out in the same manner as in the twelfth embodiment.

Next, the operation of recording in the ring buffer 2044 by the recording and reproduction means 2012 is described in detail. As described above, the ring buffer 2044 is a specific region on the recording means 2013 and carries out overwrite recording by returning to the recording start position after a constant amount of data is recorded. At this time, the size of the ring buffer 2044 may be set in advance or may be set based on the detection information acquired from the judgment information detection means 2010 and, in either case, the size of the ring buffer 2044 is set so that the entirety of the copy prohibited content, which becomes the object of recording, is not recordable. For example, in the case that the broadcast time of the copy prohibited content is 120 minutes, the ring buffer 2044 is set to have a capacity corresponding to 90 minutes.

The recording and reproduction means 2012 starts the recording of the copy prohibited content in the ring buffer 2044 that is set as described above.

Figure 37:
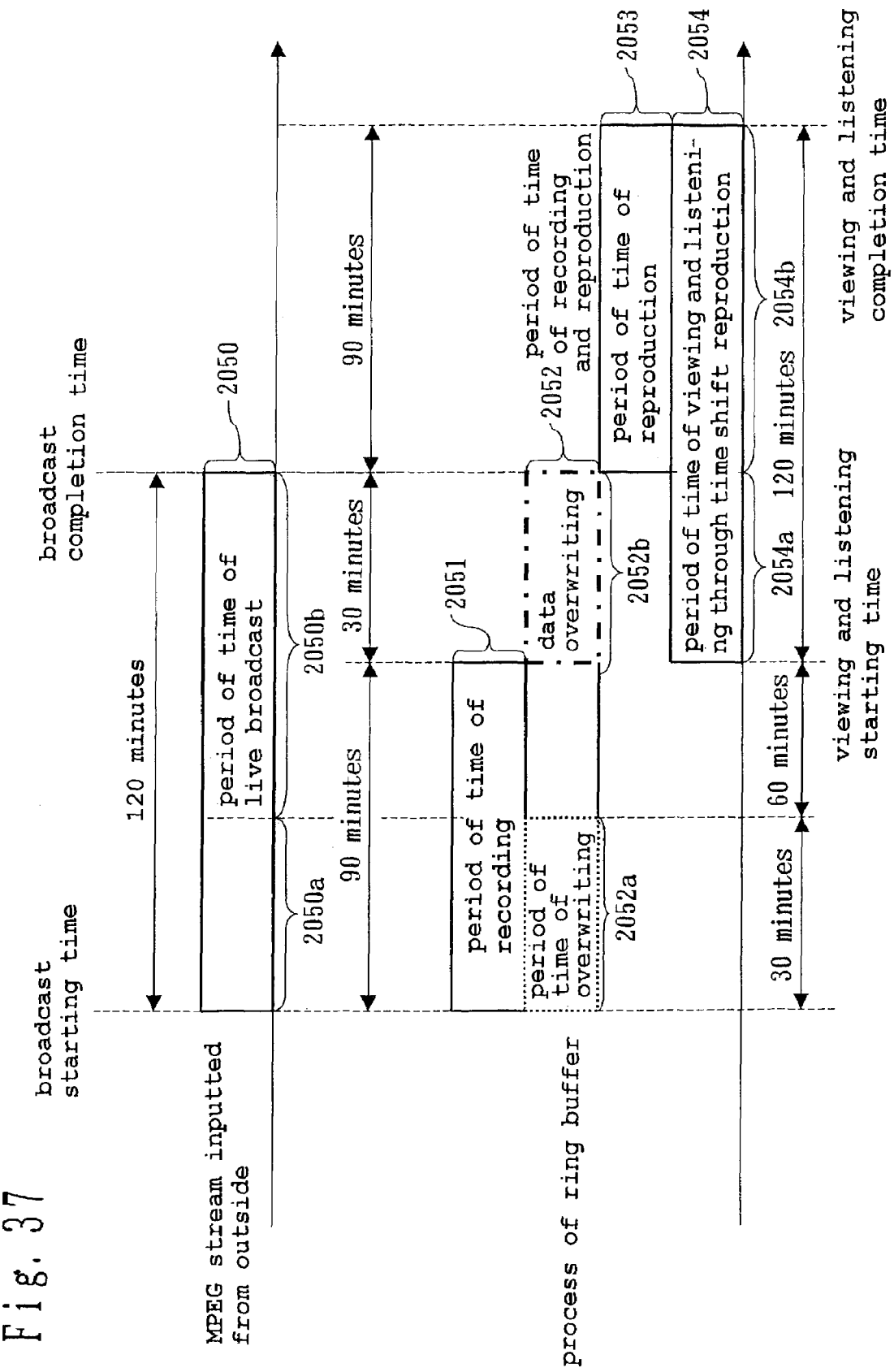
FIG. 37 is a time chart for describing the operation of a recording and reproduction apparatus according to Embodiment 13 of the present invention.

Here, FIG. 37 is a time chart for describing the operation of the recording and reproduction apparatus according to the present thirteenth embodiment. In the following, in reference to FIG. 37, the operations of the recording and reproduction means 2012 and the ring buffer 2044 according to the present thirteenth embodiment are described in detail. Here, as shown in the figure, the settings of each of the times and each of the periods of time are the same as in the case of the twelfth embodiment, shown in FIG. 34.

First, at the time when a broadcast starts, the recording and reproduction means 2012 starts recording the data that forms the copy prohibited content in the ring buffer 2044. After the broadcast starting time, the recording and reproduction means 2012 keeps sequentially recording the data until the capacity set in the ring buffer 2044 becomes full and does not carry out reproduction (period of time of recording 2051).

Next, after the period of time of recording 2051 has elapsed since the broadcast starting time and the capacity set in the ring buffer 2044 becomes full, the recording and reproduction means 2012 returns the recording head (ring buffer pointer) to the recording start position from the recording position at the point in time during the period of time of recording 2051 in the ring buffer 2044 so as to carry out a new overwrite recording of the data.

In addition, in this operational example, since the completion of the period of time of recording 2051 is the same as the starting time of the period of time of viewing and listening 2054 according to the time shift reproduction, the recording and reproduction means 2012 carries out an overwrite recording of the MPEG stream that is inputted from the outside and, at the same time, starts the reproduction of the data, immediately before overwriting, that has been recorded since the broadcast starting time. That is to say, the data that corresponds to the first 30 minute portion 2052*a* (content broadcast during the period of time of the live broadcast 2050*a*) from among the data that has been recorded during the period of time of recording 2051 is reproduced after 90 minutes have elapsed since the broadcast starting time when viewing and listening starts according to the time shift reproduction and, then, is erased through overwrite recording.

Then, the recording and reproduction means 2012 continues the sequential recording of data until the time of broadcast completion and, at the same time, continues the data reproduction (period of time of recording and reproduction 2052*b*).

Next, at the time when the broadcast is completed, the recording and reproduction means 2012 stops overwrite recording of the data and implements the reproduction of the data recorded in the ring buffer 2044 until the completion time of the viewing and listening (period of time of reproduction 2053).

Here, with respect to the above described operation, the data reproduced from the ring buffer 2044 may be once stored in the ring buffer 2044 so as to be collectively erased after the completion time of viewing and listening and it is desirable to erase the data immediately after reproduction in order to prevent the situation wherein the data remains stored in the recording medium 2013 in the case where the power of the recording and reproduction apparatus is cut off due to an accident.

In addition, in the case that a time shift reproduction is not carried out after the starting time of viewing and listening, the recording and reproduction means 2012 erases the entirety of the data recorded in the ring buffer 2044. Thereby, the copy prohibited content can be prevent from being reproduced in a form other than by time shifting.

Figure 38:
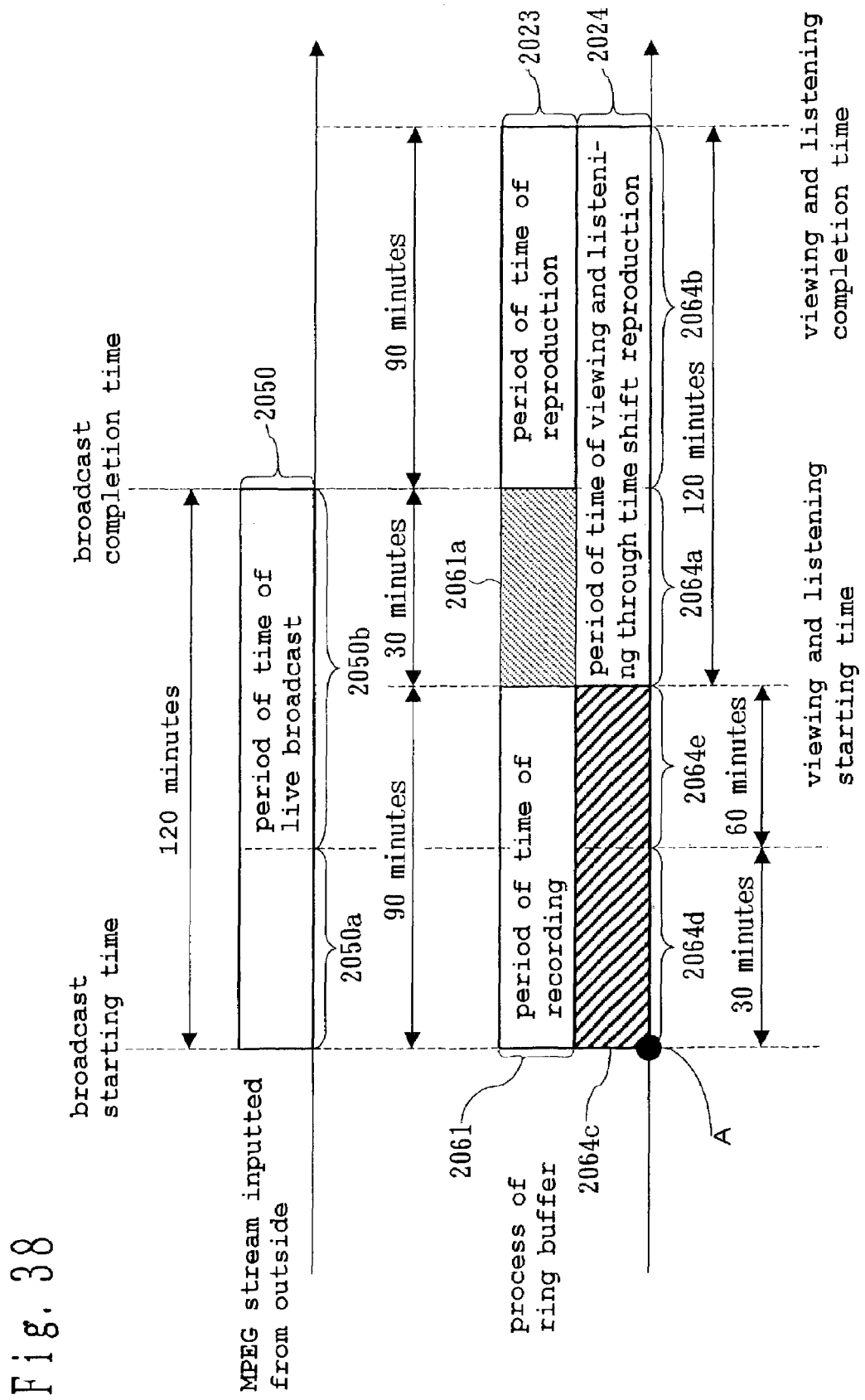
FIG. 38 is a time chart for describing the operation of a recording and reproduction apparatus according to Embodiment 13 of the present invention.

In addition, though in the above described operation, the completion of the period of time of recording 2051 and the starting time of viewing and listening according to time shift reproduction are set at the same time while the operation of the time shift reproduction of the copy prohibited content and the operation of the overwrite recording of the data that form this copy prohibited content are interlocked, the invention is not necessarily limited to this and as shown in FIG. 38 the starting time of viewing and listening may be set at an arbitrary time or viewing and listening may be carried out according to a direct order to the recording and reproduction means 2012, without a setting of the time, based on the control from the control input I/F 2015 as long as the starting time of viewing and listening is within the period of time of recording 2061 (period of time 2064*c* wherein time shift reproduction can be set at an arbitrary time). At this time, in the case that the direct order for time shift reproduction to the recording and reproduction means 2012 is not carried out within the period of time of recording 2061, it is preferable for the recording and reproduction means 2012 to stop the recording operation (period of time 2061*a* in the figure) In addition, at the same time, it is desirable to set the system so that even in the case that the direct order for time shift reproduction is carried out again, this direct order is not accepted.

In addition, though in the above described operation in the case that the period of time of recording 2061 has passed, the recording and reproduction means 2012 continues the sequential recording of the MPEG stream that is inputted from the outside while erasing the data recorded after the broadcast starting time from the ring buffer 2014, the data may be stored in the recording buffer 2014 after this data is rewritten to an unreproducible condition.

In addition, as for the recording position of the data in the ring buffer at the time when the data is reproduced in the time shift reproduction according to the present embodiment (1) the reproduction position under the condition wherein overwrite recording is not carried out in the ring buffer 2044 becomes the same position wherein the recording has started in the ring buffer 2044 and (2) the reproduction position under the condition wherein overwrite recording is being carried out becomes located immediately after the position at the point in time when the control of the reproduction operation is carried out (position wherein the last overwrite recording is carried out) in the ring buffer 2044. That is to say, according to the time shift reproduction, read out is performed in the order starting from the oldest data recorded in the ring buffer 2044 in either of the above cases (1) or (2). In the example shown in FIG. 38, the above (1) corresponds to the case wherein the time shift reproduction is carried out within the period of time 2064*d* (30 minutes after the broadcast starting time) and the reproduction start position is always determined uniquely to be point A in the figure. The above (2) corresponds to the case wherein the time shift reproduction is carried out within the period of time 2064*e* (from 30 minutes to 60 minutes after the broadcast starting time) and the reproduction start position corresponds to the present position of the recording head (buffer pointer) of the ring buffer during the period of time 2064*e*.

Fourteenth Embodiment

A recording and reproduction apparatus according to the fourteenth embodiment of the present invention can selectively carry out time shift reproduction of only the copy prohibited content in the case that a broadcast wherein copy prohibited content and content that may be copied are mixed is received.

Figure 39:
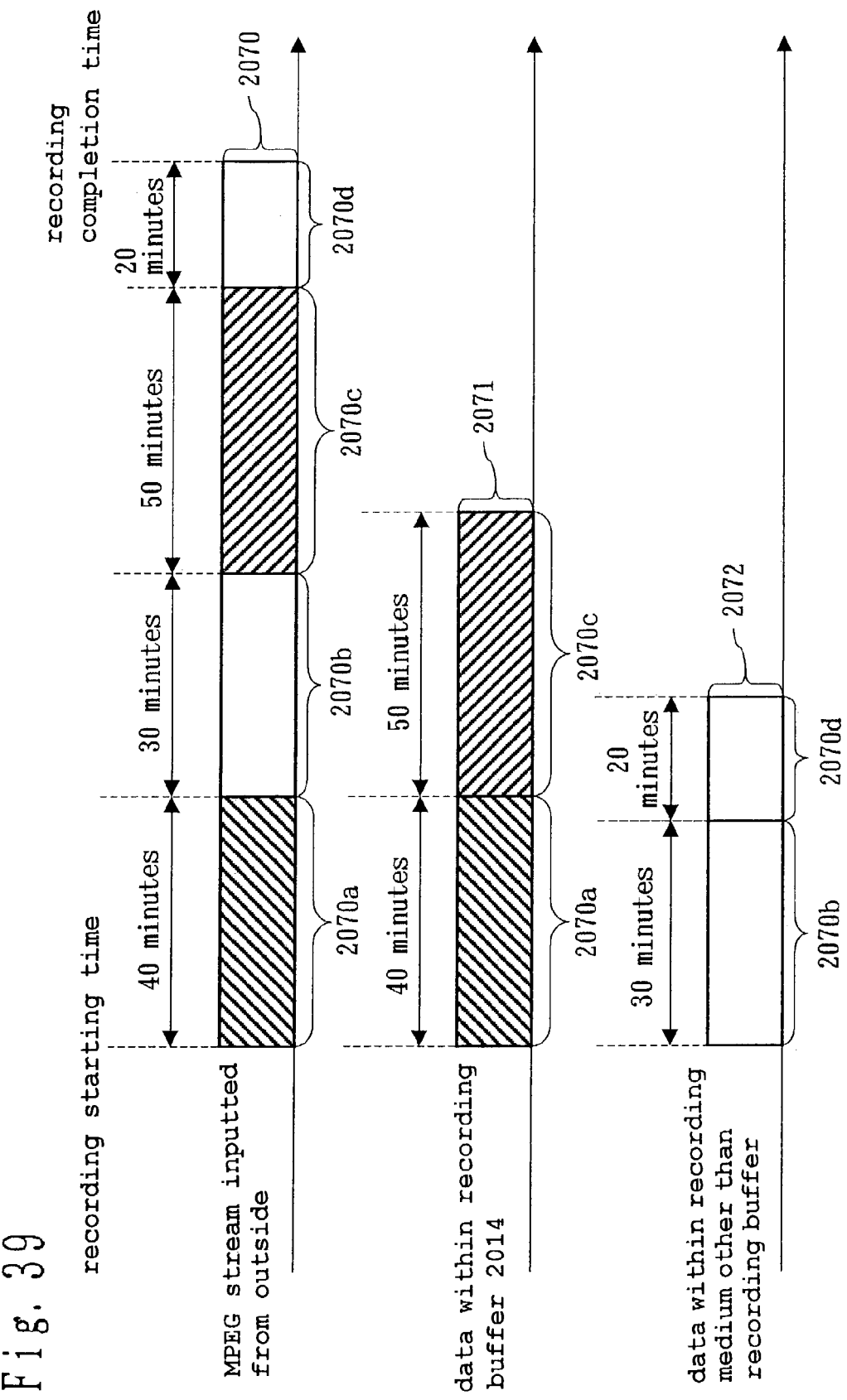
FIG. 39 is a time chart for describing the operation of a recording and reproduction apparatus according to Embodiment 14 of the present invention.

Since the configuration of the present embodiment is the same as in the twelfth embodiment, FIG. 33 is referred to for description. In addition, FIG. 39 is a diagram for describing the operation of the recording and reproduction apparatus according to the present embodiment. Here, in the present embodiment the period of time when time shifting is possible is assumed to be set at 120 minutes instead of at 90 minutes as in the above described embodiment. In the following, the operation in the embodiment of the present invention is described in reference to FIG. 39.

In the MPEG stream 2070 that is inputted from the outside, copy prohibited content 2070*a* and 2070*c* that is prohibited from being copied and conventional content 2070*b* and 2070*d* that may be copied are mixed and the copy prohibited content 2070*a*, 2070*b*, copy prohibited content 2070*c*, 2070*d* are inputted to the recording and reproduction apparatus in chronological order. The judgment information detection means 2010 acquires judgment information included in the respective content, which is outputted to the recording and reproduction means 2012, while the time information acquisition means outputs time information of respective content to the recording and reproduction means 2012. Based on the se, the recording and reproduction means 2012 that has acquired the judgment information and the time information temporarily records the copy prohibited content in the recording buffer 2014 and records the conventional content in the recording region within the recording medium 2013, other than within the recording buffer, after the broadcast time of respective content has elapsed.

At this time, the input of content is in chronological order and, therefore, as shown in FIG. 39, copy prohibited content 2070*a* is recorded first and copy prohibited content 2070*c* is recorded second in the recording buffer 2014 while content 2070*b* is recorded first and content 2070*d* is recorded second in the recording medium 2013.

Copy prohibited content 2070*a* and 2070*c* that have been recorded within the recording buffer 2014 are sequentially reproduced in a time shift manner in the same manner as in the twelfth embodiment. After the completion of the time shift reproduction, data is deleted from the recording buffer 2014 or data is converted to the condition wherein reproduction is made impossible while the content 2070*b* and 2070*d* recorded in the recording medium 2013 can be permanently recorded.

Here, though in the above description the present embodiment can be implemented in the recording and reproduction apparatus that has a configuration of the twelfth embodiment, it can also be implemented in the same manner even in the case that it has the configuration of the thirteenth embodiment.

Fifteenth Embodiment

A recording and reproduction apparatus according to the fifteenth embodiment of the present invention encrypts the data of the copy prohibited content that is temporarily recorded so that the data is converted to the condition that makes viewing and listening impossible.

Figure 40:
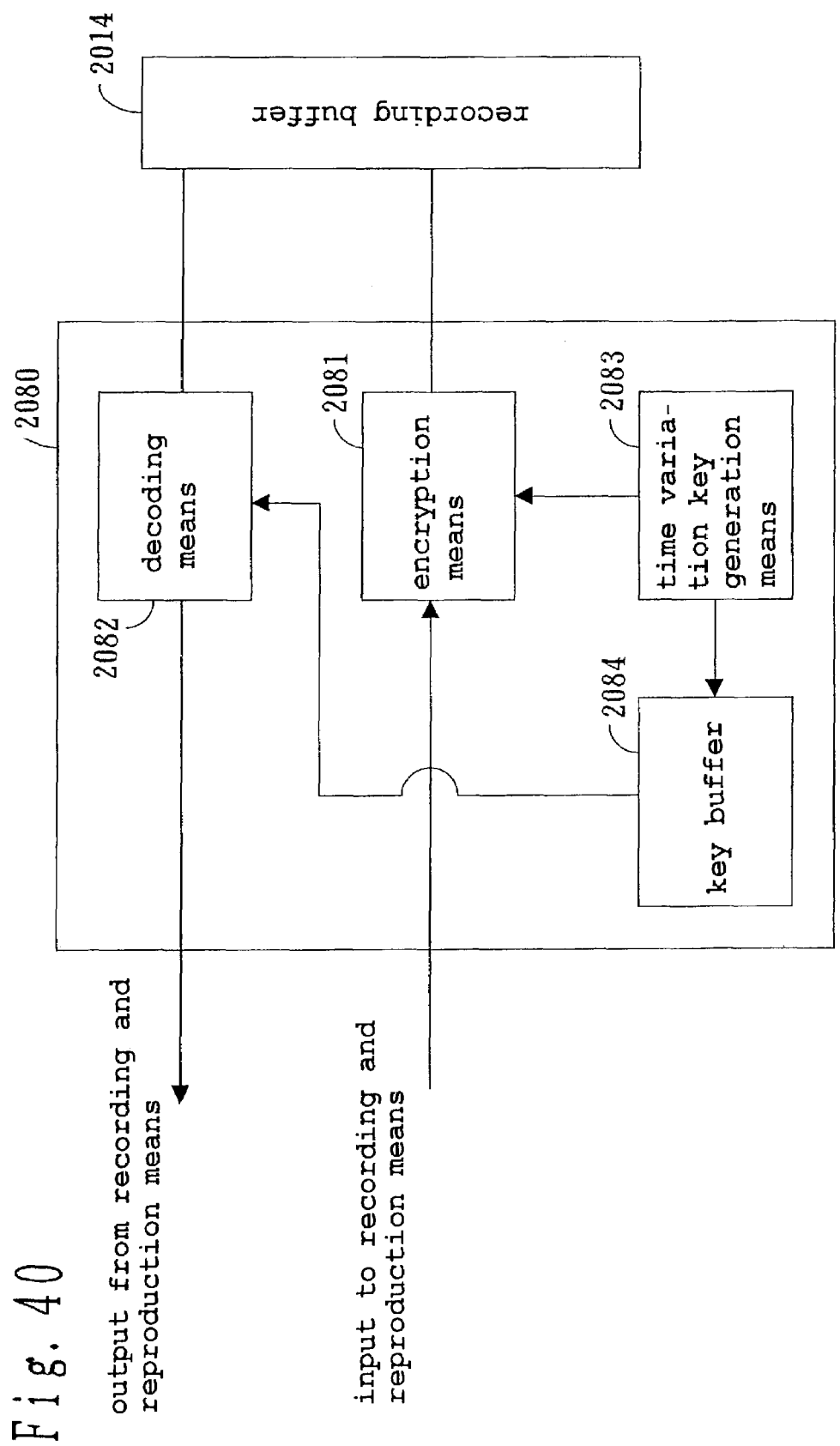
FIG. 40 is a configuration diagram of a recording and reproduction apparatus according to Embodiment 15 of the present invention.

FIG. 40 is a configuration diagram of a data concealment means 2080 used in the recording and reproduction apparatus according to the fifteenth embodiment of the present invention. As shown in the figure, a recording buffer 2014 is the same means as the recording buffer of the twelfth embodiment, an encryption means 2081 is a means of encrypting the data inputted from the recording and reproduction means 2012 by using a time variation key, a decryption means 2082 is a means of decrypting the encrypted data outputted from the recording buffer 2014, a time variation key generation means 2083 is a means of generating a time variation key used for the encryption means 2081 and the decryption means 2082 and a key buffer 2084 is a means of temporarily storing the time variation key.

The operation in the present embodiment having the above described configuration is described below when data is inputted from the recording and reproduction means 2012 to the encryption means 2081, the encryption means 2081 encrypts the original data based on the time variation key generated by the time variation key generation means 2083. The encrypted data is recorded in the recording buffer 2014.

On the other hand, the time variation key generation means 83 outputs the time variation key, which is the same as the one that the encryption means 2081 has acquired, to the key buffer 2084 and the key buffer 2084 holds this.

Next, when the recording and reproduction means 2012 carries out time shift reproduction and the encrypted data is outputted from the recording buffer to the encryption means 2082, the decryption means acquires data necessary for the decrypting of the data from the key buffer 2084 so as to decrypt this data.

In the above described operation, the key buffer that temporarily stores the time variation key disappears when the data exceeds an amount that is equal to the amount of time corresponding to the data capacity of the recording buffer 2014. Thereby, the data on which time shift reproduction is not carried out is held within the recording buffer 2014 in an encrypted form and it becomes impossible to view and listen to the data even if it is possible to reproduce the data.

In order to make the time variation key disappear, the key buffer 2084 is made to have, for example, a ring buffer configuration so that the keys accumulated in the key buffer are overwritten by a new key. In the operational example of the twelfth embodiment shown in FIG. 34, for example, the capacity of the ring buffer is the same as for the period of time of recording 2021.

In addition, a timer is separately provided so that a period of time is measured and the keys stored after the set time are sequentially erased from the key buffer 2084 after a predetermined period of time has elapsed.

In addition, in the case that the key buffer 2084 is formed of a volatile memory, all of the keys within the buffer are erased when the power of the recording and reproduction apparatus is turned off and, thereby, secure concealment becomes possible.

Sixteenth Embodiment

A recording and reproduction apparatus according to the sixteenth embodiment of the present invention can make a notification to the user of the timing of the time shift reproduction.

Figure 41:
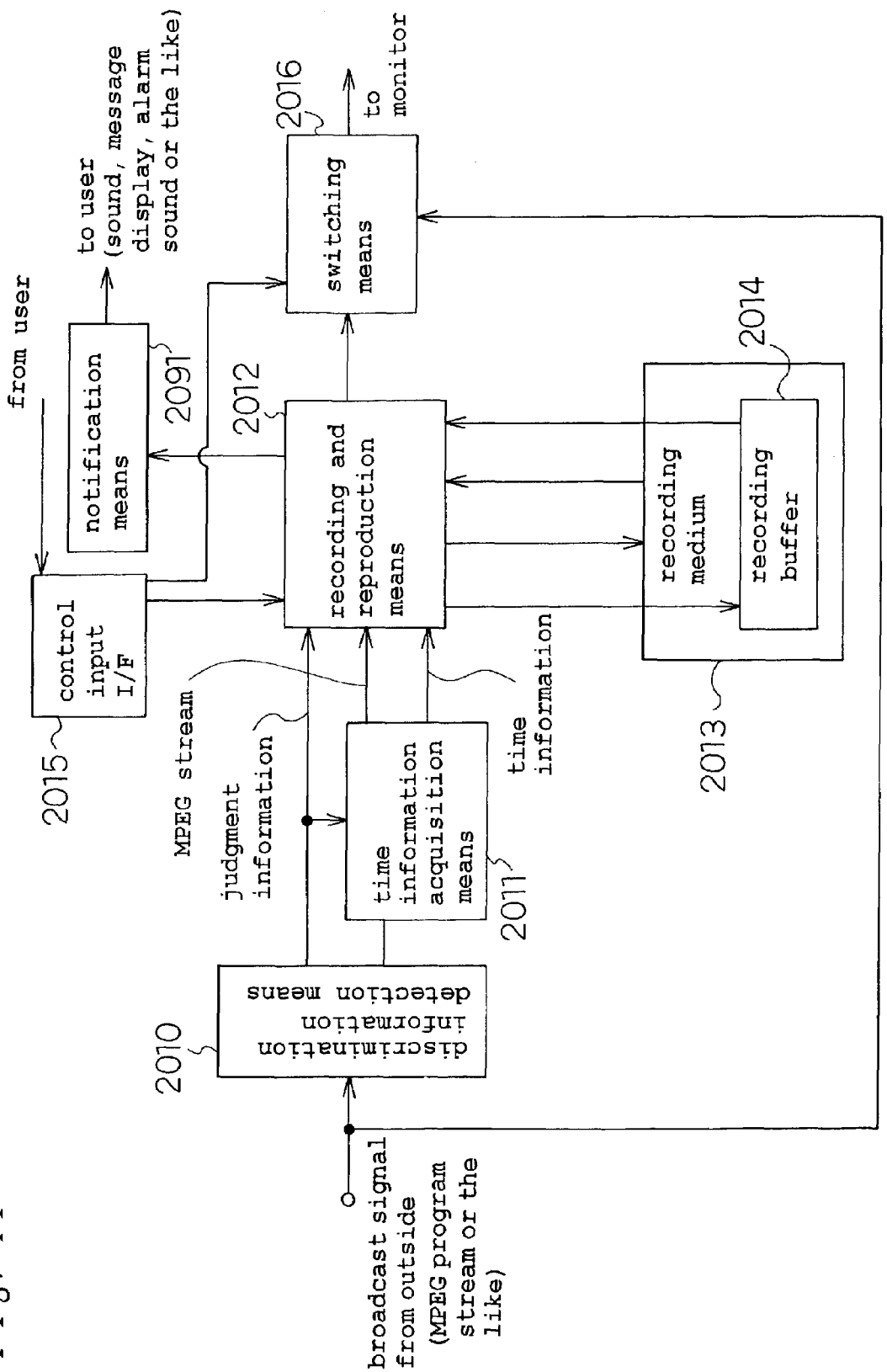
FIG. 41 is a configuration diagram of a recording and reproduction apparatus according to Embodiment 16 of the present invention.

FIG. 41 is a configuration diagram of the recording and reproduction apparatus according to the sixteenth embodiment of the present invention. In the figure, the same symbols are attached to the same, or corresponding, parts as in FIG. 33, of which the descriptions are omitted. In addition, a notification means 2091 is a means of making a notification of the operational condition of this recording and reproduction apparatus through sound, image or letter information.

Figure 42:
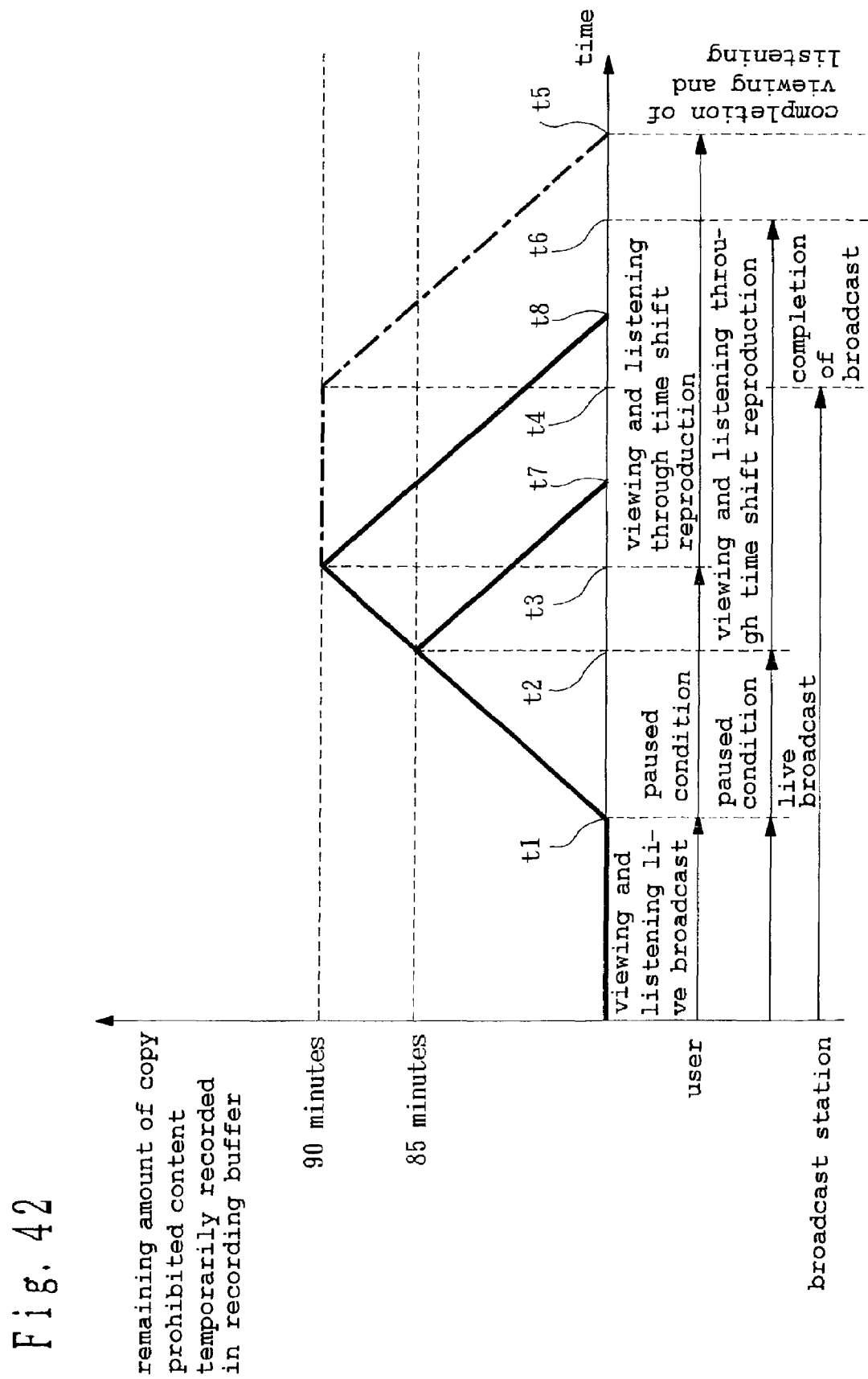
FIG. 42 is a diagram for describing the operation of a recording and reproduction apparatus according to Embodiment 16 of the present invention.
Figure 43:
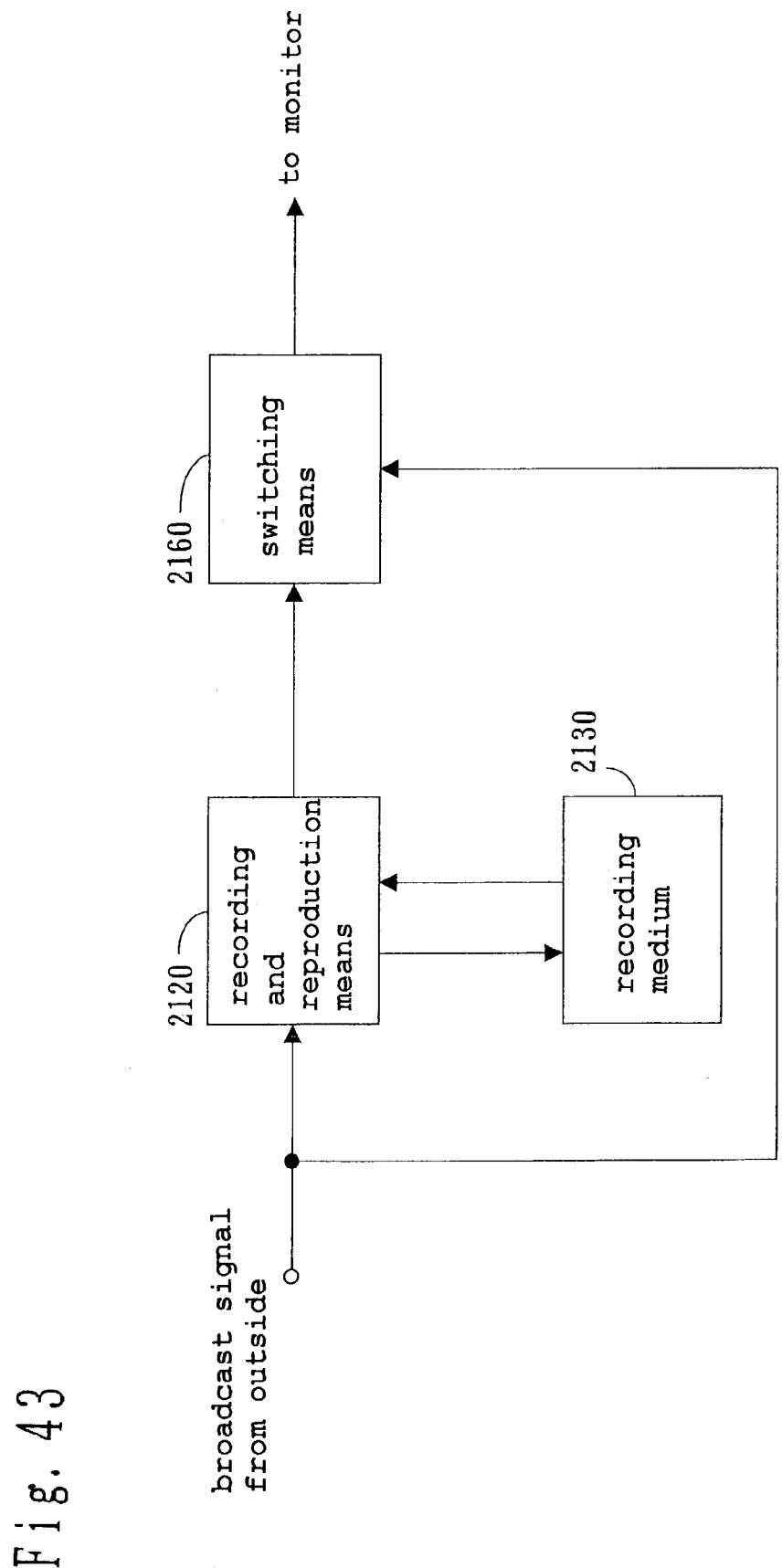
FIG. 43 is a configuration diagram of a recording and reproduction apparatus for carrying out a time shift reproduction according to a prior art.

In addition, FIG. 42 is a diagram for describing the operation of the recording and reproduction apparatus according to the present embodiment. The operation of the recording and reproduction apparatus according to the sixteenth embodiment of the present invention that has the above described configuration is described in the following. Here, the capacity set in the recording buffer 2014 corresponds to 90 minutes of broadcast time in the same manner as in the twelfth embodiment and the descriptions of the operations that overlap those in the twelfth embodiment are omitted so that only the points of difference are described.

First, the case is considered wherein the user is viewing and listening to copy prohibited content broadcast from the broadcast station as a live broadcast and the viewing and listening temporarily interrupted at time t for some reason. At this time, the user inputs commands via the control input I/F 2015 so as to start up the recording and reproduction means 2012. Recording and reproduction means 2012 starts recording the copy prohibited content in the recording buffer 2014 at a point in time (same as time t1) when the input from the control input I/F 2015 is received. Meanwhile, the recording and reproduction apparatus converts to the "pause" condition.

The data of the copy prohibited content is recorded in the recording buffer 2014 in the same manner as in the operation of twelfth embodiment and when it becomes time t2, an alarm sound is issued to the user so as to draw the users attention that the y must control the recording and reproduction apparatus. In the present embodiment time t2 is set at a time when the remaining amount of time (broadcast time unit) has elapsed after the recording time t1 during which the data recorded in the recording buffer 2014 by the recording and reproduction means 2012 has reached the set capacity and that is 5 minutes (broadcast time units) in the present embodiment. Accordingly, time t2 completely becomes the (recording starting (pause starting) time+85 minutes (amount of copy prohibited content that is temporarily recorded in the recording buffer–5 minutes).

Due to the notification from the notification means 2091, the user inputs commands via the control input I/F 2015 so as to release the pause and to restart the viewing and listening of the copy prohibited content. The point that differs from the condition before the pause is the copy prohibited content that the user is viewing and listening to is reproduced in a time shift manner from the recording buffer 2014 instead of being the live broadcast from the broadcast station.

In this case, the pause is effectuated from time t2 to time t1 and the user's program viewing and listening completion time t6 is behind the completion time t4 of the actual broadcast by (t2-t1) minutes.

In addition, when a time shift reproduction is carried out in this operation starting from time t2, reproduction of the content that is temporarily recorded in the recording buffer 2014 is completed while the program is being broadcast from the broadcast station and during a period of time from this reproduction completion time t7 to the program viewing and listening completion time t6, data is recorded in and reproduced from the recording buffer 2014 and, at the same time, the reproduced program data is held in the recording buffer in the condition wherein viewing and listening is impossible or is erased.

On the other hand, in the case that the user does not input any command into the control input I/F 2015 after time t2 has passed, at time t3 when the data for the set time is completely recorded in the recording buffer 2014, the operation of temporarily recording data in the recording buffer 2014 is stopped and the time shift reproduction is forcibly started. In the present embodiment, time t3 corresponds to this time, which is 5 minutes after time t2, wherein time t2 is the time when the notification means 2091 makes a notification. In this operation, the program is reproduced in a time shift manner with a delay of the gap between time t3 and time t1, which is the time when pause is started, so that time t5, which is the time when the viewing and listening to the program by the user is completed, is behind time t4, which is the time when the actual broadcast is completed, by (t3-t1) minutes. In addition, the (t3-t1) minutes is the same length of time as of the recording time of the copy prohibited content that is set in the recording buffer 2014 at the beginning. Furthermore, the broadcast after time t3 is not recorded in the recording buffer 2014. Accordingly, during a period of time between time t8, which is the time when the time shift reproduction is forcibly completed, and time t5, which is the program viewing and listening completion time, the user views and listens to another program that is broadcast after the broadcast of the previous program has already been completed or time t8 that is the time when the time shift reproduction is completed exactly becomes the user's viewing and listening completion time.

That is to say, in the case that the time shift reproduction is once forcibly started without the input of the command for the time shift reproduction by the user after time t2 has passed, the user cannot view or listen to the program, which had been being viewed and listened to before the pause, in a complete form after the pause is released.

As described above according to the present embodiment, the user can set the time shift reproduction of the copy prohibited content to a desired time and the user can be encouraged to complete the implementation of the time shift reproduction before a predetermined period has elapsed in order to protect the copyright of the copy prohibited content.

Here, though in the above described embodiment, an example using the recording buffer 2014 is described, the same effect can be gained by using the ring buffer 2044 of the thirteenth embodiment in place of the recording buffer 2014. As for the operation of the case wherein the ring buffer 2044 is used, the time shift reproduction for the set period of time in the recording buffer that a ring buffer is carried out wherein the reproduction is simultaneously carried out as recording of data in an overwriting manner is continued between time t4 and time t3 as shown by the one dotted chain line in FIG. 42. Here, the operation of the case wherein the overwriting operation is set to be prohibited at time t3 becomes the same as the case of a forcible time shift reproduction implementation of the above described ordinal recording buffer.

In addition, the configuration of the embodiment may be used by being combined with that of the fourteenth embodiment, which has already been described.

Furthermore, though in each of the above described embodiments a recording and reproduction means wherein a recording apparatus and a reproduction means are integrated according to the present invention is described as carrying out recording in, and reproduction from, a recording buffer, the configuration of the present invention is not limited to this but, rather, may be provided with only a recording means that carries out recording and a means of reproducing data from the recording buffer 2014 or the ring buffer 2044 may be separately provided as an external apparatus.

Furthermore, though in each of the above described embodiments the period of time of recording of the copy prohibited content, or the like, is measured as time information by counting the PCR packets within the MPEG stream of the content, time information is not limited to this but, rather, EPG may be used as another type of time information and the time information may be measured in reference to the acquired EPG by carrying out an absolute time measurement by means of a timer provided separately.

Furthermore, this time information may be measured in the recording medium 2013.

Furthermore, this time information may be measured within a device such as an STB that inputs an MPEG stream to the recording and reproduction apparatus according to the embodiment of the present invention and may be inputted together with the MPEG stream. Furthermore, these types of time information may include the broadcast starting time, and the like, of the content that becomes the object of temporary recording.

Furthermore, though in each of the above described embodiments copy prohibited content is described as comprising data that is not permitted, even one time, to be copied, copy prohibited content of the present invention is not limited to this but, rather, content that comprises data that is allowed to be copied only one time may be the object of the invention. In summary, it is possible for the present invention to use any data, as long as it is prohibited from being copied or predetermined restrictions are applied to it.

Here, the present specification also describes an invention concerning a reproduction apparatus characterized by comprising: a control means of controlling the encrypted data, which is recorded on a disk by the above described recording apparatus of the present invention, to be reproduced; a reproduction means controlled by said control means of reproducing said data and a decryption means of decrypting said reproduced data and of sending it to an interface; wherein said control means controls said recording means to reproduce said copy permission information; wherein said decryption means generates first information that includes at least either of said device unique key or said copy permission information; wherein said decryption means uses said recording unit information and generates a content key that is information gained by decrypting said first information; and wherein said decryption means decrypts said data by using said content key.

Furthermore, the present specification also describes an invention concerning a reproduction apparatus characterized by comprising: a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said control means controls said recording means to reproduce said encrypted title key; and wherein said decryption means decrypts said encrypted title key by using said device unique key.

Furthermore, the present specification describes an invention concerning a reproduction apparatus characterized by comprising: a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said decryption means decrypts said data by using said title key.

Furthermore, the present specification describes an invention concerning a reproduction apparatus characterized by comprising; a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said control means controls said recording means to reproduce said encrypted title key; wherein said decryption means decrypts said reproduced title key by using said device unique key; said decryption means generates third information that includes said title key; wherein said decryption means generates a content key that is information gained by decrypting said third information by using recording unit information that is a numeral and/or a symbol specific to the recording block based on a recording unit that is the minimum unit for said control means to sequentially access said recording means; and wherein said decryption means decrypts said data by using said content key.

Furthermore, the present specification also describes an invention concerning a reproduction apparatus characterized by comprising: a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said decryption means decrypts said data by using said copy permission information.

Furthermore, the present specification describes an invention concerning a reproduction apparatus characterized by comprising; a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said control means controls said recording means to reproduce said encrypted title key; wherein said decryption means decrypts said reproduced title key by using said device unique key; wherein said control means controls said recording means to reproduce said copy permission information; wherein said decryption means generates second information that includes at least either said title key or said copy permission information; wherein said decryption means generates a content key that is information gained by decrypting said second information by using recording unit information that is a numeral and/or a symbol specific to a recording block corresponding to a recording unit that is the minimum unit for said control means to sequentially access said recording means; and wherein said decryption means decrypts said data by using said content key.

Furthermore, the present specification describes an invention concerning a reproduction apparatus characterized by comprising; a control means of controlling the encrypted data, which is recorded on a disk by the above described recording apparatus of the present invention, to be reproduced; a reproduction means controlled by said control means of reproducing said data; and a decryption means of decrypting said reproduced data and of sending it to an interface; wherein said control means controls said recording means to reproduce said copy permission information; and wherein said decryption means decrypts said data by using said reproduced copy permission information.

Furthermore, the present specification also describes an invention concerning a medium that holds a program and/or data for allowing a computer to implement the entirety of, or a part of, the functions of the entirety of, or a part of, the above described present invention, wherein said functions are implemented by said program and/or data, which is readable or has been read out by the computer, working in cooperation with said computer.

Furthermore, the present specification also describes an invention concerning an information assembly that is a program and/or data for allowing a computer to implement the entirety of, or a part of, the functions of the entirety of, or a part of, the above described present invention, wherein said functions are implemented by said program and/or data, which is readable or has been read out by the computer, working in cooperation with said computer.

Furthermore, data includes data structure, data format, data types, and the like.

Furthermore, a medium includes a recording medium such as a ROM, a transmission medium such as the Internet and a transmission medium such as light, radio waves and sound waves.

Furthermore, a medium that holds a program and/or data includes, for example, a recording medium in which a program and/or data is recorded, a transmission medium for transmitting a program and/or data, and the like.

Furthermore, to be able to be processed by a computer includes, for example, to be readable by a computer in the case of a recording medium such as a ROM and includes that a program and/or data that becomes the object of transmission is able to be handled by a computer as a result of transmission.

Furthermore, an information assembly includes software such as, for example, a program and/or data.

Furthermore, as described above, the configuration of the present invention may be implemented in a software manner or may be implemented in a hardware manner.

INDUSTRIAL APPLICABILITY

As is clear from the above description, the present invention can provide a recording apparatus and a reproduction apparatus that can protect copyrights in the case that data that requires copyright protection is recorded and/or in the case that data that requires copyright protection is reproduced.

In addition, the present invention can provide a data processing apparatus that protects the copyright when shifting data that is prohibited from being copied to, or when copying data that is prohibited from being copied in, another recording medium, a recording and reproduction apparatus for recording, or for reproducing while recording, the data from this data processing apparatus, an encrypted data decrypting and recording apparatus system for backing up data while protecting the copyright as well as a decrypting and recording apparatus, a recording apparatus and data transmission apparatus for transmitting data while protecting the copyright.

In addition, the present invention can provide a recording apparatus and a recording and reproduction apparatus that can carry out a time shift reproduction of a broadcast program, and the like, that is prohibited from being copied in a manner such that infringement of the copyright is avoided.

What is claimed is:

1. A recording apparatus comprising:
an encryption means of encrypting data by using recording apparatus specific information, the recording apparatus specific information being used for encryption and decryption performed within said recording apparatus, and not being used outside of said recording apparatus;
control means of controlling said encrypted data to be recorded;
recording means controlled by said control means of recording said encrypted data on a disk;
wherein: said recording means is operable to record said encrypted data on the disk in which a plurality of recording blocks are provided, the recording blocks being divided into a header portion and a data portion;
said encryption means is operable to encrypt data recorded in the header portion and the data portion to provide a unique recording format which restricts the encrypted data to be played back only on said recording apparatus.

2. A recording apparatus comprising:
an encryption means of encrypting data;
a control means of controlling said encrypted data to be recorded;
a recording means controlled by said control means of recording said encrypted data on a disk in which a plurality of recording blocks are provided,
wherein said encryption means encrypts said data by using recording unit information that is a numeral and/or a symbol specific to respective recording blocks each corresponding to a recording unit that is a minimum unit for said control means to sequentially access said recording means,
the recording unit information is assigned to each of the recording blocks, and the recording unit information assigned to different recording blocks are different from each other,
said recording blocks, provided in the disk on which said recording means is operable to record said encrypted data, is divided into a header portion and a data portion; and
said encryption means is operable to encrypt data recorded in the header portion and the data portion to provide a unique recording format which restricts the encrypted data to be played back only on said recording apparatus.

3. A recording apparatus according to claim 2, wherein the encryption of said data by using said recording unit information indicates the encryption of said data by using a key gained based on said recording unit information.

4. A recording apparatus according to claim 2, wherein at least said encrypted data recorded in said recording block and additional information added to said encrypted data are encrypted in the entire portion and are recorded in said recording means.

5. A recording apparatus according to claim 2, wherein:
copy permission information is added to said data;
said control means controls said recording means to record said copy permission information;
said encryption means generates first information that includes at least either a device unique key that is a numeric value and/or a symbol allocated to, and specific to, said recording apparatus, or said copy permission information;
said encryption means generates, by using said recording unit information, a content key that is information gained by encrypting said first information;
said encryption means encrypts said data by using said content key; and
said control means controls said recording means to record said encrypted data.

6. A recording apparatus comprising:
an encryption means of encrypting data;
a control means of controlling said encrypted data to be recorded;
a recording means controlled by said control means of recording said encrypted data on a disk,
wherein a title key that is a numeric value and/or a symbol is allocated to said data;
said encryption means encrypts said title key by using a device unique key that is a numeric value and/or a symbol allocated to, and specific to, said recording apparatus, the device unique key being used for encryption and decryption performed within said recording apparatus, and not being used outside of said recording apparatus;
said control means controls said recording means so that said encrypted title key is recorded in said recording means;
said recording means is operable to record said encrypted data on the disk in which a plurality of recording blocks are provided, the recording blocks being divided into a header portion and a data portion; and
said encryption means is operable to encrypt said title key and data recorded in the header portion and the data portion to provide a unique recording format which restricts the encrypted data to be played back only on said recording apparatus.

7. A recording apparatus according to claim 6, wherein said encryption means encrypts said data by using said title key.

8. A recording apparatus according to claim 7, wherein:
said control means controls said recording means to record said encrypted title key;
said encryption means generates third information that includes said title key;
said encryption means generates a content key, which is information gained by encrypting said third information, by using recording unit information that is a numeral and/or a symbol specific to a recording block based on a recording unit that is a minimum unit for said control means to sequentially access said recording means;
said encryption means encrypts said data by using said content key; and
said control means controls said recording means to record said encrypted data.

9. A recording apparatus according to claim 7, wherein:
copy permission information is added to said data; and
said encryption means encrypts said data by using said copy permission information.

10. A recording apparatus according to claim 9, wherein:
said control means controls said recording means to record said encrypted title key;
said control means controls said recording means to record said copy permission information;
said encryption means generates second information that includes at least either said title key or said copy permission information;
said encryption means generates a content key that is information gained by encrypting said second information by using recording unit information that is a numeral and/or a symbol specific to a recording block based on a recording unit that is a minimum unit for said control means to sequentially access said recording means;
said encryption means encrypts said data by using said content key; and
said control means controls said recording means to record said encrypted data.

11. A recording apparatus according to claim 6, wherein:
said encryption means encrypts data to which copy permission information is attached by using said copy permission information; and
said control means controls said recording means to record said copy permission information before and/or after said recording means records said data.

12. A recording apparatus according to claim 11, wherein said control means controls said recording means to record said copy permission information before, at least, said recording means records said data.

13. A recording apparatus according to claim 11, wherein said control means controls said recording means to record said copy permission information only after said recording means records said data.

14. A reproduction apparatus wherein:
control means of controlling encrypted data recorded on a disk by means of a recording apparatus according to claim 1 to be reproduced;
reproduction means, which is controlled by said control means, of reproducing said data; and
decryption means of decrypting said reproduced data by using recording apparatus specific information.

15. A reproduction apparatus comprising:
control means of controlling encrypted data recorded on a disk by means of a recording apparatus according to claim 2 to be reproduced;
reproduction means, that is controlled by said control means, of reproducing said data; and
decryption means of decrypting said reproduced data, wherein said decryption means decrypts said reproduced data by using said recording unit information.

16. A reproduction apparatus comprising:
control means of controlling encrypted data recorded on a disk by means of a recording apparatus according to claim 3 to be reproduced;
reproduction means, that is controlled by said control means, of reproducing said data; and
decryption means of decrypting said reproduced data,
wherein said decryption means decrypts said reproduced data by using a key gained based on said recording unit information.

17. A reproduction apparatus comprising:
control means of controlling encrypted data recorded on a disk by means of a recording apparatus according to claim 13 to be reproduced;
reproduction means, which is controlled by said control means, of reproducing said data; and
decryption means of decrypting said reproduced data,
wherein said decryption means attempts to decrypt the entirety of, or a portion of said encrypted data by assuming that said copy permission information has a variety of values in the case that said copy permission information cannot be recorded in a normal manner in said recording means at the time when said data is recorded, and
wherein said reproduced data is decrypted by using the value of said copy permission information in the case that said reproduced data can be decrypted in a normal manner as a result of said attempts.

18. A recording apparatus according to claim 6, wherein an interface from which data is sent, said encryption means and said control means are integrated and provided on the same printed circuit board.

19. A recording apparatus according to claim 18, wherein said interface, said encryption means and said control means are integrated in one chip.

20. A reproduction apparatus according to any of claims 14, 15, 16, or 17, wherein an interface to which reproduced data is sent, said decryption means and said control means are integrated and provided on the same printed circuit board.

21. A reproduction apparatus according to claim 20, wherein said interface, said decryption means and said control means are integrated in one chip.

22. A recording apparatus according to claim 18, wherein a signal detected from a terminal on said printed circuit board that outputs a signal that can be reproduced as data by a third party is entirely encrypted and/or is inscribed in an undisclosed format.

23. A reproduction apparatus according to claim 20, wherein a signal detected from a terminal on said printed circuit board that outputs a signal that can be reproduced as data by a third party is entirely encrypted and/or is inscribed in an undisclosed format.

24. A recording apparatus according to claim 18, wherein the property of a terminal on said printed circuit board that outputs a signal that can be reproduced as data by a third party is defined according to an undisclosed format.

25. A reproduction apparatus according to claim 20, wherein the property of a terminal on said printed circuit board that outputs a signal that can be reproduced as data by a third party is defined according to an undisclosed format.

26. A recording apparatus according to claim 6, wherein said device unique key cannot be accessed by an external device.

27. A recording apparatus according to any of claims 5, 9, 10, 11, 12 and 13, wherein said copy permission information is recorded in a system region that cannot be directly accessed by a user of said recording means.

28. A recording apparatus according to claim 6 wherein:
copy permission information is added to the data; and
said control means can control said recording means to record said data even in the case that said copy permission information of said data represents "Copy Never" according to a predetermined condition.

29. A recording apparatus according to claim 28, wherein said predetermined condition is the case wherein said recorded data becomes unreproducible after a predetermined period of time.

30. A recording apparatus according to claim 28, wherein said predetermined condition is the case wherein said recorded data becomes unreproducible according to fee imposition conditions.

31. A reproduction apparatus according to any of claims 14, 15, 16, 17, wherein:
copy permission information is added to said encrypted data that is recorded; and
said control means controls said reproduction means to reproduce said data at least one time in the case that said copy permission information of said data represents "Copy Never" according to a predetermined condition.

32. A reproduction apparatus according to claim 31, wherein said predetermined condition is the case wherein said recorded data becomes unreproducible after a predetermined period of time.

33. A reproduction apparatus according to claim 31, wherein said predetermined condition is the case wherein said recorded data becomes unreproducible according of fee imposition conditions.

34. A reproduction apparatus according to any of claims 14, 15, 16, 17, wherein:
copy permission information is added to said encrypted data that is recorded; and
said control means controls said reproduction means to copy and to output said data only once so as to allow said copy permission information of said data, after being once copied by means of said recording means, to permit copying only one additional time (copy once) in the case that said copy permission information of said data represents the permission of copying only one (copy once) according to a predetermined condition.

35. A reproduction apparatus according to claim 34, wherein said predetermined condition is the case wherein said data or the key used for encrypting said data are erased after a predetermined period of time has elapsed since said reproduction means has copied and outputted said data.

36. A reproduction apparatus according to claim 34, characterized in that said predetermined condition is the case wherein a recorder of said data that has been only once copied and outputted is an apparatus for recording said data as a backup.

37. A reproduction apparatus according to claim 36, wherein said data recorded as a backup in said recorder is unreproducible from said recorder.

38. A reproduction apparatus according to claim 36, wherein said data recorded as a backup in said recorder is unreproducible unless said data is returned to the original reproduction apparatus.

39. A recording apparatus according to claim 6, wherein said encryption means encrypts data regardless of the value of the copy permission information of said data sent from said interface.

40. A recording apparatus according to claim 6, wherein:
said encryption means does not encrypt said data in the case that copy permission information of the data represents that the data can be freely copied (copy free); and
said control means controls said recording means to record said unencrypted data.

41. An LSI chip comprising:
an encryption means of encrypting data;
a control means of controlling said encrypted data to be recorded;
a recording means controlled by said control means of recording said encrypted data on a disk in which a plurality of recording blocks are provided, wherein said encryption means encrypts said data by using recording unit information that is a numeral and/or a specific to respective recording blocks each corresponding to a recording unit that is a minimum unit for said control means to sequentially access said recording means, the recording unit information is assigned to each of the recording blocks and the recording unit information assigned to different recording blocks are different from each other, said recording blocks, provided in the disk on which said recording means is operable to record said encrypted data, is divided into a header portion and a data portion;

said encryption means is operable to encrypt data recorded in the header portion and the data portion to provide a unique recording format which restricts the encrypted data to be played back only on said LSI chip.

42. An LSI chip comprising:

an encryption means of encrypting data;

a control means of controlling said encrypted data to be recorded;

a recording means controlled by said control means of recording said encrypted data on a disk, wherein a title key that is a numeric value and/or a symbol is allocated to said data;

said encryption means encrypts said title key by using a device unique key that is a numeric value and/or a symbol allocated to, and specific to, a recording apparatus, the device unique key being used for encryption and decryption performed within said recording apparatus, and not being used outside of said recording apparatus;

said control means controls said recording means so that said encrypted title key is recorded in said recording means;

wherein said recording means is operable to record said encrypted data on the disk in which a plurality of recording blocks are provided, the recording blocks being divided into a header portion and a data portion; and said encryption means is operable to encrypt said title key and data recorded in the header portion and the data portion to provide a unique recording format which restricts the encrypted data to be played back only on said LSI chip.

43. A recording apparatus comprising:

a controller operable to encrypt data by using recording apparatus specific information, the recording apparatus specific information being used for encryption and decryption performed within said recording apparatus, and not being used outside of said recording apparatus;

a memory operable to store the encrypted data;

said controller is operable to control said memory to store the encrypted data;

wherein:

said controller is operable to store said encrypted data in the memory provided with a plurality of recording blocks, the recording blocks being divided into a header portion and a data portion; and said controller is operable to encrypt data recorded in the header portion and the data portion to provide a unique recording format which restricts the encrypted data to be played back only on said recording apparatus.

44. The recording apparatus according to claim 43, wherein said controller includes an encryptor that receives the recording apparatus specific information and encrypts the data by using the recording apparatus specific information.

45. The recording apparatus according to claim 43, wherein said recording apparatus specific information is recording unit information that is a numeral and/or a symbol specific to a recording block in said memory.

46. The recording apparatus according to claim 43, wherein said recording apparatus specific information is a device unique key that is a numeric value and/or a symbol allocated to, and specific to, said recording apparatus.

47. A recording apparatus comprising:

an encryption means of encrypting data, the data including a title key that is a numeric value and/or a symbol, and a copy permission information;

a control means of controlling said encrypted data to be recorded;

a recording means controlled by said control means of recording said encrypted data on a disk in which a plurality of recording blocks are provided;

wherein said encryption means generates key information using said title key and said copy permission information;

said encryption means generates a contents key that is information gained by encrypting said key information with a recording unit information which is a numeral and/or a symbol specific to respective recording blocks each corresponding to a recording unit that is a minimum unit for said control means to sequentially access said recording means;

said encryption means encrypts said data using said contents key which changes on a recording block by recording block basis;

the recording unit information is assigned to each of the recording blocks, and the recording unit information assigned to different recording blocks are different from each other;

said recording blocks, provided in the disk on which said recording means is operable to record said encrypted data, is divided into a header portion and a data portion; and said encryption means is operable to encrypt data recorded in the header portion and the data portion to provide a unique recording format which restricts the encrypted data to be played back only on said recording apparatus.

\* \* \* \* \*